United States Patent
Osako

(10) Patent No.: US 8,103,696 B2
(45) Date of Patent: Jan. 24, 2012

(54) COMPUTER READABLE STORAGE MEDIUM HAVING DATA PROCESSING PROGRAM RECORDED THEREON AND DATA PROCESSING APPARATUS

(75) Inventor: Satoru Osako, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 784 days.

(21) Appl. No.: 12/211,626

(22) Filed: Sep. 16, 2008

(65) Prior Publication Data

US 2009/0313222 A1     Dec. 17, 2009

(30) Foreign Application Priority Data

Jun. 11, 2008   (JP) ................................ 2008-153391

(51) Int. Cl.
G06F 17/30 (2006.01)
(52) U.S. Cl. ....................................... 707/791; 370/254
(58) Field of Classification Search .......... 707/781–796; 370/254, 328–330, 221–226
See application file for complete search history.

(56) References Cited

U.S. PATENT DOCUMENTS

| | | | | |
|---|---|---|---|---|
| 7,447,166 | B1 * | 11/2008 | Kaluve et al. ................ | 370/254 |
| 7,764,714 | B2 * | 7/2010 | Monier et al. ................ | 370/516 |
| 2002/0169865 | A1 * | 11/2002 | Tarnoff ........................ | 709/223 |
| 2008/0071896 | A1 * | 3/2008 | Cohen et al. ................. | 709/223 |
| 2008/0224889 | A1 * | 9/2008 | Wyk et al. ................ | 340/870.01 |
| 2009/0141668 | A1 * | 6/2009 | Zhang et al. ................. | 370/315 |
| 2010/0195567 | A1 * | 8/2010 | Ludovic et al. .............. | 370/328 |

OTHER PUBLICATIONS

"UNIX Magazine", Jan. 1999, pp. 68-80, published by Kabushiki Kaisha ASCII.

* cited by examiner

Primary Examiner — Wilson Lee
(74) Attorney, Agent, or Firm — Nixon & Vanderhye P.C.

(57) ABSTRACT

A data processing program generates a layered list structure which is a data structure formed of a plurality of layers. The layered list structure includes a data element layer which includes a plurality of data elements, each including a substance of predetermined data or information indicating a position on a memory storing the substance of the predetermined data, and is a layer in which the data elements are included as a linked list; and a relay node layer positioned above the data element layer and including a plurality of relay nodes, each associated with one element in a layer immediately below. The relay node layer is further divided into layers; in each relay node layer, the relay nodes are ordered in accordance with the order of the elements in the layer immediately below, and in each relay node layer, the relay nodes ordered adjacent to each other are associated together.

19 Claims, 46 Drawing Sheets

F I G. 2
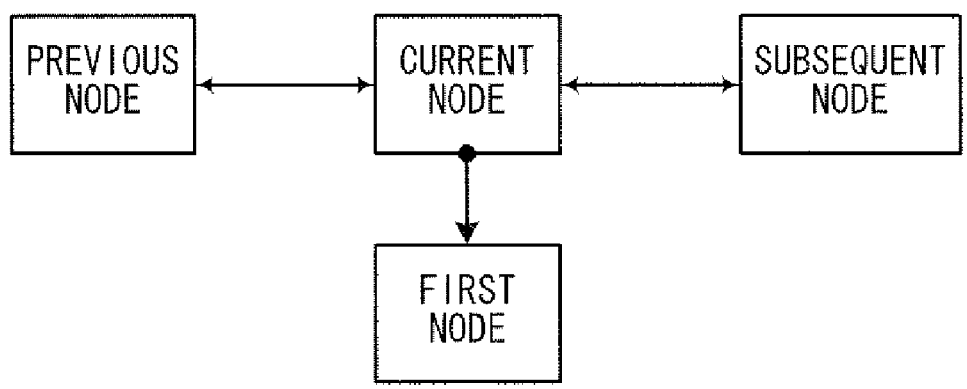

DATA NODE (DNnn)

RELAY NODE (RNnn)

F I G. 2 8
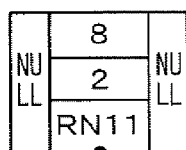
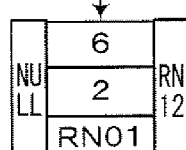
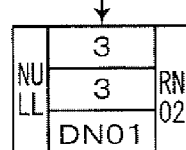
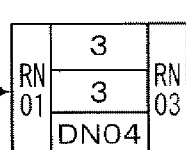
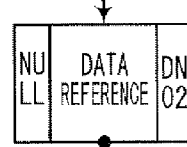
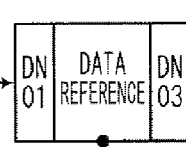
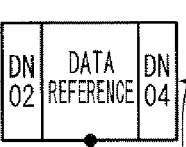
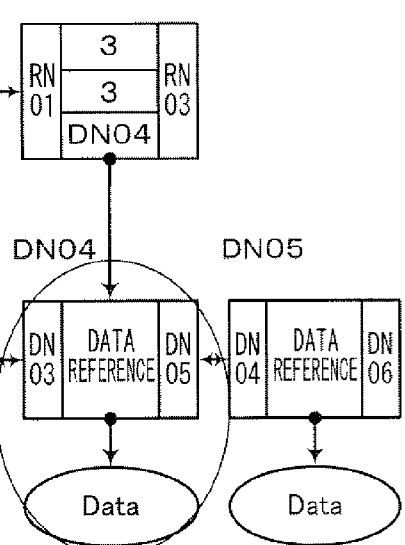
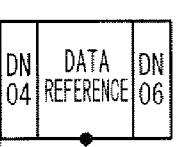

FIG. 30
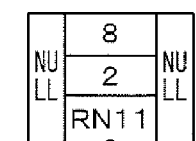
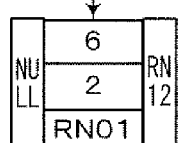
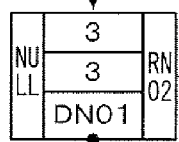
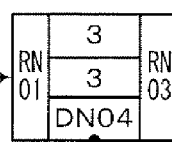
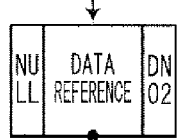
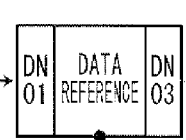
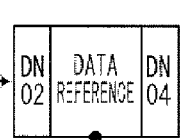
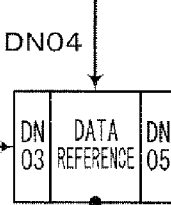
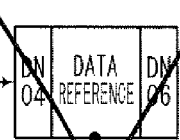
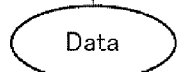
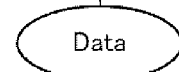
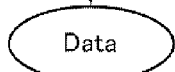
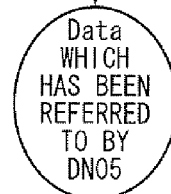
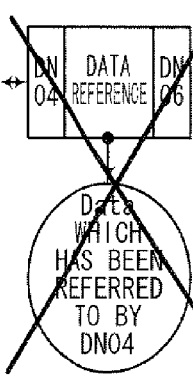

FIG. 32
RN21
RN11
RN01
RN02
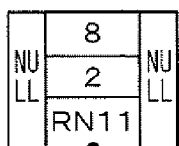
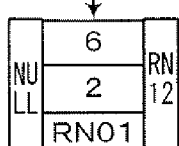
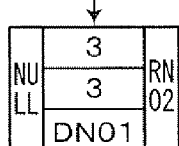
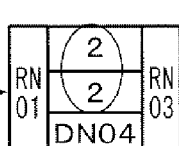
DN01  DN02  DN03  DN04  DN06
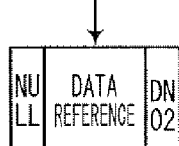 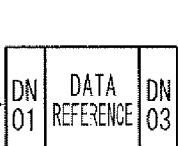 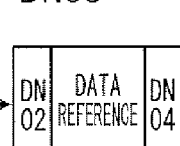 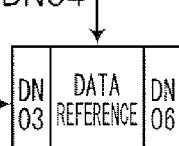 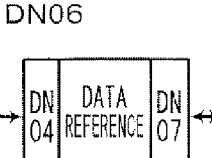
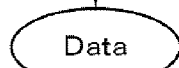 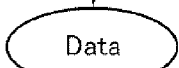 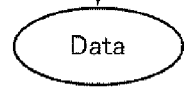 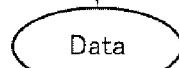 

F I G. 3 3
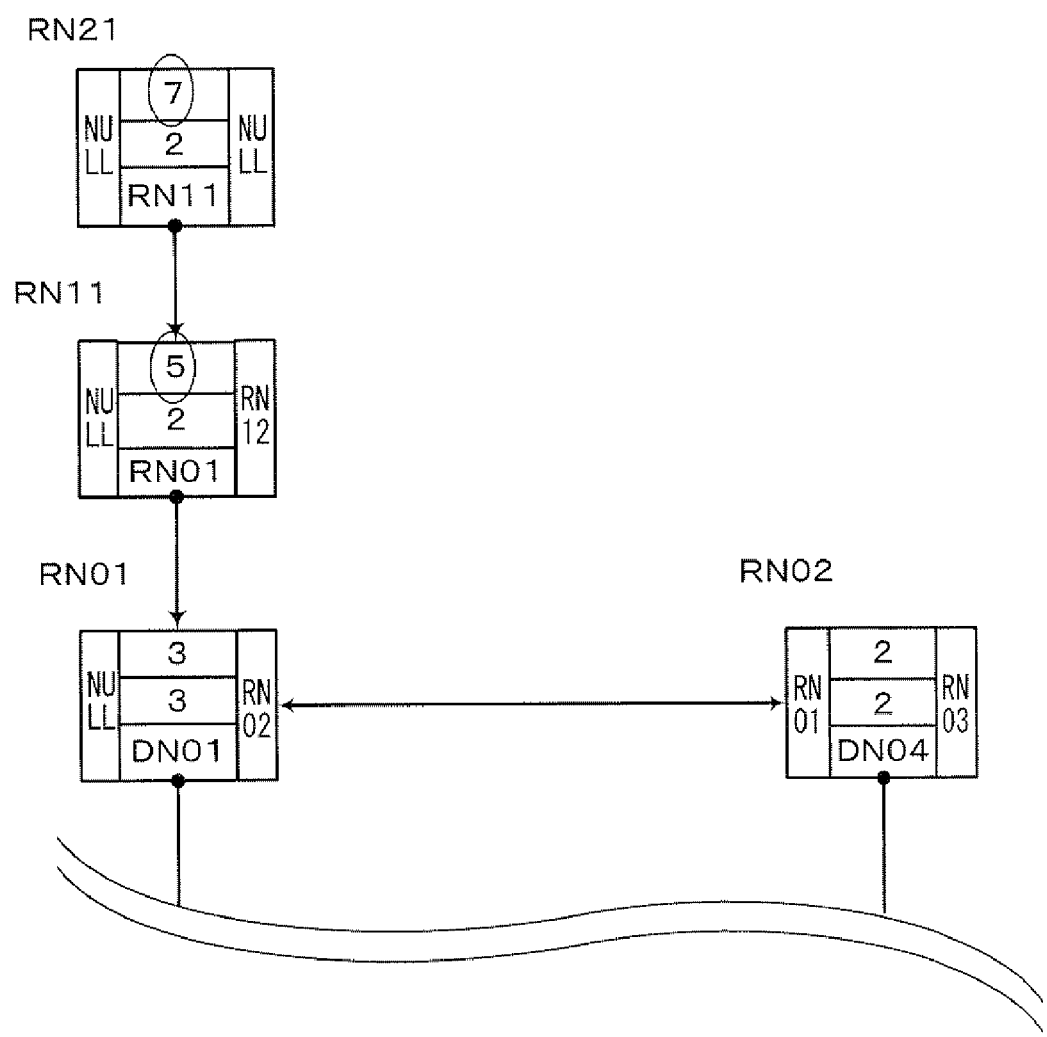

FIG. 35
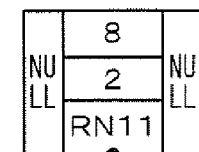
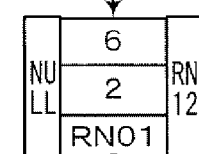
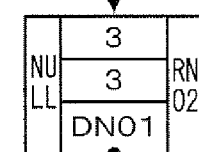
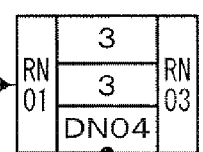
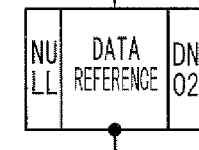
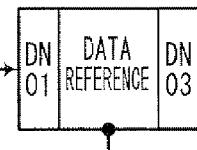
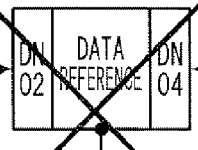
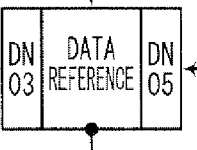
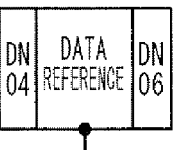

FIG. 36
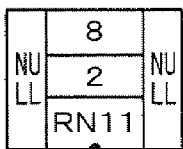
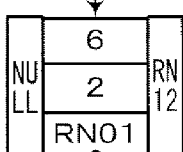
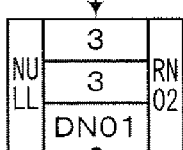
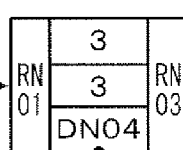
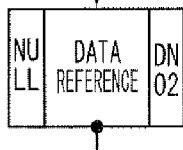
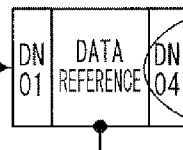
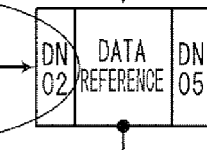
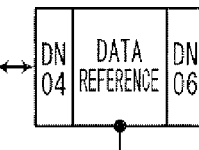
UPDATE OF THE REFERENCE F I G. 4 0
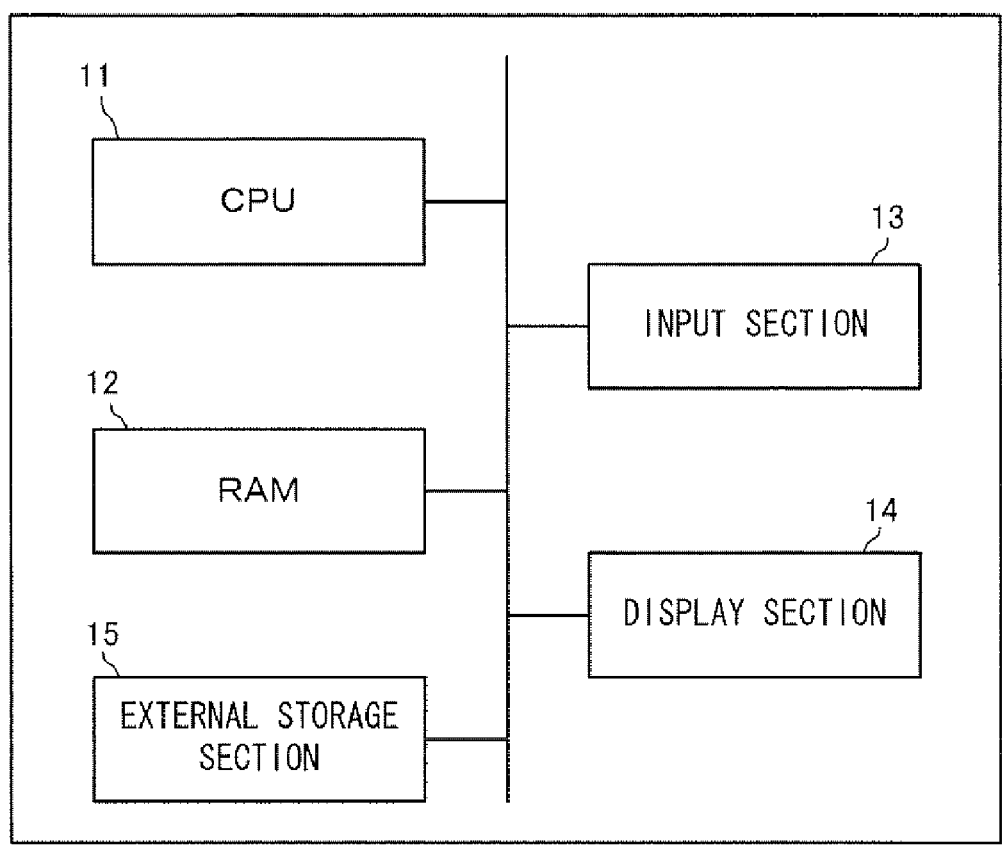

F I G. 5 2
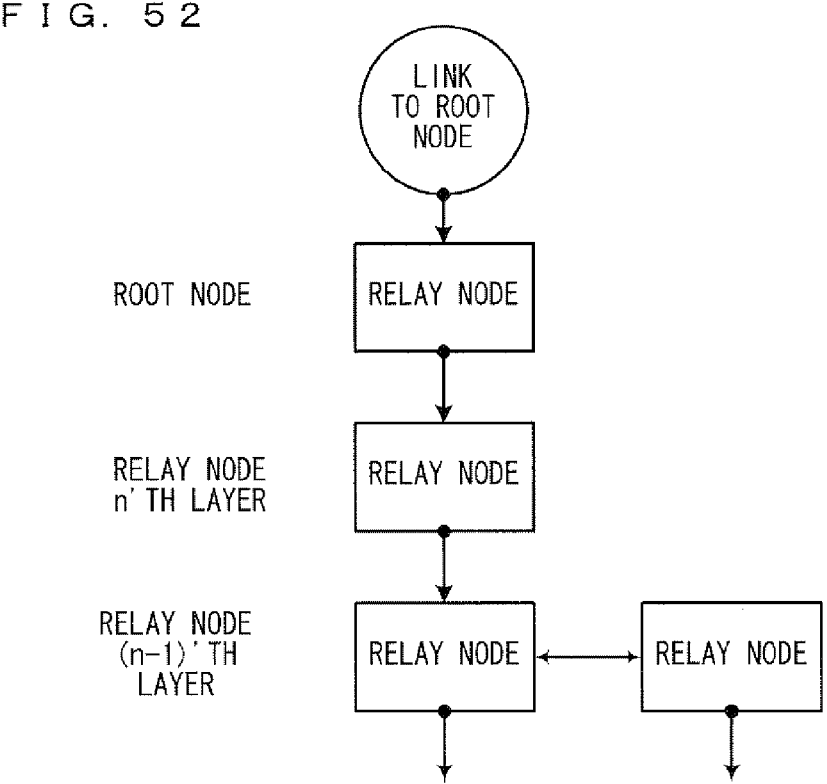
F I G. 5 3
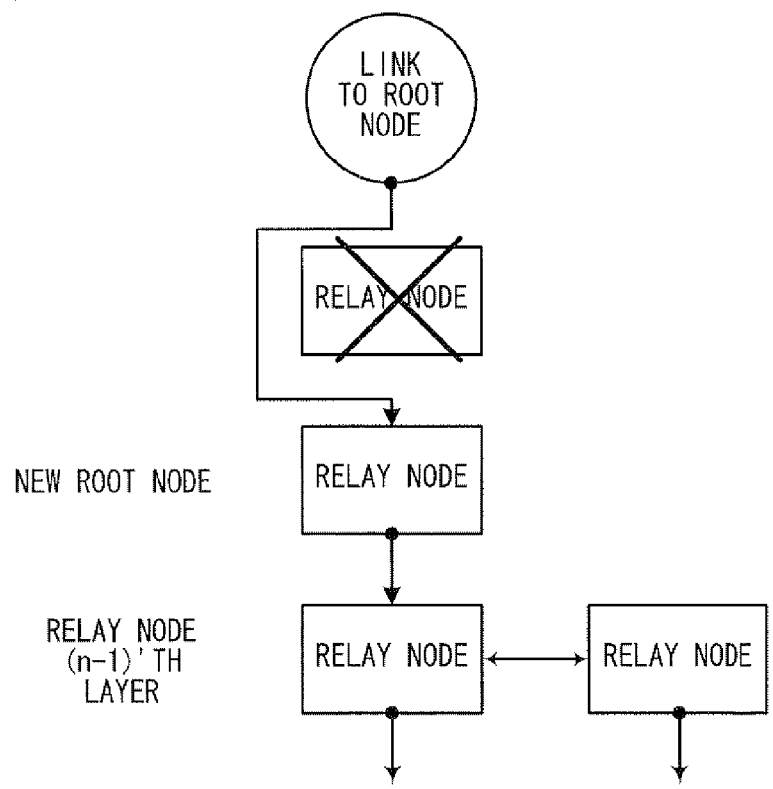

COMPUTER READABLE STORAGE MEDIUM HAVING DATA PROCESSING PROGRAM RECORDED THEREON AND DATA PROCESSING APPARATUS

CROSS REFERENCE TO RELATED APPLICATION

The disclosure of Japanese Patent Application No. 2008-153391, filed on Jun. 11, 2008, is incorporated herein by reference.

BACKGROUND

1. Field

Example embodiments of the present invention relate to a computer readable storage medium having a data operation program for data having a list structure recorded thereon, and a data processing apparatus; and more specifically to a computer readable storage medium having a data processing program for executing data search, addition and delete processing for a sorted linked list, and a data processing apparatus.

2. Description of the Background Art

Conventionally, there is a data structure referred to as a "skip list", which is devised as a substitute for a so-called balanced tree (for example, "UNIX MAGAZINE", January 1999, pp. 68-80, published by Kabushiki Kaisha ASCII; herein after, referred to as "Non-patent document 11"). As compared to a balanced tree, a skip list is advantageous in being a simpler data structure and in being mountable more easily. FIG. 54 shows an exemplary data structure of such a skip list. As shown in FIG. 54, a skip list is a linked list having a plurality of pointers. In other words, a skip list has layers of lists. The lowest layer is a usual sorted linked list. The upper layers act like an "express train" owing to the plurality of pointers. The number of pointers included in each element is determined using a predetermined value of probability p ($0 \leq p \leq 1$) and random numbers when each element is assigned (added). In the skip list, the i'th pointer from the bottom of each element represents the next element having i or a larger number of pointers. In addition, as shown in FIG. 54, the skip list has special elements, which are a "header" representing the first element of the skip list and a "NIL" representing the final element of the skip list.

In the skip list, in order to search for a target element, scanning is performed from the first element of the skip list until the final element among the elements of a value which is equal to, of a smaller than, the target element. FIG. 55 shows a search path for searching for a "19" element as a search target. In FIG. 55, a search is started from the highest layer of the "header". When the value of the search target ("19") is larger than the value of the element indicated by the pointer ("6"), the pointers of the same height are searched for sequentially. When the search in this layer reaches "NIL", the search is transferred to the next lower layer, and the pointes in this layer are searched for sequentially (searched for as "6"→"25"). When the value of the search target is smaller than, or equal to, the value of the element indicated by the pointer, the search is not transferred to the next element and transferred to the next lower layer, and the pointers in this layer are searched for sequentially (the search is not transferred to the element of "25" but is transferred to the next lower layer of the element of "16"). Such a search is continued, and when the search reaches the lowest layer, the element immediately to the right thereof is the desired element. If the value of this element matches the value of the search target, the search is successful; where as if the values do not match each other, the search fails. In this manner, unlike a sequential search from the first element, the skip list allows the intermediate elements to be skipped. The average calculation amount required for the search by the skip list is O (log n), which is the same as that required by the balanced tree.

However, the above-described skip list disclosed in Non-patent document 1 has the following problems First, the specifications of the skip list do not allow an access to a position specified by the number of elements from the beginning, for example, an access to "the n'th data from the beginning" (herein after, such an access will be referred to as an "index access"). Namely, in the skip list, each element has its own data and information regarding "to which element each element is linked (pointer)", but does not have information regarding "at which position each element is positioned from the beginning". Therefore, the structure of the skip list does not allow the index access.

The number of pointers included in each element is determined using random numbers as described above, and the order in the skip list depends on the performance of the random numbers. Theoretically, the order in the skip list is O (log n), which is the same as that in the balanced tree, but when the random numbers become unbalanced, the order may be deteriorated. There may be a case where the order is always worst.

When only the elements having a large number of pointers are deleted, or when only the elements having a small number of pointers are deleted, the above-described performance of O (log n) cannot be provided. For example, referring to FIG. 54, when only the low elements (elements having a small number of pointers) are deleted, the number of elements which can be skipped is decreased. As a result, the performance of O (logon cannot be provided. When only the high elements (elements having a large number of pointers) in FIG. 54 are deleted, there is no significant difference from a simple linked list.

SUMMARY

Therefore, an aspect of the present example embodiments of the invention is to provide a computer readable storage medium having recorded thereon a data processing program for creating data having a data structure, the search performance of which is not significantly changed even by data addition or deletion, and a data processing apparatus.

The present example embodiments of the invention have the following features to attain the aspect mentioned above. The reference numerals, additional explanation, and the like in parentheses in this section of the specification indicate the exemplary correspondence with the embodiments described later provided for easier understanding of the present example embodiments of the invention, and do not limit the present example embodiments of the invention in any way.

A first aspect of the present example embodiments of the invention is directed to a computer readable storage medium having stored thereon a data processing program for causing a computer of a predetermined information processing apparatus to execute a layered list structure generation step of generating a layered list structure which is a data structure formed of a plurality of layers. The layered list structure includes a data element layer which includes a plurality of data elements, each including at least one of a substance of predetermined data and information indicating a position on a memory at which the substance of the predetermined data is stored, and is structured as a linked list in which the plurality of data elements are associated with one another and thus ordered; and a relay node layer which is positioned above the data element layer and includes a plurality of relay nodes, each being associated with one of elements in a layer immediately below. The relay node layer is further divided into a plurality of relay node layers; in each relay node layer, the relay nodes are ordered in accordance with the order of the elements in the layer immediately below; and in each relay node layer, the relay nodes ordered adjacent to each other are associated with each other.

According to the first aspect, a data structure providing search performance which is improved and is not changed much even when data is added or deleted can be used.

In a second aspect based on the first aspect, the data processing program causes the computer to further execute a data addition step (S41 through S44) of generating a new data element associated with a data element ordered at a tail of the data element layer, and adding the new data element to the data element layer so as to be ordered at the tail thereof.

According to the second aspect, data can be added to the Layered list structure while the processing load of the information processing apparatus or the like is alleviated.

In a third aspect based on the second aspect, the data processing program causes the computer to further execute a child node quantity determination step (S64) of determining, as a result of the addition of the data element, whether the number of child nodes, from the element which is in a layer immediately lower than each relay node layer and is associated with the relay node ordered at the tail in the each relay node layer until the element ordered at the tail of the layer including the associated element, has exceeded a first predetermined value; and a relay node addition step (S45, S91) of, when the number of the child nodes is determined to have exceeded the first predetermined value in the child node quantity determination step, adding a new relay node immediately subsequent to the relay node ordered at the tail and associating the added relay node with one of the child nodes.

According to the third aspect, data can be added such that the inter-relay node intervals do not become unbalanced, and data can be added while the search performance of the layered list structure is maintained.

In a fourth aspect based on the first aspect, the data processing program causes the computer to further execute a data insertion step (S82 through S96) of inserting a new data element at a predetermined position of the data element layer and associating the new data element with a data element ordered adjacent to the position for insertion.

According to the fourth aspect, data can be added while the search performance of the layered list structure is maintained.

In a fifth aspect based on the fourth aspect, the data processing program causes the computer to further execute a child node quantity determination step (S64) of determining, as a result of the insertion of the data element, whether the number of child nodes, from an element a layer immediately lower than, and associate with, a predetermined relay node until an element immediately before an element in the immediately lower layer associated with an adjacent relay node which is ordered immediately subsequent to the predetermined relay node in the layer including the predetermined relay node, has exceeded a first predetermined value; and a relay node addition step (S45, S91) of, when the number of the child nodes is determined to have exceeded the first predetermined value in the child node quantity determination step, inserting a new relay node between the predetermined relay node and the adjacent relay node and associating the inserted new relay node with one of the child nodes.

In a sixth aspect based on the third aspect, the relay node addition step associates a child node ordered at the center of the child nodes with the relay node to be the added or inserted.

In a seventh aspect based on the fifth aspect, the relay node addition step associates a child node ordered at the center of the child nodes with the relay node to be added or inserted.

According to the fifth through seventh aspects, data can be inserted such that the inter-relay node intervals do not become unbalanced, and data can be inserted while the search performance of the layered list structure is maintained.

In an eighth aspect based on the fourth aspect, the data elements are each formed by associating, as a pair, a data field, which is a substance of the predetermined data, and a data node having the information indicating a position on the memory at which the data field is stored; the linked list is formed by associating the data nodes ordered adjacent to each other in the data element layer; the relay nodes are associated with the data nodes; and when the data node ordered in the data element layer at a position to which the new data element is to be inserted is associated with one of the relay nodes, the data insertion step associates the data field associated with the data node at the position for insertion with a new data node, associates a new data field with the data node at the position for insertion, and inserts the data element including the new data node so as to be immediately subsequent to the data node at the position for insertion.

According to the eighth aspect, it is not necessary to change the association between the existing data node and the relay node, and the processing load on the information processing apparatus for the processing at the time of data addition can be alleviated.

In a ninth aspect based or the second aspect, the data processing program causes the computer to further execute a root node setting step (S69, S70) of, when there are a plurality of relay nodes in the highest relay node layer among the divided relay node layers, generating a new relay node associated with a first relay node in the highest relay node layer and setting a new relay node layer including the new relay node as the highest relay node layer.

In a tenth aspect based on the fourth aspect, the data processing program causes the computer to further execute a root node setting step (S69, S70) of, when there are a plurality of relay nodes in the highest relay node layer among the divided relay node layers, generating a new relay node associated with a first relay node in the highest relay node layer and setting a new relay node layer including the new relay node as the highest relay node layer.

According to the ninth and tenth aspects, data can be added or Inserted while the search performance of the layered list structure is maintained.

In an eleventh aspect based on the first aspect, the data processing program causes the computer to further execute a data deletion step (S101 through S111) of deleting a predetermine data element and adjusting the relay node associated with the deleted data element so as to maintain the layered list structure.

According to the eleventh aspect, data can be deleted while the search performance of the layered list structure is maintained.

In a twelfth aspect based on the eleventh aspect, the data elements are each formed by associating, as a pair, a data field, which is a substance of the predetermined data, and a data node having the information indicating a position on the memory at which the data field is stored; the linked list is formed by associating the data nodes ordered adjacent to each other in the data element layer; the relay nodes are associated with the data nodes; and when the data node ordered in the data element layer at a position from which the data element is to be deleted is associated with one of the relay nodes, the data deletion step exchanges the data fields between the data node at the position for deletion and the data node ordered immediately subsequent to the data node at the position for deletion, and deletes the data element ordered immediately subsequent to the data node at the position for deletion.

According to the twelfth aspect, it is not necessary to change the association between the existing data node and the relay node, and the processing load on the information processing apparatus for the processing at the time of data deletion can be alleviated.

In a thirteenth aspect based on the eleventh aspect, the data processing program causes the computer to further execute a child node quantity determination step (S124) of determining, as a result of the deletion of the data element in the data deletion step, whether the number of child nodes, from an element in a layer immediately lower than, and associated with, a predetermined relay node until an element immediately before an element in the immediately lower layer associated with an adjacent relay node which is ordered immediately subsequent to the predetermined relay node in the layer including the predetermined relay node, has become equal to, or smaller than, a second predetermined value; an upper node determination step (S125) of, when the number of the child nodes is determined to have become equal to, or smaller than, the second predetermined value in the child node quantity determination step, determining whether or not there is a relay node, in a layer immediately above the predetermined relay node, which is associated with the predetermined relay node; a relay node deletion step (S133) of, when it is determined that there is a relay node, in the layer immediately above the predetermined relay node, which is associated with the predetermined relay node in the upper node determination step, deleting a relay node ordered immediately subsequent to the predetermined relay node in the layer including the associated relay node; whereas when it is determined that there is no relay node, in the layer immediately above the predetermined relay node, which is associated with the predetermined relay node, deleting the predetermined relay node.

In a fourteenth aspect based on the eleventh aspect, the data processing program causes the computer to further execute a child node quantity determination step (S124) of determining, as a result of the deletion of the data element in the data deletion step, whether the number of child nodes, from an element in a layer immediately lower than, and associated with, a predetermined relay node until an element immediately before an element in the immediately lower layer associated with an adjacent relay node which is ordered immediately subsequent to the predetermined relay node in the layer including the predetermined relay node, has become equal to, or smaller than, a second predetermined value; an upper node determination step (S125) of, when the number of the child nodes is determined to have become equal to, or smaller than, the second predetermined value in the child node quantity determination step, determining whether or not there is a relay node, in a layer immediately above the predetermined relay node, which is associated with the predetermined relay node; a reference node setting step (S126 through S129) of, when it is determined that there is a relay node, in the layer immediately above the predetermined relay node, which is associated with the predetermined relay node in the upper node determination step, setting a relay node ordered immediately subsequent to the predetermined relay node in the layer including the associated relay node as a reference node; whereas when it is determined that there is no relay node, in the layer immediately above the predetermined relay node, which is associated with the predetermined relay node, setting the predetermined relay node as the reference node; an adjustment quantity determination step (S130 of determining whether or not the number of child nodes, from an element in a layer immediately lower than, associated with, a relay node ordered immediately previous to the reference node until an element immediately before an element in the immediately lower layer associated with a relay node ordered immediately subsequent to the reference node, is equal to, or smaller than, a third predetermined value; and a child node adjustment step (S131 through S136) of, when it is determined that the number of the child nodes is equal to, or smaller than, the third predetermined value in the adjustment quantity determination step, deleting the reference node; whereas when it is determined that the number of the child nodes is larger than the third predetermined value, changing the association between the child nodes and the reference node.

In a fifteenth aspect based on the fourteenth aspect, the child node adjustment step changes the association between the child nodes and the reference node, such that the number of child nodes, from an element in a layer immediately lower than, and associated with, a relay node ordered immediately previous to the reference node in the layer including the reference node until an element immediately before an element in the immediately lower layer associated with the reference node is equal to the number of child nodes from the element in the immediately lower layer associated with the reference node until an element immediately before an element in the immediately lower layer associated with a relay node ordered immediately subsequent to the reference node in the layer including the reference node.

According to the thirteenth through fifteenth aspects, data can be deleted such that the inter-relay node intervals do not become unbalanced, and data can be deleted while the search performance of the layered list structure is maintained.

In a sixteenth aspect based on the first aspect, the data processing program causes the computer to further execute a child node quantity maintaining step (S63, S68, S131, S135) of storing, in association with each relay node, child node information indicating the number of child nodes, from an element in a layer immediately lower than, and associated with, the each relay node until an element immediately before an element in the immediately lower layer associated with an adjacent relay node ordered immediately subsequent to the each relay node in the layer including the each relay node.

According to the sixteenth aspect, the relay nodes are provided with information on the child nodes, so that adjustment for maintaining the search performance when data is added or deleted can be conducted more easily.

A seventeenth aspect of the present example embodiments of the invention is directed to a data processing apparatus, which is a predetermined information processing apparatus, comprising layered list structure generation means for generating a layered list structure which is a data structure formed of a plurality of layers. The layered list structure includes a data element layer which includes a plurality of data elements, each including at least one of a substance of predetermined data and information indicating a position on a memory at which the substance of the predetermined data is stored, and is structured as a linked list in which the plurality of data elements are associated with one another and thus ordered; and a relay node layer which is positioned above the data element layer and includes a plurality of relay nodes, each being associated with one of elements in a layer immediately below. The relay node layer is further divided into a plurality of relay node layers; in each relay node layer, the relay nodes are ordered in accordance with the order of the elements in the layer immediately below; and in each relay node layer, the relay nodes ordered adjacent to each other are associated with each other.

An eighteenth aspect of the present example embodiments of the invention is directed to a data structure to be stored on storage means of a predetermined information processing apparatus, comprising a data element layer which includes a plurality of data elements, each including at least one of a substance of predetermined data and information indicating a position on a memory at which the substance of the predetermined data is stored, and is structured as a linked list in which the plurality of data elements are associated with one another and thus ordered; and a relay node layer which is positioned above the data element layer and includes a plurality of relay nodes, each being associated with one of elements in a layer immediately below. The relay node layer is further divided into a plurality of relay node layers; in each relay node layer, the relay nodes are ordered in accordance with the order of the elements in the layer immediately below; and in each relay node layer, the relay nodes ordered adjacent to each other are associated with each other.

According to the seventeenth and eighteenth aspects, a data structure having a list structure providing search performance which is not changed much even when data is added, inserted or deleted can be provided.

These and other, features, aspects and advantages of the present example embodiments of the invention will become more apparent from the following detailed description of the present example embodiments of the invention when taken in conjunction with the accompanying drawings.

BRIEF DESCRIPTION OF THE DRAWINGS

FIG. 2 is a view for explaining terms used for nodes according to the embodiment;

FIG. 28 shows an overview of delete processing in the layered list structure;

FIG. 30 shows an overview of the delete processing in the layered list structure;

FIG. 32 shows an overview of the delete processing in the layered list structure;

FIG. 33 shows an overview of the delete processing in the layered list structure;

FIG. 35 shows an overview of the delete processing in the layered list structure;

FIG. 36 shows an overview of the delete processing in the layered list structure;

FIG. 40 is a block diagram showing a structure of an information processing apparatus according to an embodiment of the present invention;

FIG. 52 is a flowchart showing processing executed when the determination result in step S123 in FIG. 50 is NO;

FIG. 53 is a flowchart showing the processing executed when the determination result in step S123 in FIG. 50 is NO;

DESCRIPTION OF EXAMPLE EMBODIMENTS

Hereinafter, embodiments of the present invention will be described with reference to the drawings. The following embodiments do not limit the present invention in any way.

Figure 1:
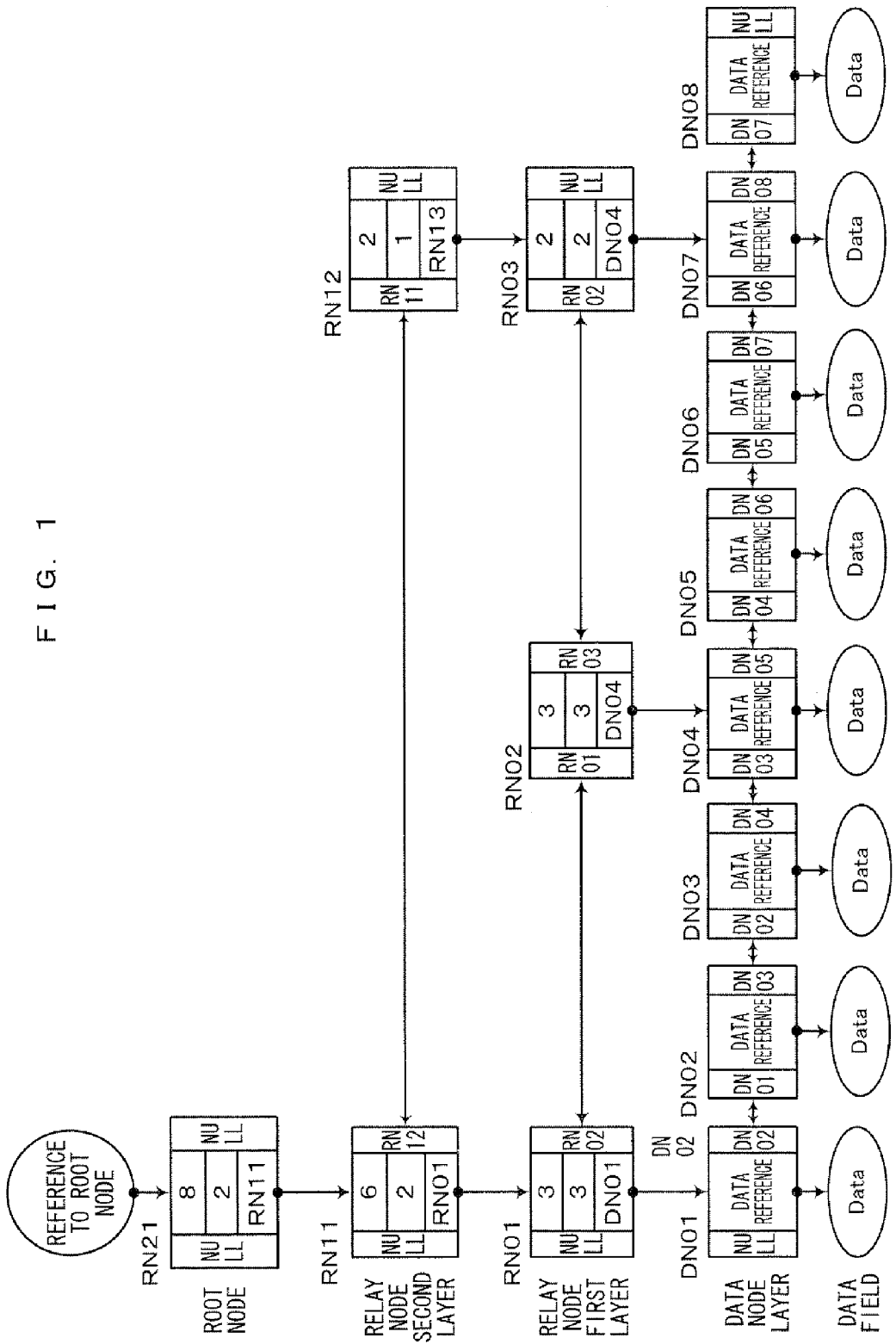
FIG. 1 shows an exemplary layered list structure according to an embodiment of the present invention.

First, a data structure used in data operation processing according to this embodiment will be described. FIG. 1 shows an exemplary data structure according to this embodiment (herein after, referred to as a "layered list structure"). A layered list structure has, in the lowest layer, a linked list which is linked to an adjacent node (as a result, the nodes are linked in a line and ordered, so that each node has a position in the order). On layers above the lowest layer, elements referred to as "relay nodes" having a role of binding a plurality of pieces of data are provided in layers.

First, terms used in this embodiment for each element shown in FIG. 1 will be described. In the layered list structure according to this embodiment, elements in the lowest layer represented by ellipses in FIG. 1 are each referred to as a "data field". Elements, other than the data fields, represented by quadrangles are each referred to as a "node". There are two types of nodes, i.e., data nodes and relay nodes. A data node is directly associated with a data field. A relay node is located in a layer above the data nodes, and a plurality of relay node layers are provided. Among the relay nodes, a node in the highest layer is especially referred to as a "root node". In FIG. 1, the arrows linking the nodes and data fields indicate "reference", which will be described later.

In the following description, each data node is represented as DNnn (nn is an integer starting from "01"; this is applicable throughout this specification), and each relay node (including the root node) is represented as RNnn (RN stands for Relay Node).

Regarding the layers in FIG. 1, the layer having the data fields (the lowest layer in FIG. 1) is referred to as a "data field layer", and the layer immediately above the data field layer is referred to as a "data node layer". The layers having relay nodes are referred to as, sequentially from the bottom, a "relay node first layer", a "relay node second layer", . . . a "relay node n'th layer". The layer having the root node is simply referred to as a "root node" (because the highest layer has one node on principle).

In the following description, the term "index number" is used to mean a position of data in the layered list structure. This term indicates a position in the order from the beginning, for example, "n'th from the beginning".

Next, the terms used in the following description for representing nodes adjacent to a predetermined node used as the reference point will be described. FIG. 2 explains the terms of nodes adjacent to a predetermined node used as the reference-point. As shown in FIG. 2, the predetermined node used as the reference point is referred to as a "current node". This means a node which is currently a processing target in the processing described later. A node to the left of, and in the same layer as, the current node (namely, the immediately previous node) is referred to as a "previous node". A node to the right of, and in the same layer as, the current node (namely, the immediately subsequent node) is referred to as a "subsequent node". A node in a layer which is immediately below the current node and is set as a node which the current node "refers" to (directly associated with the current node) is referred to as a "first node".

Figure 3:
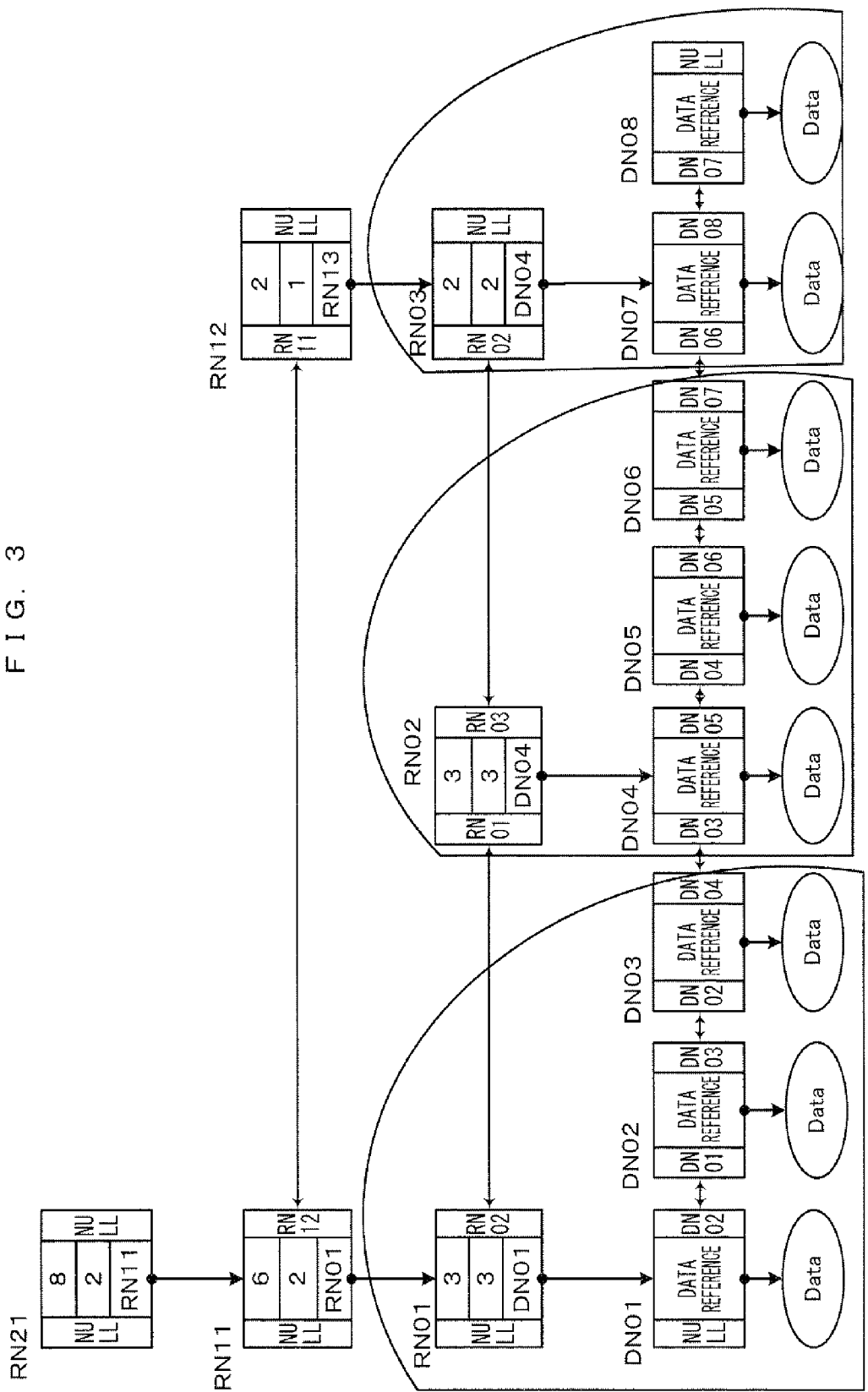
FIG. 3 shows the parent-child relationship between nodes in the layered list structure according to the embodiment.
Figure 4:
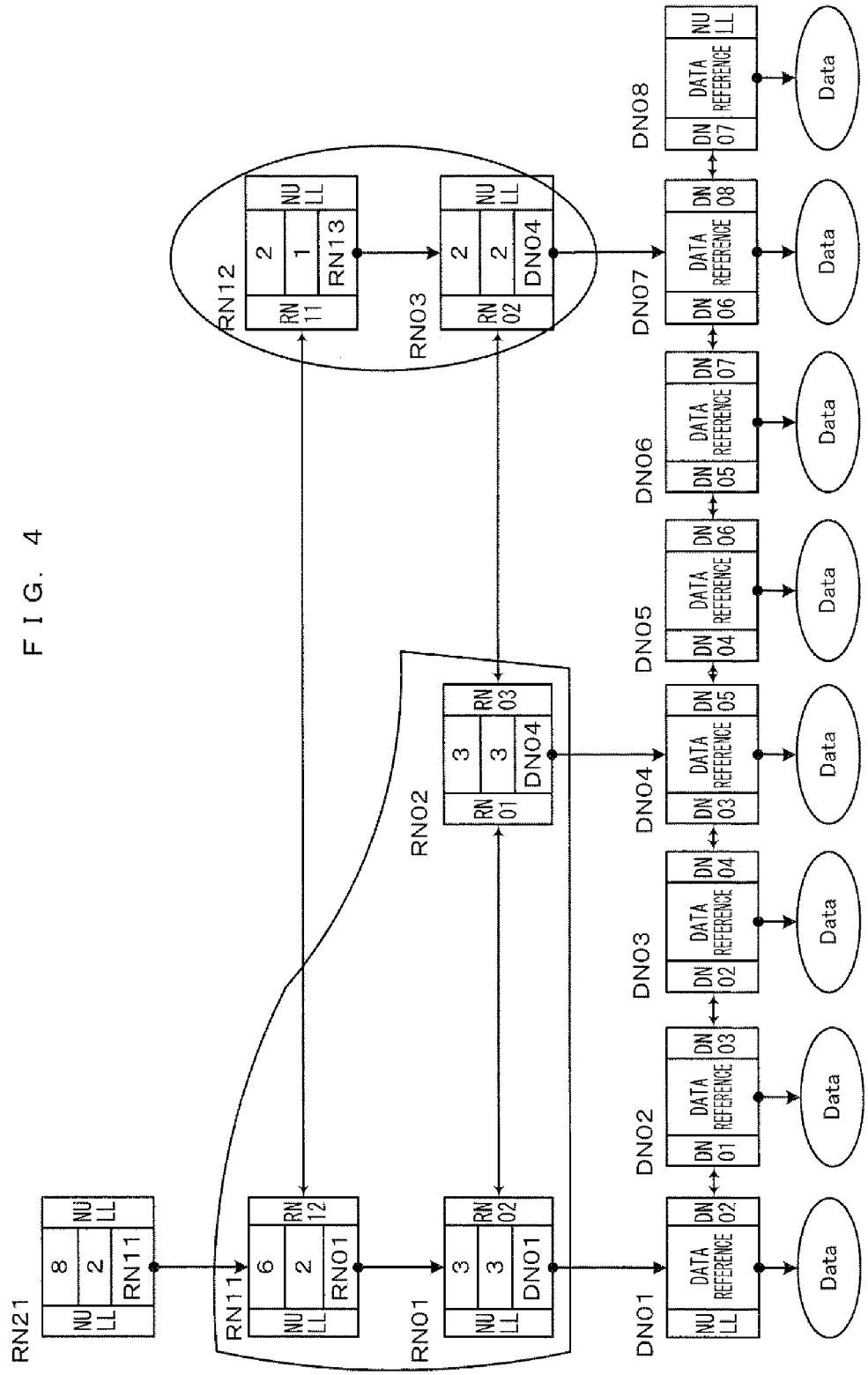
FIG. 4 shows the parent-child relationship between the nodes in the layered list structure according to the embodiment.
Figure 5:
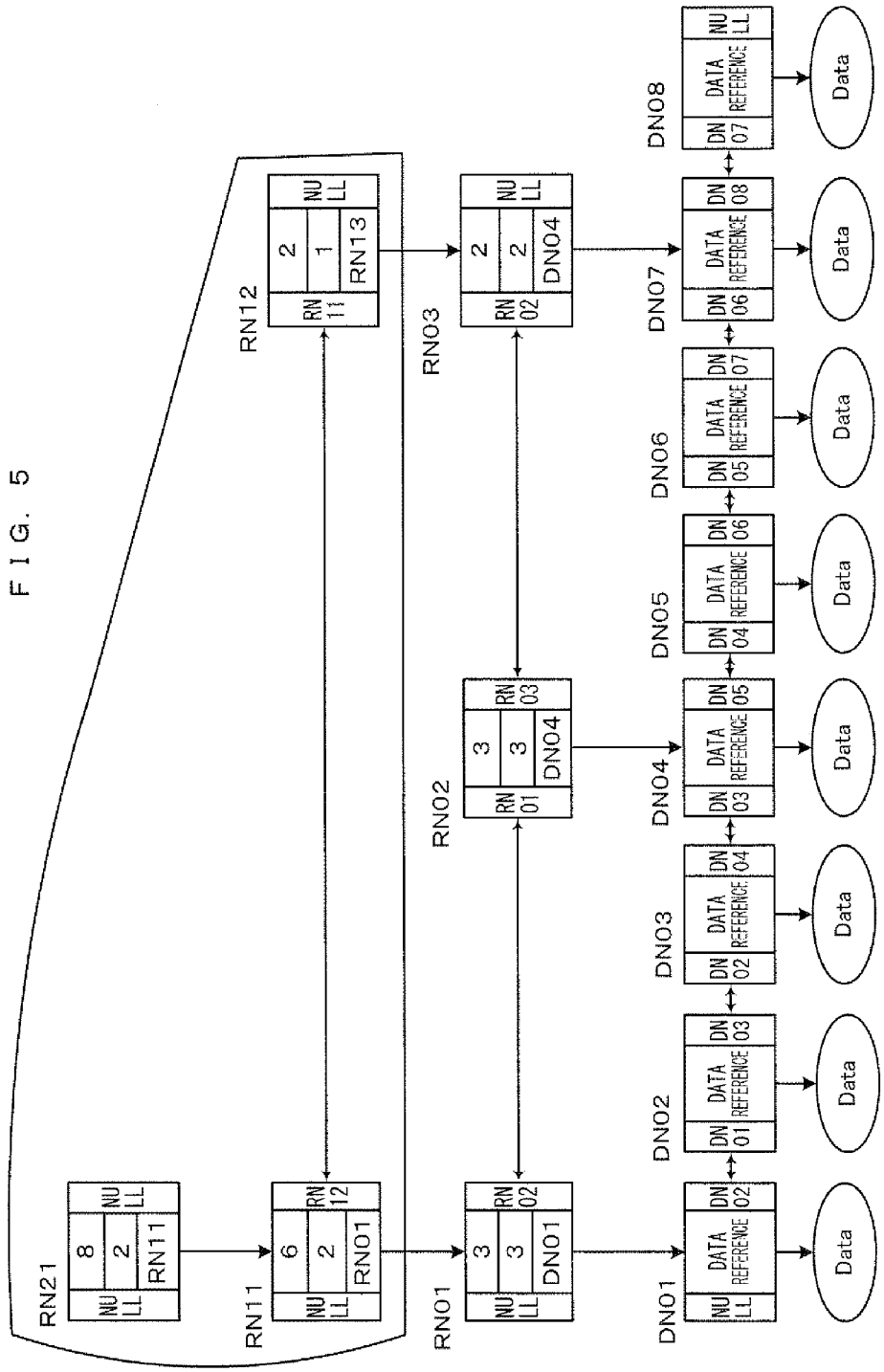
FIG. 5 shows the parent-child relationship between the nodes in the layered list structure according to the embodiment.

A node in a layer immediately above the current node is referred to as a "parent node", and a node in a layer immediately below the current node is referred to as a "child node". This parent-child relationship will be described with reference to FIG. 3 through FIG. 5. FIG. 3 through FIG. 5 illustrate the parent-child relationship between the nodes in this embodiment. FIG. 3, shows the parent-child relationship between data elements (data field layer) and the relay node first layer. In FIG. 3, where RN01 is the reference point (current node), the nodes called "child nodes" are DN01 through DN03. Among these child nodes, DN01, which is set as the node which is directly referred to by RN01, is also a first node mentioned above. Similarly, where RN02 is the current node, the nodes called "child nodes" are DN04 through DN06. DN04 is also a first node. By contrast, based on the data nodes, for DN01 through DN03, RN01 is the parent node. The parent node of DN04 through DN06 is RN02. Namely, a "child node" is each of the nodes, among the nodes in the layer immediately below the current node, from the first node until the node immediately before the node referred to by the node subsequent to the current node. A "parent node" is a node in the layer immediately above a node of interest. When the node of interest is a first node, the parent node is also the node which refers to the node of interest. When the node of interest is not a first node, the parent node is the node which refers to the first node, among the first nodes before the node of interest, which is closest to the node of interest. A parent node can also be described as follows in relation with the processing described later. Since a search is performed from top to bottom in the layered list structure in this embodiment, a parent node is a "relay node last accessed in the layer immediately above the node of interest".

FIG. 4 shows the parent-child relationship between the relay node first layer and the relay node second layer. In FIG. 4, RN11 has the parent-child relationship with RN01 and RN02, and RN12 has the parent-child relationship with RN03. FIG. 5 shows the parent-child relationship between the relay node second layer and the relay node third layer (root node). In FIG. 5, RN21, which is the root node, has the parent-child relationship with RN11 and RN12 in the relay node second layer.

Next, the content of each element shown in FIG. 1 will be described. First, the data fields positioned in the lowest layer (data field layer) each represent a substance of the data. The data fields are ordered from the left end of FIG. 1. In other words, the data field layer corresponds to an ordered linked list.

Figure 6:
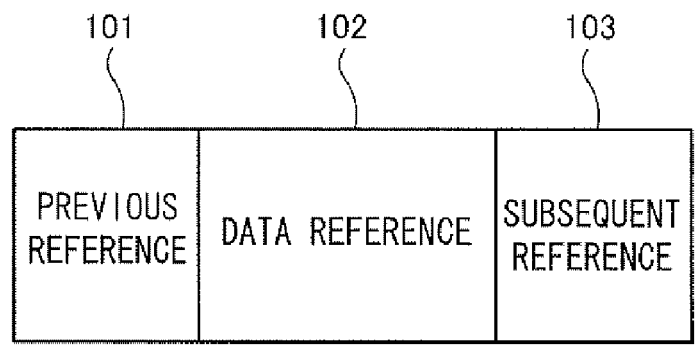
FIG. 6 shows a data node in detail.

A data node has information as shown in FIG. 6. FIG. 6 shows the details of a data node shown in FIG. 1. As shown in FIG. 6, the data node has information of a previous reference 101, a data reference 102 and a subsequent reference 103. Although not shown, the data node also has an identifier for identifying whether the data node itself is a relay node or a data node.

In FIG. 6, the previous reference 101 indicates "reference" to the previous node. In the example of FIG. 1, the previous reference 101 of DN02 indicates a memory address at which DN01 is stored. Namely, based on DN02, the previous node is DN01. When the data node itself is at the left end, the NULL value is set as the previous reference 101.

Herein, the term "reference" has the same meaning as the "reference" used in the JAVA (registered trademark) language. The content thereof, however, may be a pointer used in the C language or the like, for example. Alternatively, the content of the "reference" may be a "link". Namely, the content of the "reference" may be anything which indicates a memory address on a memory such as a RAM or the like at which another element (here, node or data field) is stored. In the following description, this will be represented as "reference".

The data reference 102 indicates "reference" to a data field. In the example of FIG. 1, the data reference 102 of DN02 indicates a memory address at which the second data field from the beginning is stored.

As described above, in this embodiment, a data node and a data field are associated with each other one to one. A set of the data node and the data field thus associated may be referred to as a "data element" in the following description.

The subsequent reference 103 indicates "reference" to the subsequent node described above. In the example of FIG. 1, the subsequent reference 103 of DN02 indicates a memory address at which DN03 is stored. Namely, based on DN02, the subsequent node is DN03. When the data node itself is at the right end, the NULL value is set as the subsequent reference 103.

Figure 7:
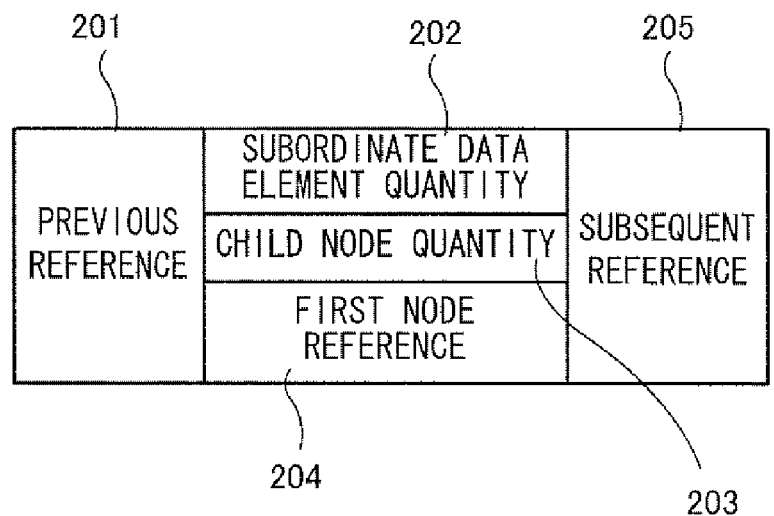
FIG. 7 shows a relay node in detail.

Now, a structure of a relay node will be described. FIG. 7 shows the details of a relay node shown in FIG. 1. The relay node has information of a previous reference 201, a subordinate data element quantity 202, a child node quantity 203, a first node reference 204 and a subsequent reference 205.

The previous reference 201 indicates "reference" to the previous node. In the example of FIG. 1, the previous reference 201 of RN02 indicates a memory address at which RN01 is stored. When the relay node itself is at the left end, the NULL value is set as the previous reference 201.

The subordinate data element quantity 202 indicates the number of data elements which are accessible from the node having the parent-child relationship with the relay node of interest (in the case of a relay node in the relay node first layer, the subordinate data element quantity 202 indicates the number of data elements which are accessible from the relay node itself) (herein after, such a data element will be referred to as a "subordinate data element"). In the example of FIG. 1, the subordinate data elements of RN01 are DN01 through DN03, the subordinate data elements of RN02 are DN04 through DN06, and the subordinate data elements of RN03 are DN07 and DN08. The subordinate data elements of RN11 are DN01 through DN06, and the subordinate data elements of RN12 are DN07 and DN08. The subordinate data elements of RN21, which is a root node, are all the data elements. In other words, the subordinate data element quantity 202 of a relay node is the number of data elements which cannot be referred to by the previous relay node or the subsequent relay node of the node of interest.

The child node quantity 203 is information indicating the number of the child nodes mentioned above. Namely, the child node quantity 203 indicates the number of nodes, from the first node which is referred to by the relay node of interest until the node immediately before the node which is referred to by the subsequent node of the relay node of interest, among the nodes in the layer immediately below the relay node of interest.

The first node reference 204 is information indicating "reference" to the first node mentioned above. In the example of FIG. 1, the first node reference 204 of RN02 indicates a memory address at which DN04 is stored. The first node reference 204 of RN11 indicates a memory address at which RN01 is stored.

The subsequent reference 205 indicates "reference" to the subsequent node. In the example of FIG. 1, the subsequent reference 205 of RN01 indicates a memory address at which RN02 is stored.

Next, the root node will be described. As described above, the root node (RN21 in FIG. 1) is the relay node in the highest layer of the layered list structure. Therefore, the structure of the root node is the same as that of a relay node (as both of the previous reference 201 and the subsequent reference 205, NULL is set). For accessing the layered list structure, the root node is first accessed. The root node can be considered as an entrance of access to the layered list structure. Therefore, "reference" to the root node is defined for an element outside the layered list structure. Hereinafter, the "reference" to the root node (in FIG. 1, the element represented by the circle above the root node) will be referred to as "reference from outside".

Hereinafter, an overview of data processing, specifically, data search, data addition and data deletion processing in the above-described data structure will be described.

Figure 8:
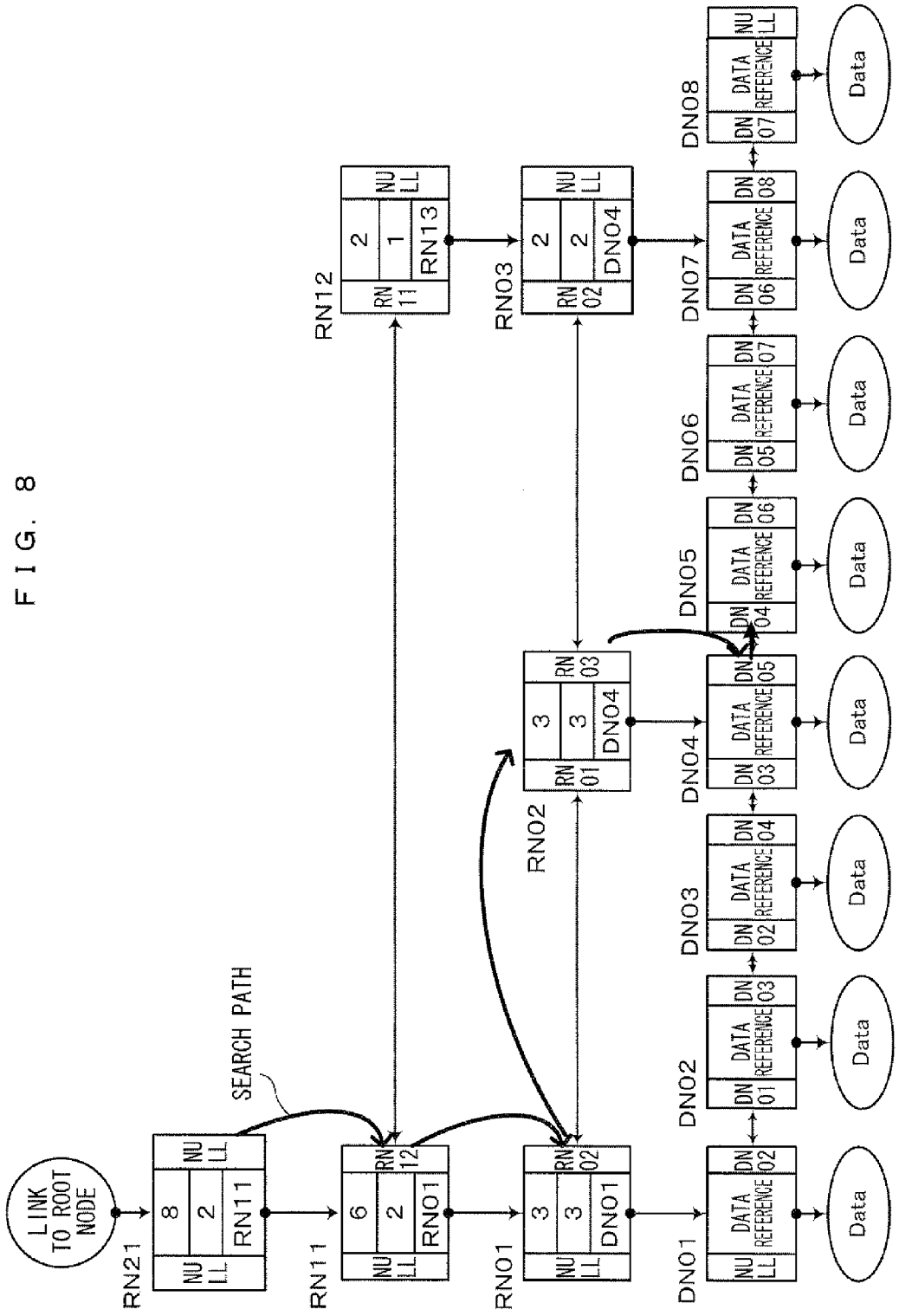
FIG. 8 shows an overview of search processing in the layered list structure.

First, with reference to FIG. 1 and FIG. 8 through FIG. 14, an overview of data search, i.e., index access (access to a specified index number) will be described. As an example, a case where data having an index number of "5", i.e., the fifth data from the beginning in the data structure shown in FIG. 1 is accessed will be described. FIG. 8 shows a search path for accessing the fifth data from the beginning. As shown in FIG. 8, with the layered list structure, a target data element is accessed using the subordinate data element quantity of each node and a variable "offset" described later, while the intermediate data elements are skipped.

For index access, "1" is first set as the variable called "offset". This value also indicates the position in the order from the beginning. As the current node mentioned above, RN21, which is the root node, is set.

Figure 9:
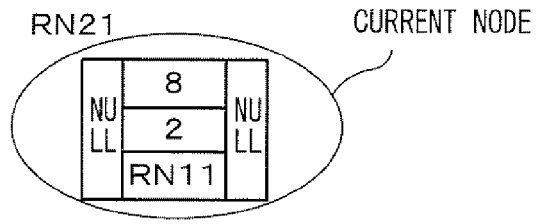
FIG. 9 shows an overview of the search processing in the layered list structure.

After the above settings, the following determination is made on the current node: whether or not a sum of the value of the subordinate data element quantity 202 of the current node and the offset value is larger than the target index number. The current node is RN21. Therefore, as shown in FIG. 9, the subordinate data element quantity "8"+offset "1">index number "5". It is determined that the sum is larger than the target index number.

Figure 10:
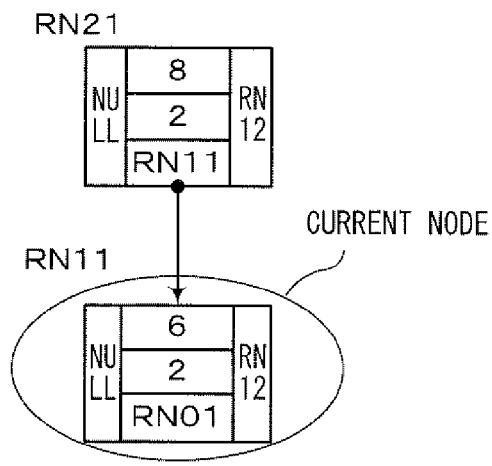
FIG. 10 shows an overview of the search processing in the layered list structure.
Figure 11:
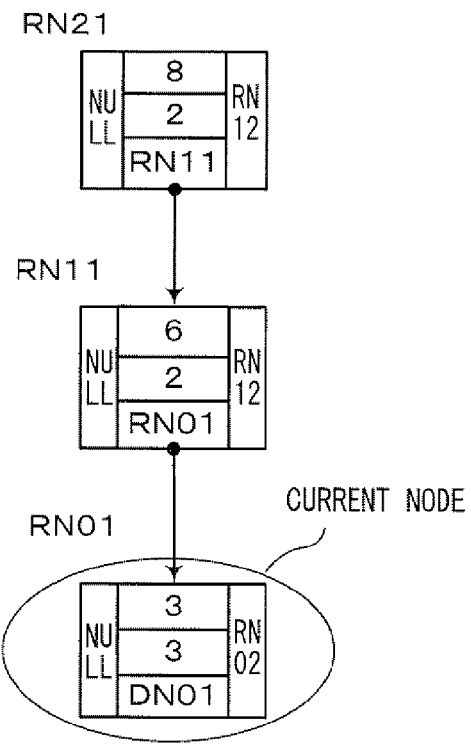
FIG. 11 shows an overview of the search processing in the layered list structure.

When it is determined that the sum is larger than the target index number, a node in the lower layer is set as the current node. In this example, as shown in FIG. 10, RN11 is set as the current node. Then, a determination as above is made again. Now, because the current node is RN11, the subordinate data element quantity "6"+offset "1">index number "5". It is determined that the sum is larger than the target index number. As a result, as shown in FIG. 11, RN01, which Bis in the still lower layer, is set as the current node.

Next, a determination as above is made on RN01. In this case, the subordinate data element quantity "3"+offset "1"<index number "5". It is determined that the index number is larger than the sum.

Figure 12:
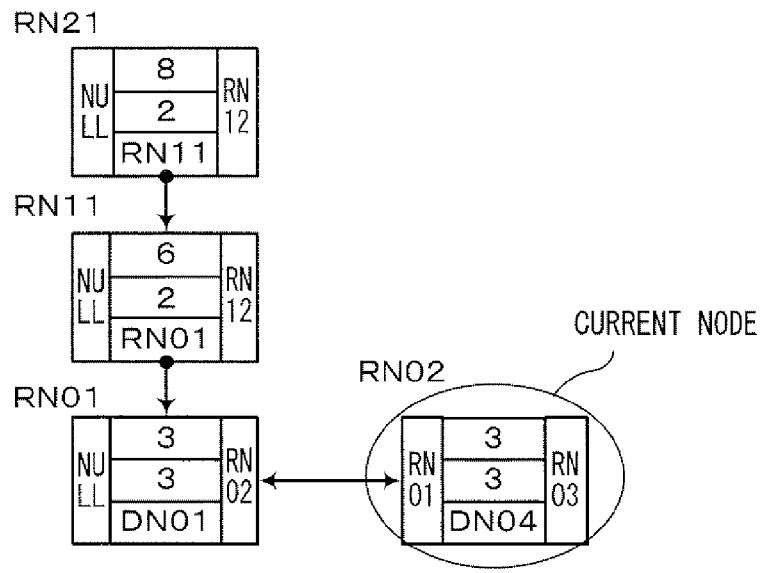
FIG. 12 shows an overview of the search processing in the layered list structure.
Figure 13:
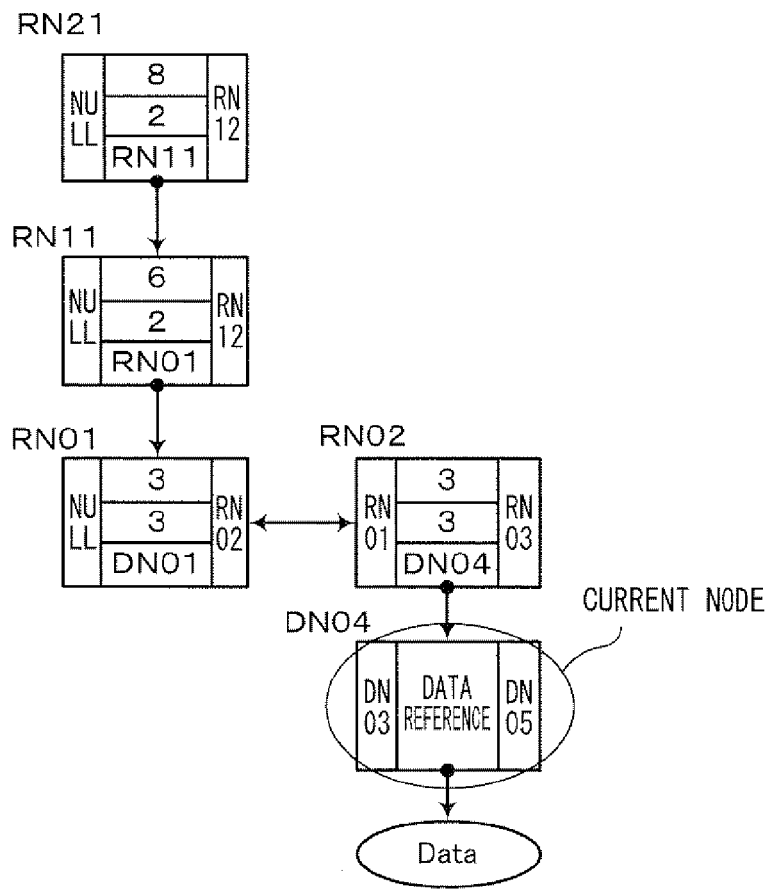
FIG. 13 shows an overview of the search processing in the layered list structure.

When the index number is larger than the sum, a node in the lower layer is not set as the current node. As shown in FIG. 12, RN02, which is the subsequent node in the same layer, is set as the current node. At this time, the value of the subordinate data element quantity 202 of RN01 is added to the "offset" value. A determination as above is made on RN02. The subordinate data element quantity "3"+offset "4">index number "5". It is determined that the sum is Larger than the index number. As a result, as shown in FIG. 13, DN04, which is in the still lower layer, is set as the current node.

Figure 14:
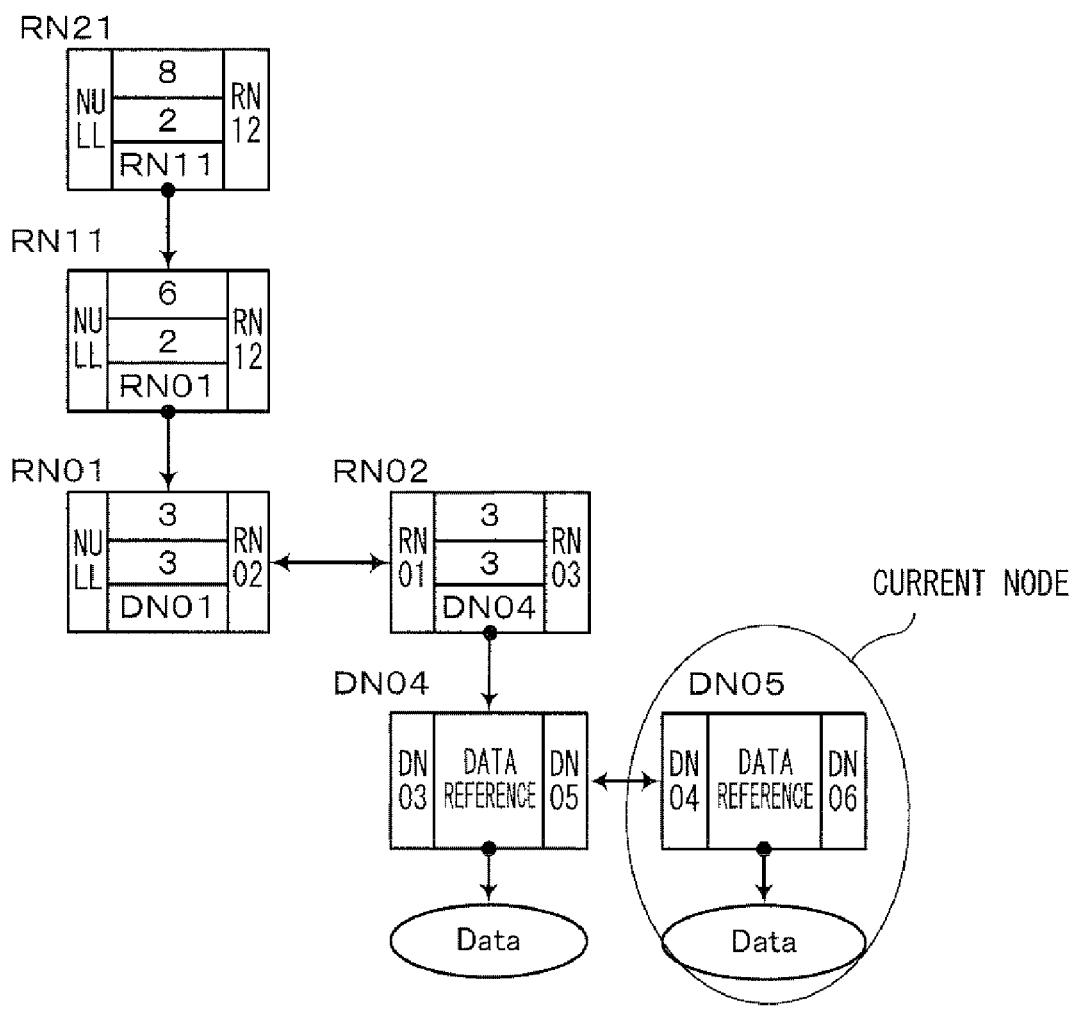
FIG. 14 shows an overview of the search processing in the layered list structure.

DN04 is a data node. Namely, the current node is now lowered to the data node layer. In other words, there is no node in any further lower layer. When the current node becomes a data node in this way, the following determination is made: whether or not the offset value and the index number are equal to each other. When the offset value and the index number are not equal to each other, "1" is added to the offset value, and the subsequent node is set as the current node. In the example of FIG. 13, offset "4"≠index number "5". Therefore, as shown in FIG. 14, DN05, which is the subsequent node, is set as the current node.

Regarding DN05 also, it is determined whether or not the offset value and the index number are equal to each other. In other words, the subsequent nodes are accessed sequentially until an index number equal to the offset value is found. In FIG. 14, offset "5"=index number "5". Therefore, DN05 is the data element which is the search target. Data is obtained from the data field which is referred to by DN05. Index access is performed in this manner.

Figure 15:
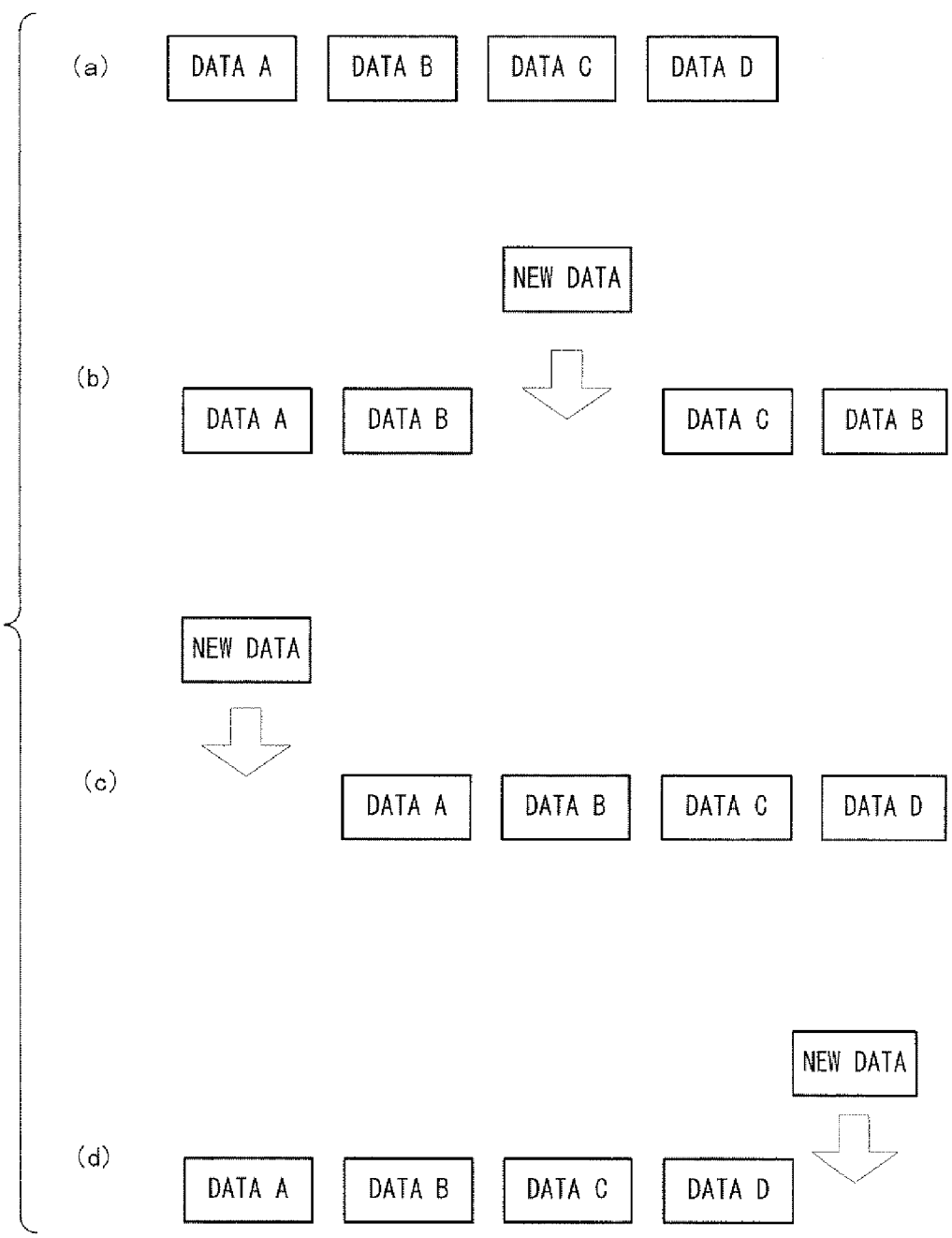
FIG. 15 shows an overview of addition processing in the layered list structure.

Now, an overview of data addition processing in the layered list structure will be described. The data addition processing in this embodiment is classified into two by the difference in the positional which data is added and in the specific content of processing. One type of processing is adding new data to the tail of the data field layer (herein after, referred to "processing of adding at the tail"). The other type of processing is inserting new data in the middle of the data fields in the data field layer (at a specified position) (herein after, referred to as "insertion processing"). FIG. 15 shows the difference between the processing of adding at the tail and the insertion processing. It is assumed as shown in FIG. 15(a) that there are four pieces of data, i.e., data A through data D. In this embodiment, for inserting data, the position to which the data is to be inserted is specified by the index number. For example, when data is to be inserted at the third position from the beginning, "3" is specified for the index number and the insertion processing described later is executed. In this case, new data is inserted by the above-described index access "previous to" the third data from the beginning, i.e., "previous to" data C in FIG. 15(a). Similarly, for inserting data at the beginning, "1" is specified for the index number. In this case, new data is inserted "before" the first data, i.e., data A as shown in FIG. 15(c). By contrast, the processing of adding at the tail simply adds data at the tail of a line of data fields as shown in FIG. 15(d), without specifying any position to which the data is to be inserted. Namely, new data is added "after" the final data, i.e., data D. As described above, as the data addition processing in this embodiment, one of the two types of processing is executed. For example, for newly creating a data file having a layered list structure, the processing of adding at the tail is executed. For adding data to an existing data file having a layered list structure, the insertion processing is executed.

An overview of the processing adding at the tail will be described. As described above, this processing adds data to be newly added at the tail of a line of data fields (in FIG. 1, at the right end). Therefore, in this processing, the data element at the tail (in FIG. 1, DN08) is first accessed. Next, a new data field and a data node associated therewith are added to the position subsequent to this data element (to the right of DN08). Then, the reference or the like between data nodes associated with each other is optionally updated. In the example of FIG. 1, processing of setting the reference to the newly added data node as the subsequent reference 103 of DN08, processing of increasing the subordinate data element quantity 202 of RN03, which is the parent node, by "1", and the like are executed.

Now, with reference to FIG. 16 through FIG. 27, an overview of the insertion processing will be described. The content of the data insertion processing slightly varies depending on whether the position to which data is to be inserted is a first node or not. As an example of inserting data to a position which is a first node, a case where data is inserted to the fourth position from the beginning will be described.

Figure 16:
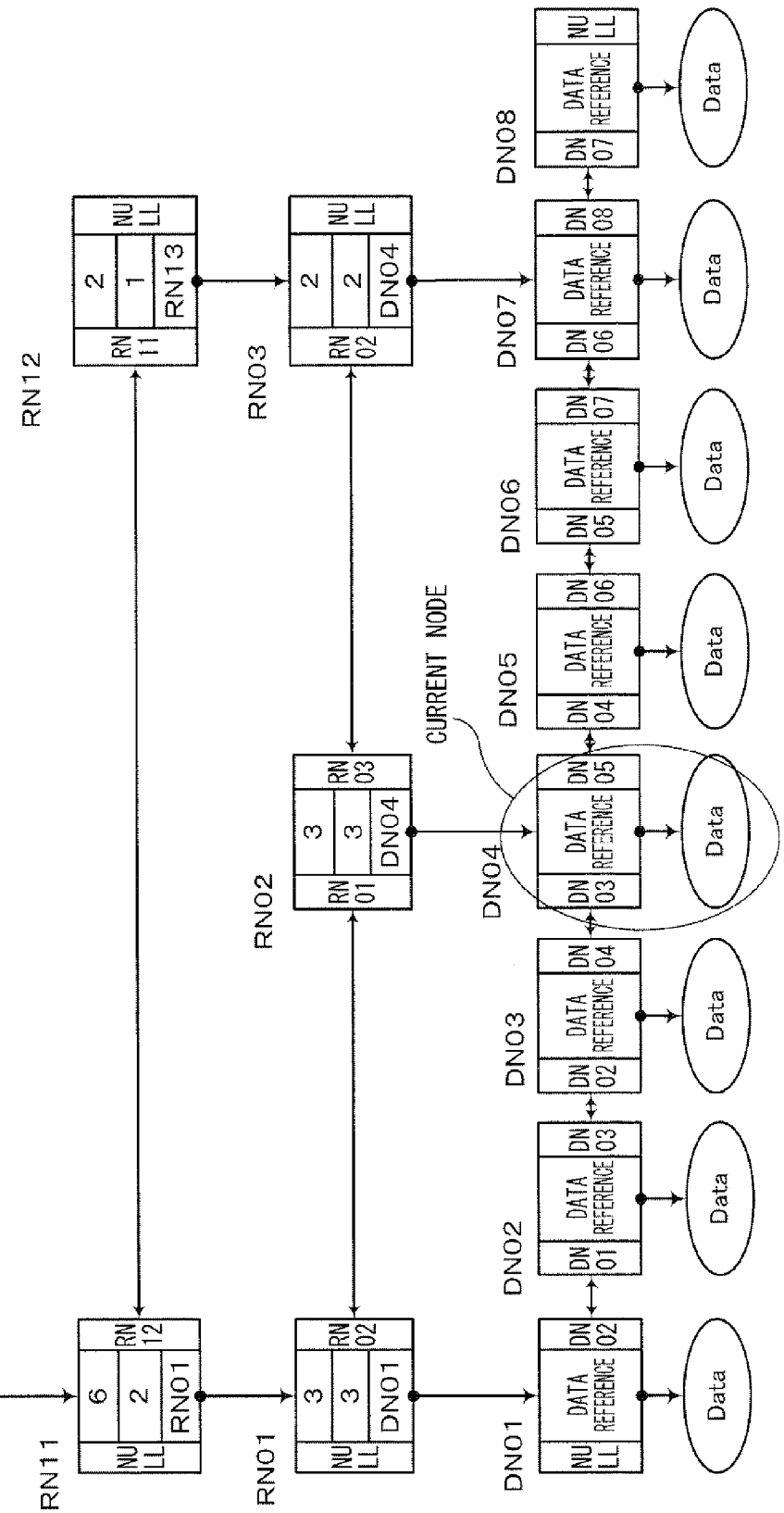
FIG. 16 shows an overview of the addition processing in the layered list structure.

First, DN04, which is the fourth data node from the beginning, is accessed by the index access processing described above. Namely, as shown in FIG. 16, the current node is DN04. DN04 is also a "first node" described above.

Next, a new data node is generated. In the new data node, reference to the data to be inserted (herein after, referred to as "new data") is set.

Figure 17:
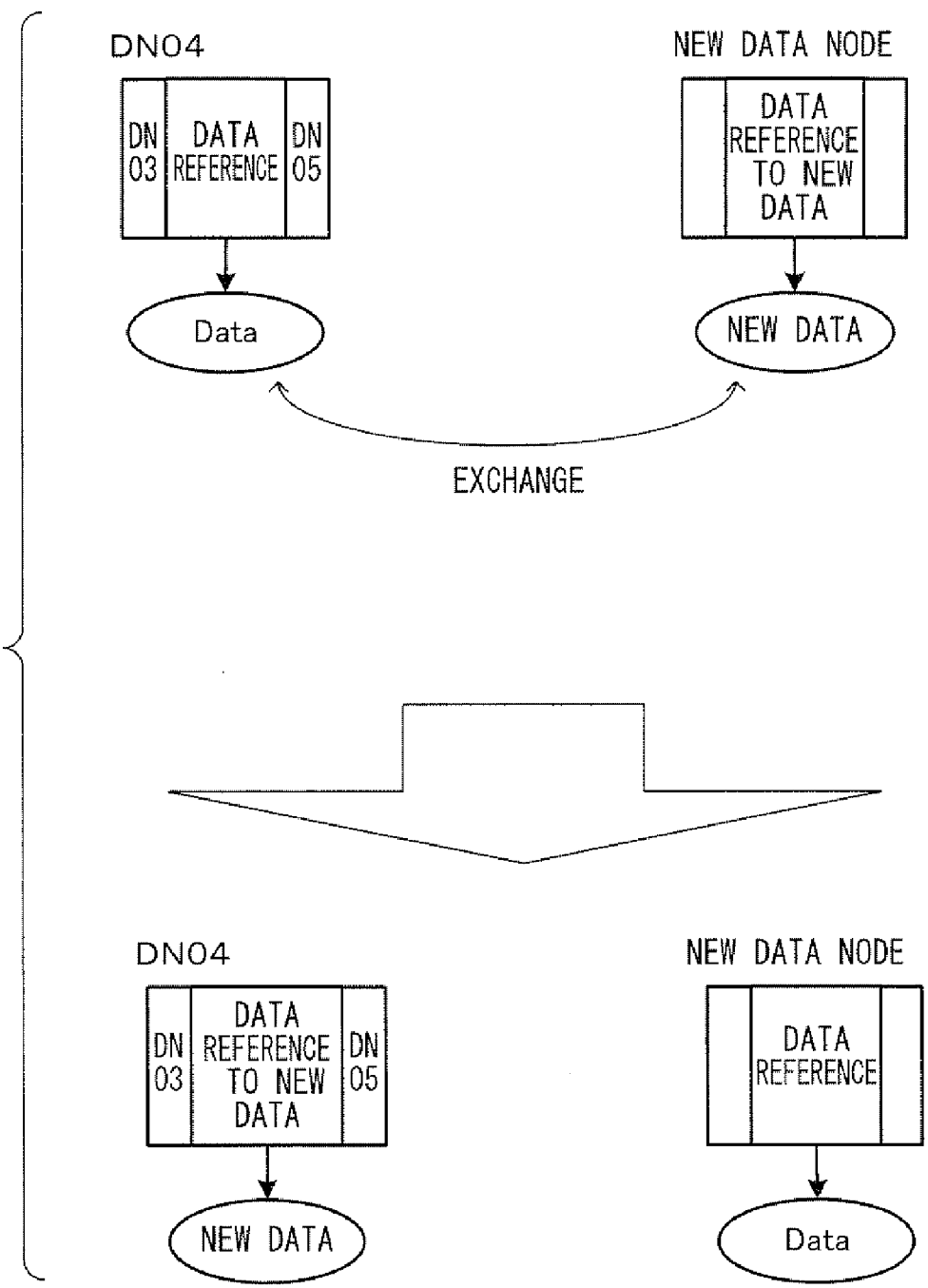
FIG. 17 shows an overview of the addition processing in the layered list structure.

Then, as shown in FIG. 17, data fields are exchanged (more accurately, the data reference 102 is rewritten) between DN04, which is the current node, and the new data node. This is performed in order to eliminate the necessity of changing the first node reference 204 of the parent node which refers to the first node (in FIG. 16, the parent node is RN02).

Figure 18:
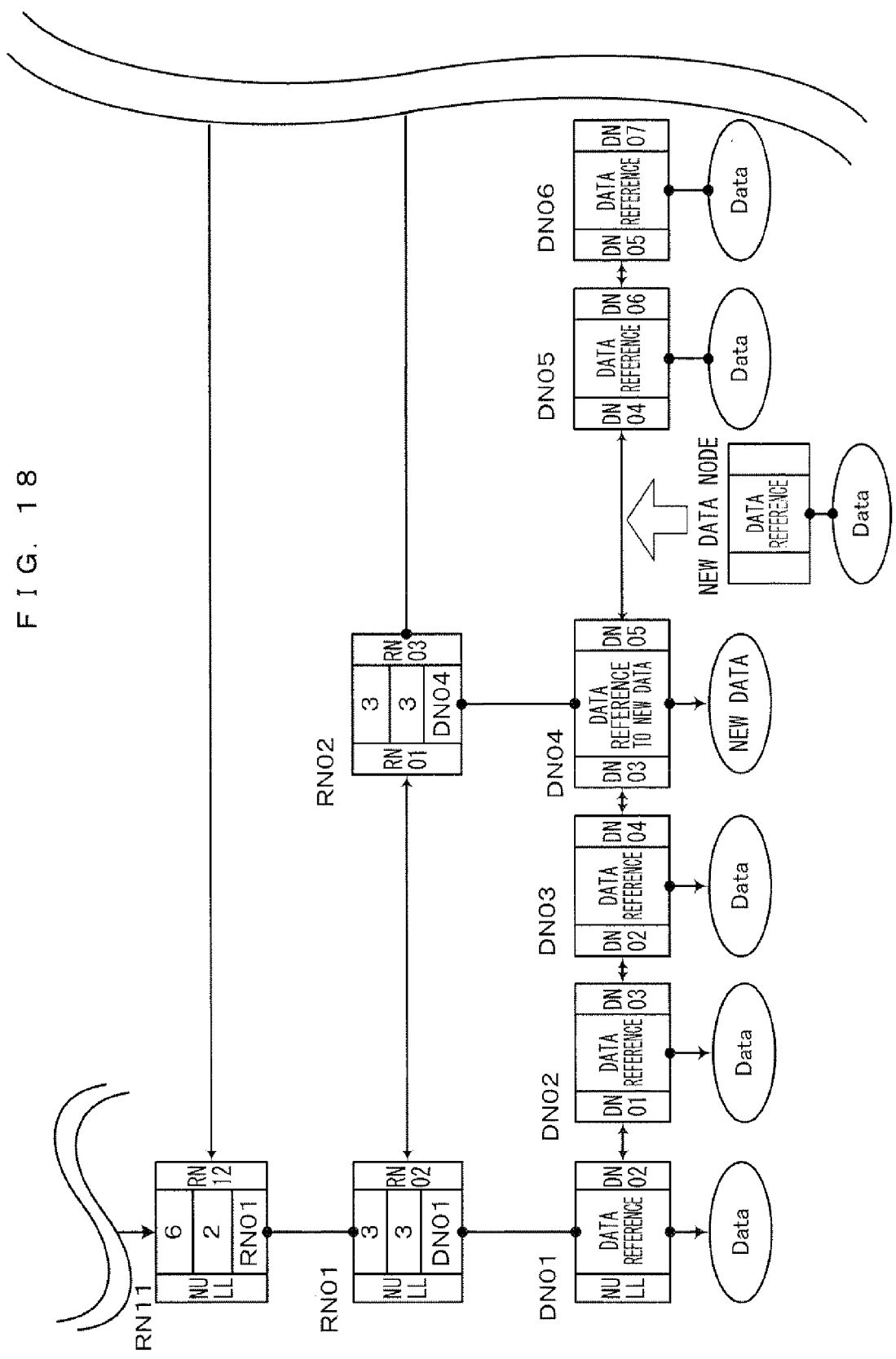
FIG. 18 shows an overview of the addition processing in the layered list structure.
Figure 19:
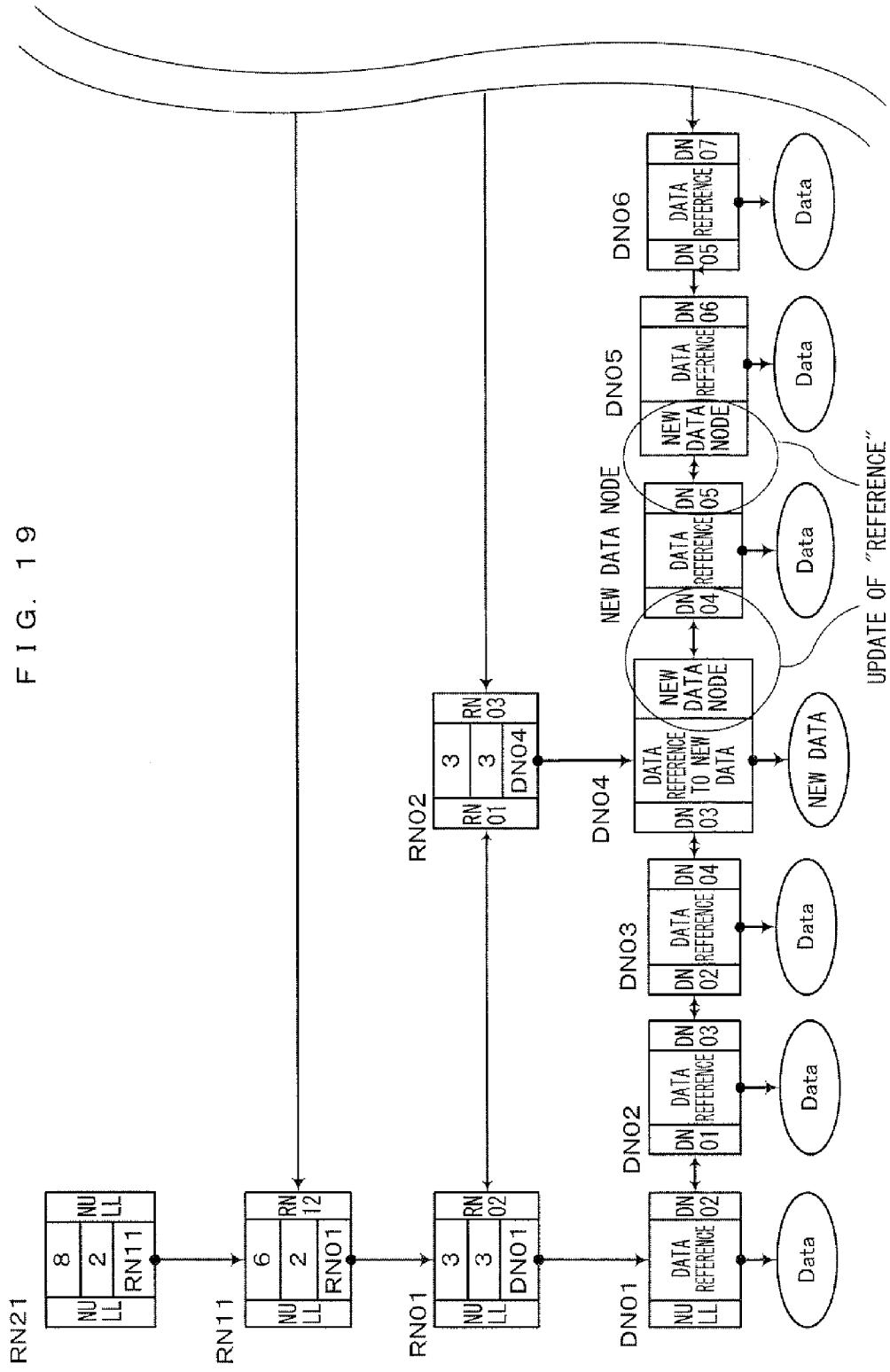
FIG. 19 shows an overview of the addition processing in the layered list structure.

Next, as shown in FIG. 18, the new data node is inserted at the position subsequent to DN04. Then, as shown in FIG. 19, the subsequent reference 103 and the previous reference 101 between DN04 and the new data node are updated. The references between the new data node and DN05 are also updated. Namely, the references are updated such that the subsequent node of DN04 is the new node and the subsequent node of the new node is DN05.

Figure 20:
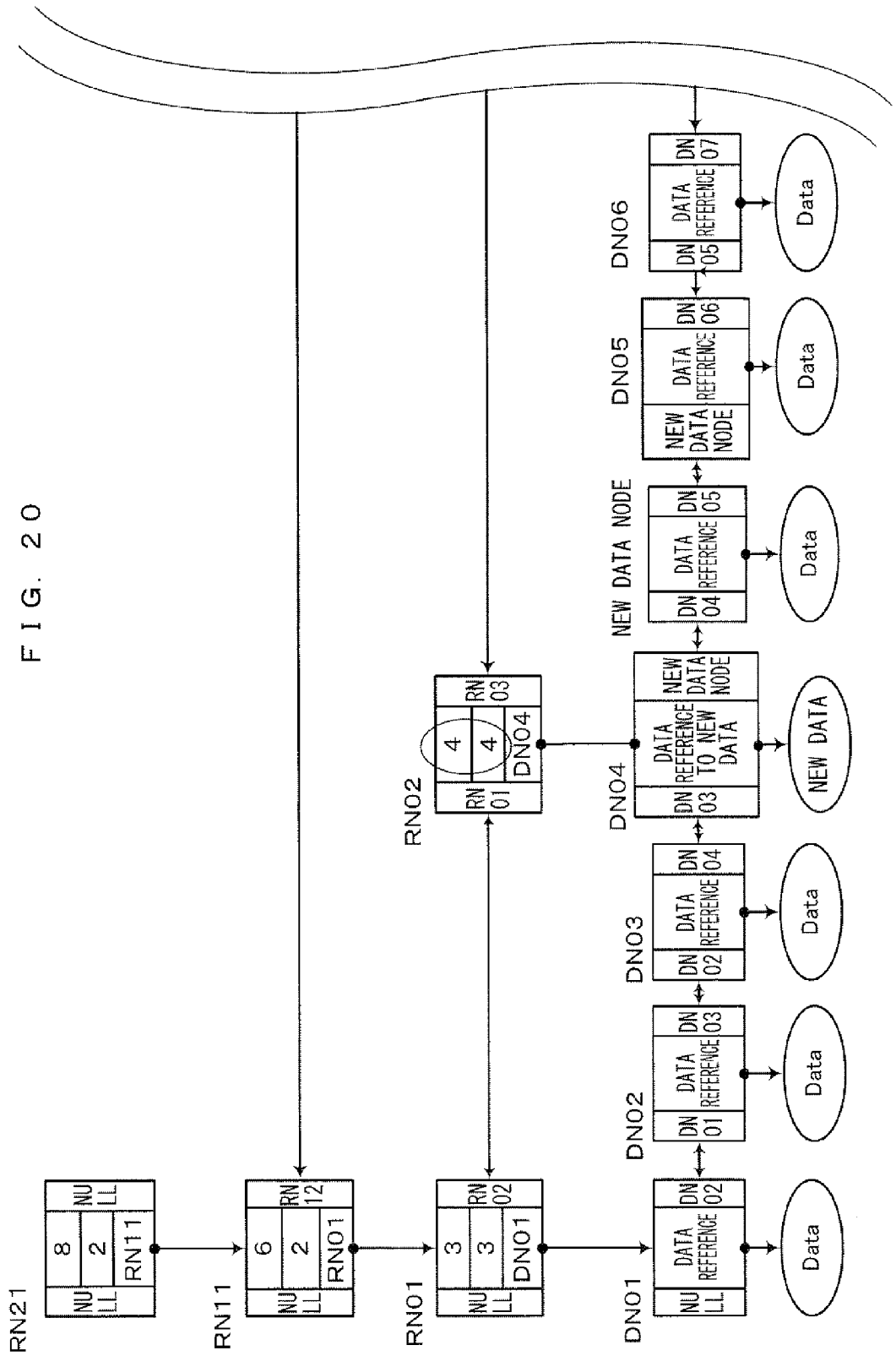
FIG. 20 shows an overview of the addition processing in the layered list structure.

Next, as shown in FIG. 20, the subordinate data element quantity 202 and the child node quantity 203 of RN02, which is the parent node of DN04, are updated. Namely, because one data node has been added, "1" is added to the values of the subordinate data element quantity 202 and the child node quantity 203.

Figure 21:
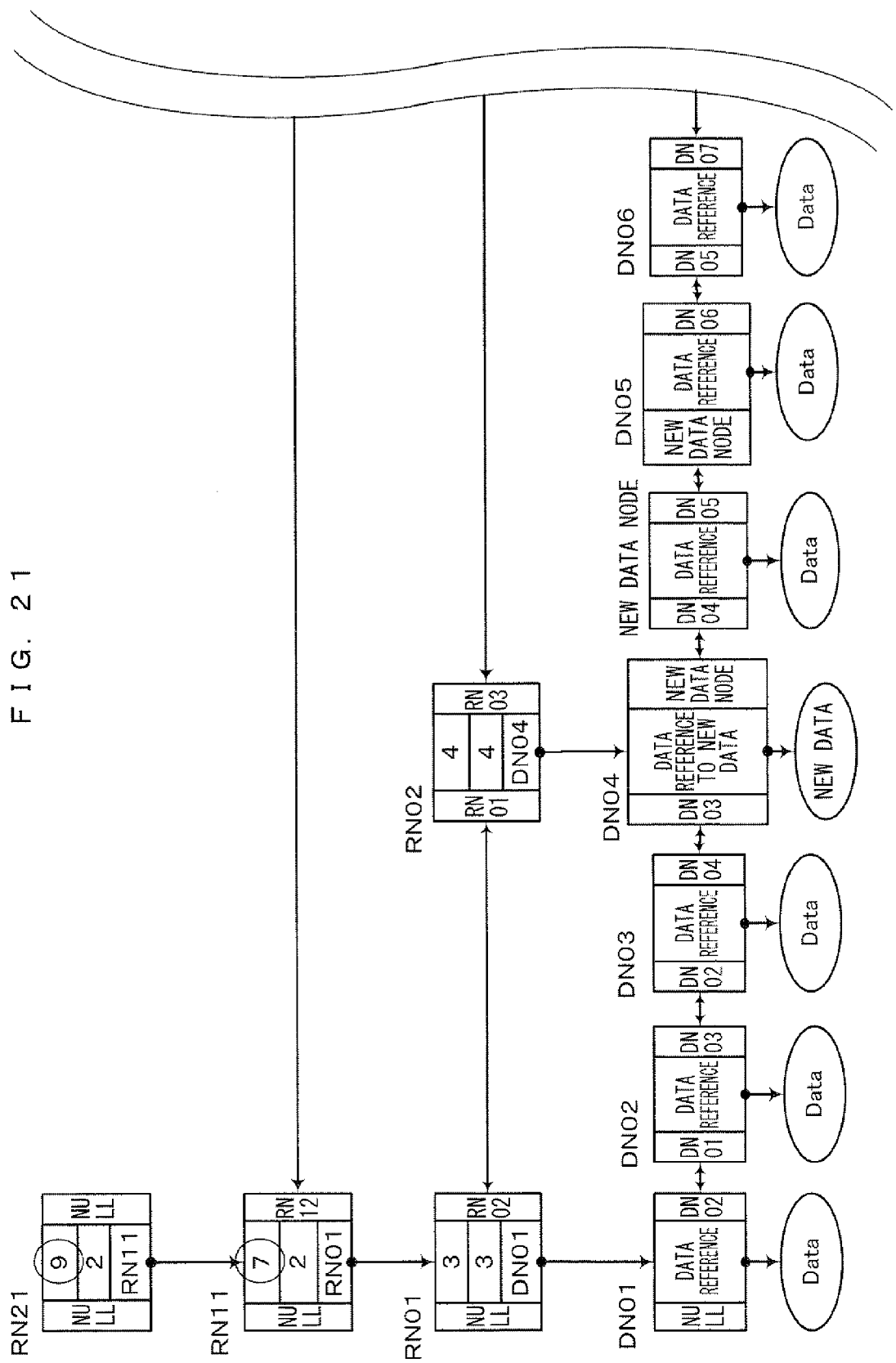
FIG. 21 shows an overview of the addition processing in the layered list structure.

Then, as shown in FIG. 21, the subordinate data element quantity 202 and the child node quantity 203 of both of RN11, which is the parent node of RN02, and RN21, which is the parent node of RN11, are also updated. In the example of FIG. 21, no relay node corresponding to the child node has been added. Therefore, "1" is added to only the subordinate data element quantity 202. Thus, the data insertion processing to a position which is a first node is finished.

Figure 22:
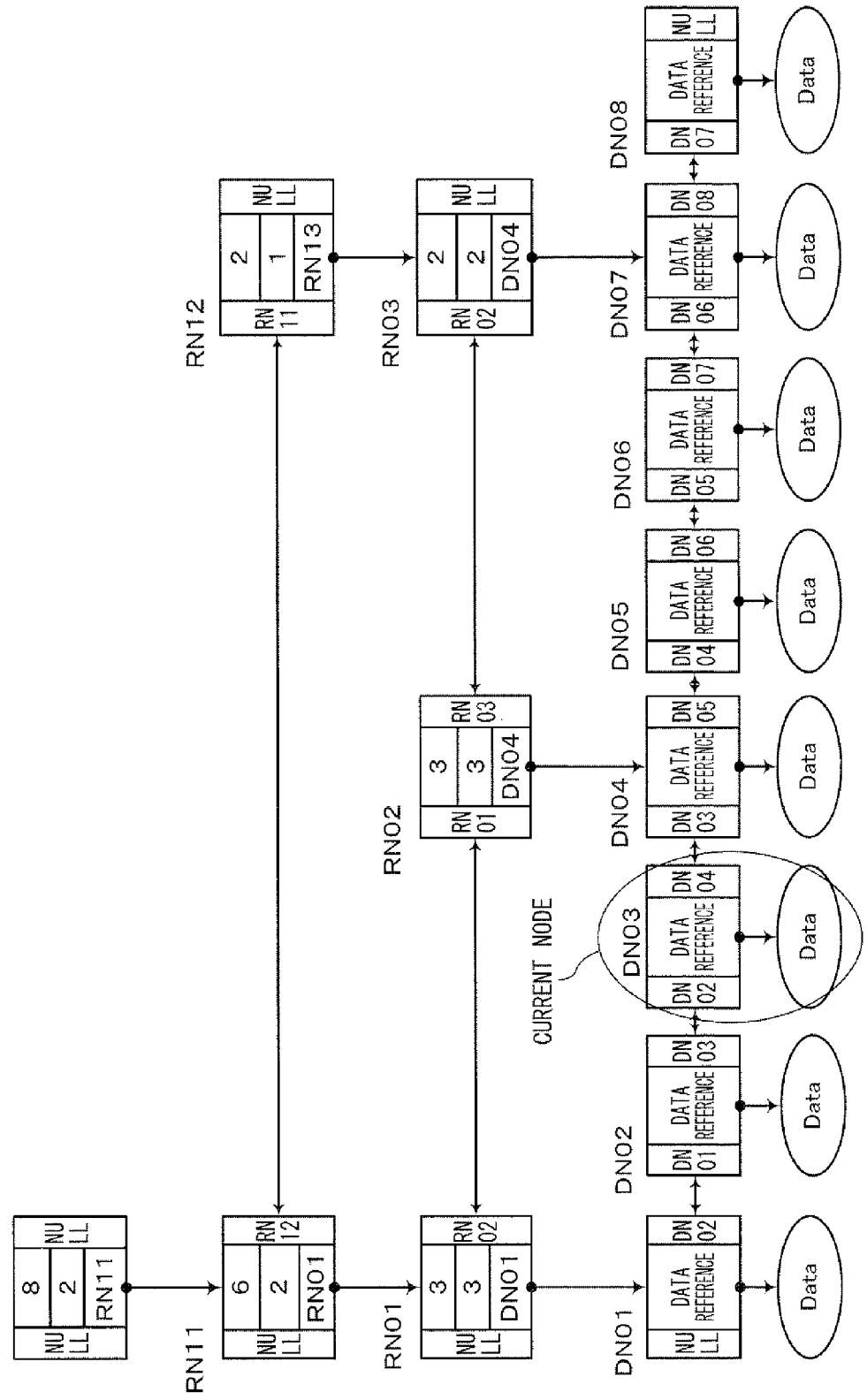
FIG. 22 shows an overview of the addition processing in the layered list structure.

Now, an overview of the data insertion processing to a position which is not a first node will be described. As an example, a case where data is inserted to the third position from the beginning will be described. In this case, as shown in FIG. 22, DN03, which is the third data node from the beginning, is accessed by the index access described above. Namely, the current node is DN03.

Figure 23:
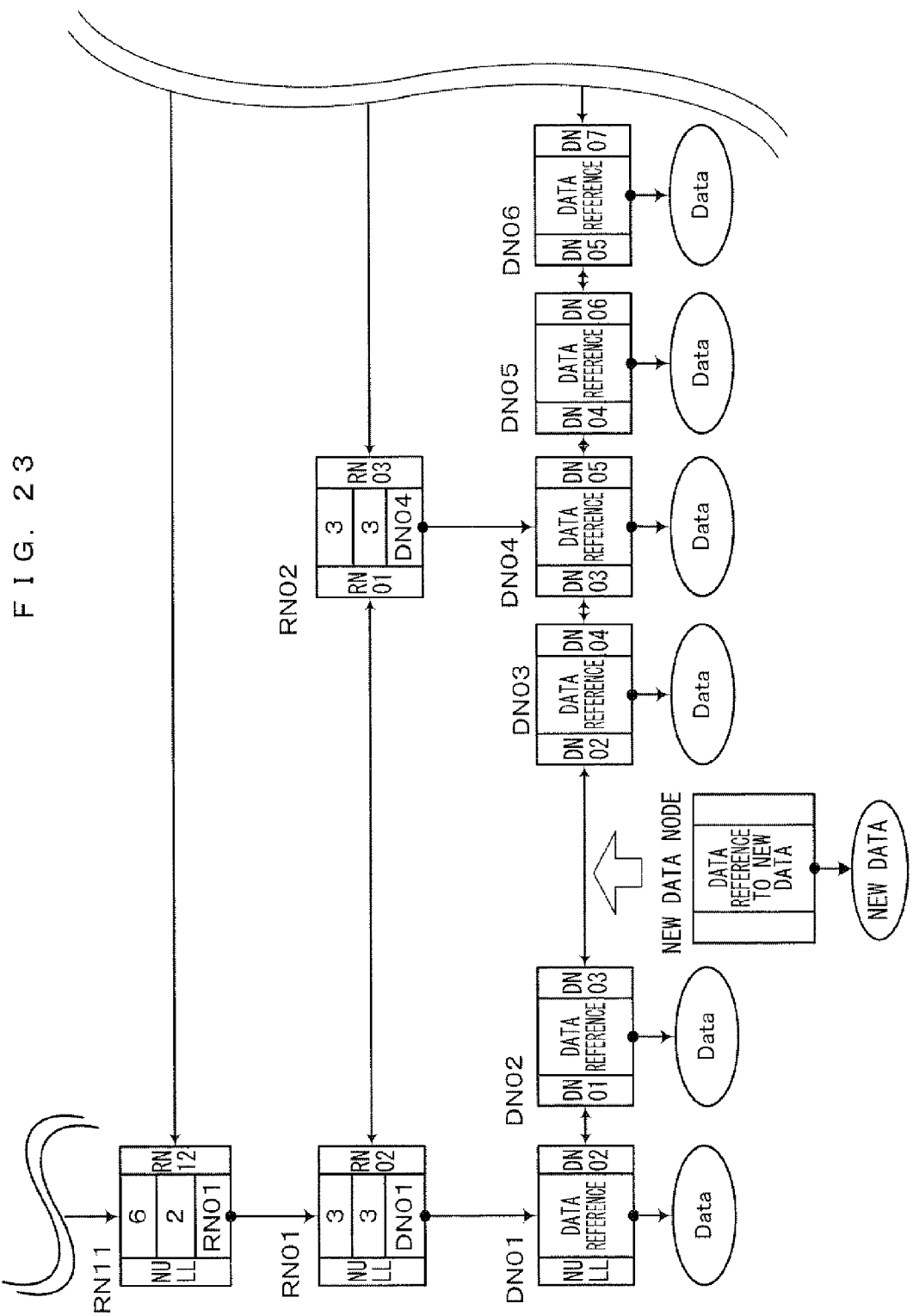
FIG. 23 shows an overview of the addition processing in the layered list structure.

Next, a new data node is generated in which reference to the new data is generated. As shown in FIG. 23, the new data node is inserted before DN03.

Figure 24:
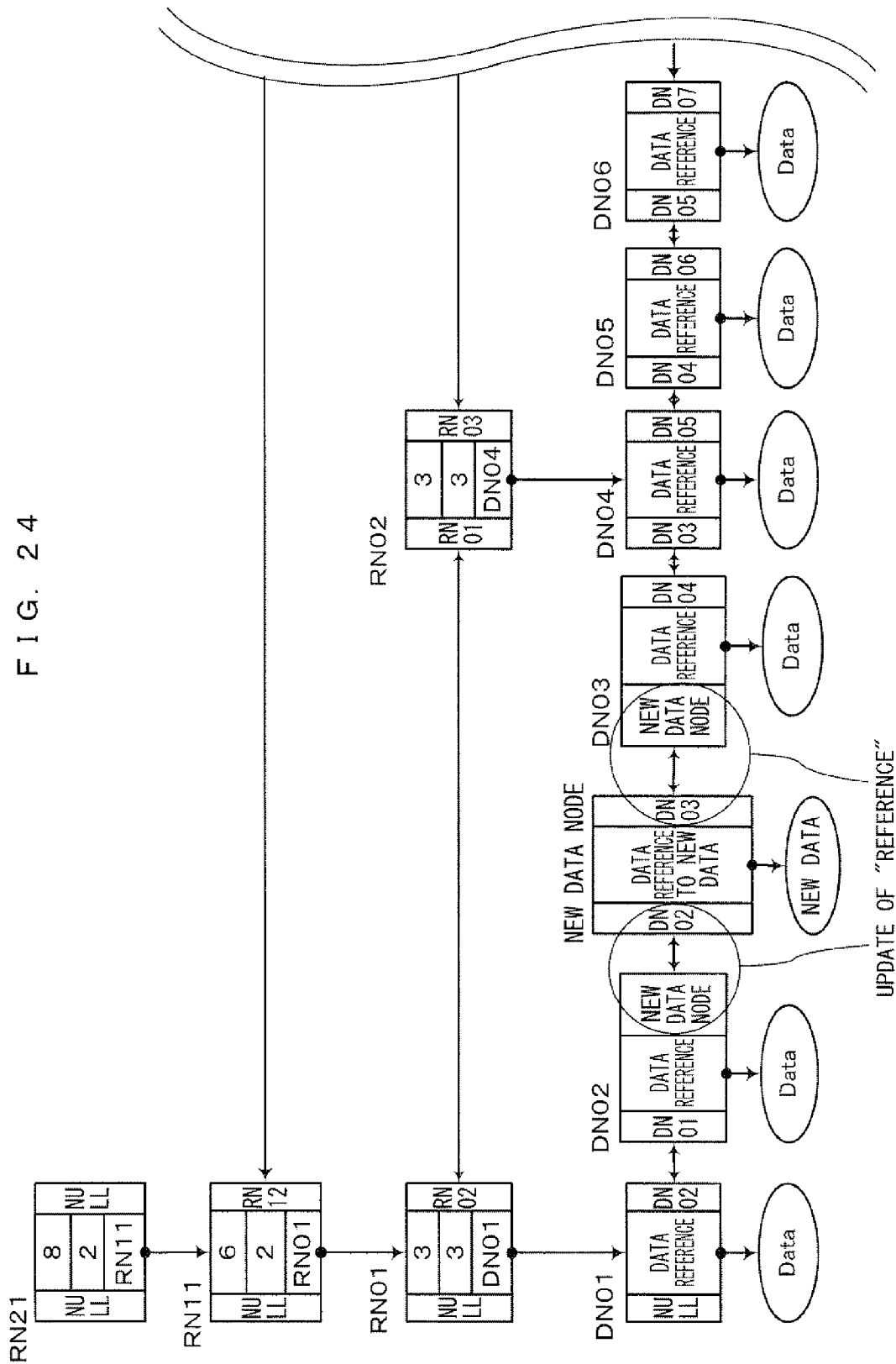
FIG. 24 shows an overview of the addition processing in the layered list structure.

Then, as shown in FIG. 24, references between DN02 and the new data node are updated. References between the new data node and DN03 are also updated.

Finally, in the same manner as described above, the subordinate data element quantity 202 and the child node quantity 203 of the corresponding parent node are updated. In the case of insertion to a position which is not a first node, a data element is accessed based on the specified index number, and new data is simply inserted before the data element. Thus, the data insertion processing to a position which is not a first node is finished.

Now, a case where the number of relay nodes is increased as a result of data insertion will be described. In this embodiment, when the child node quantity of a relay node exceeds a predetermined value (herein after, referred to as a "maximum threshold") as a result of insertion of a data element, the relay node is divided into two. This is performed in order to maintain a certain level of search performance. Namely, the inter-relay node intervals (the intervals to be skipped) are prevented from becoming unbalanced as a result of insertion of a data element, so that deterioration of the search performance is avoided. In the example of FIG. 1, when a plurality of pieces of data are inserted to the position of DN05 (subsequent to DN04) in a concentrated manner, it requires a long time to retrieve data subordinate to RN02. By optionally increasing the relay nodes between RN02 and RN03, the deterioration of the search performance is avoided.

It is preferable that the maximum threshold mentioned above is optionally adjusted by calculating an appropriate value in advance in accordance with the processing capability of an information processing apparatus for executing the data operation processing according to this embodiment. Setting the maximum threshold to be large is advantageous in suppressing the number of relay nodes which need to be increased and thus decreasing the processing load during the data insertion processing (processing for generating relay nodes), whereas setting the maximum threshold to be small is advantageous in improving the search performance by increasing the number of relay nodes. Hence, it is preferable to set the maximum threshold to such an appropriate value that these advantages are weal balanced, in consideration of the processing capability of the information processing apparatus.

Figure 25:
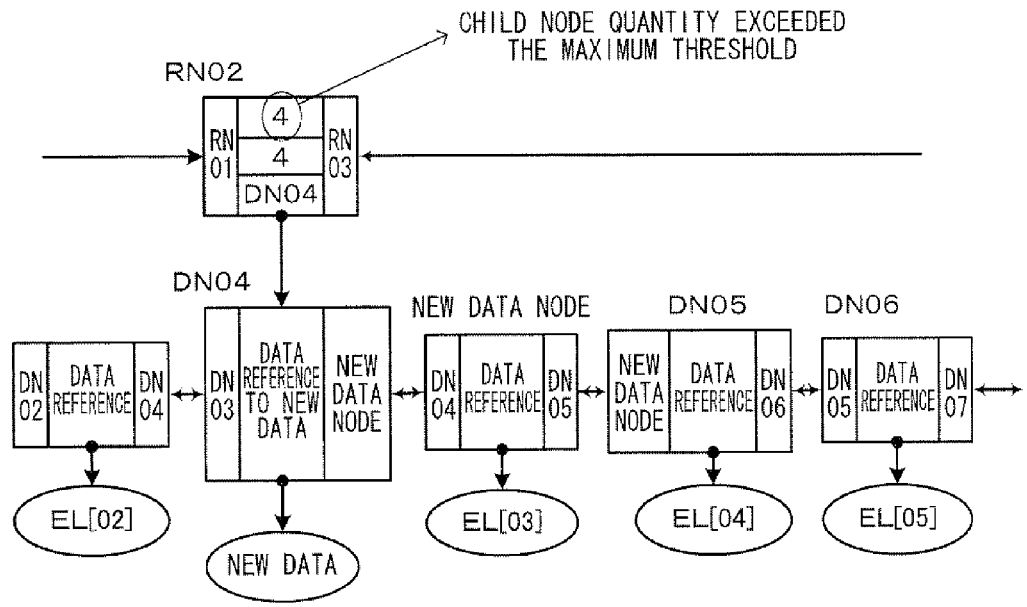
FIG. 25 shows an overview of the addition processing in the layered list structure.
Figure 26:
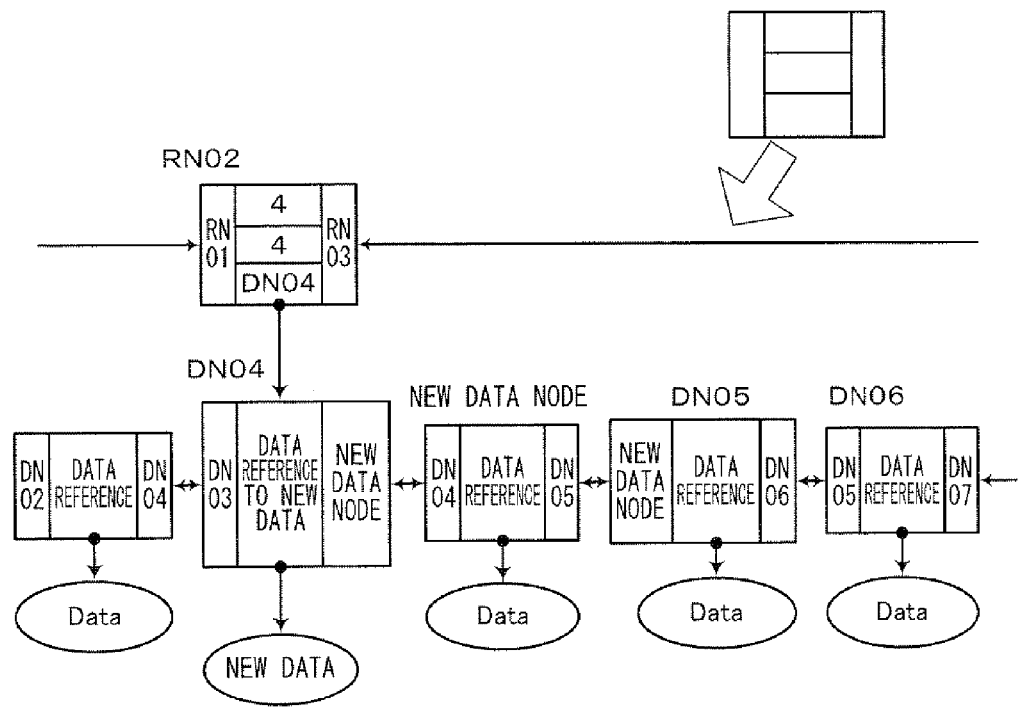
FIG. 26 shows an overview of the addition processing in the layered list structure.

In the example described below, the maximum threshold is, for example, "$T_3$". As shown in FIG. 25, new data is inserted subsequent to DN04. As a result, the child node quantity 203 of RN02 has exceeded "3", which is the maximum threshold. In this case, as shown in FIG. 26, a new relay node is first generated and is inserted subsequent to RN02.

Figure 27:
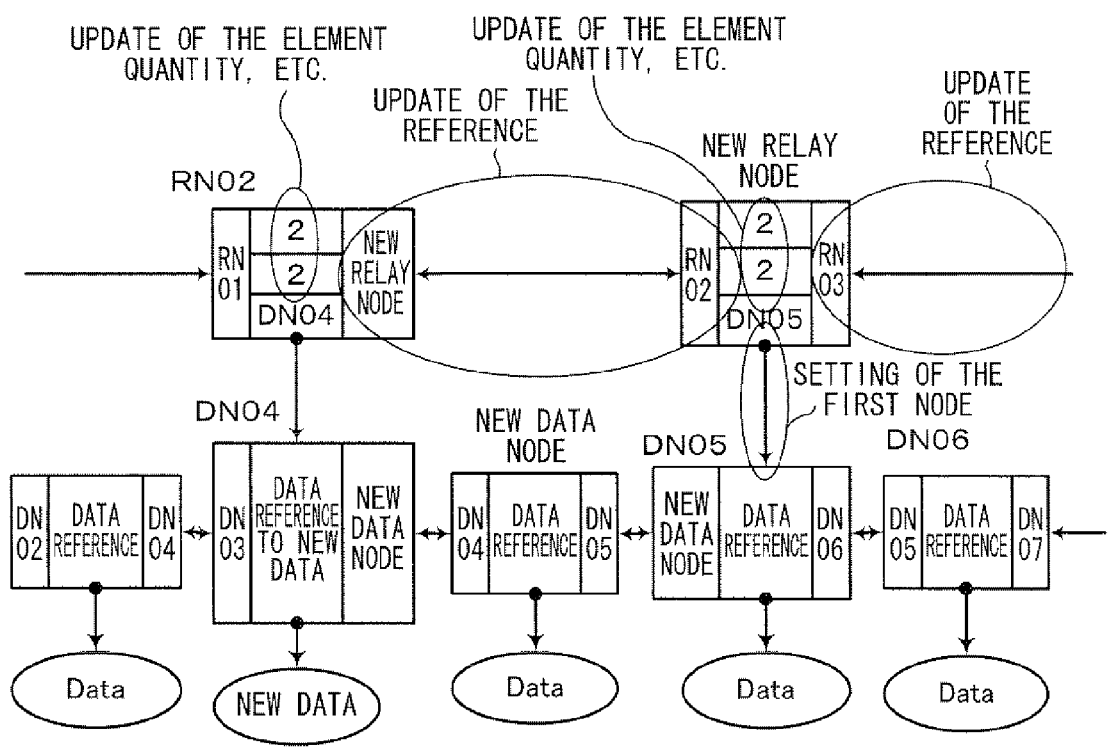
FIG. 27 shows an overview of the addition processing in the layered list structure.

Next, as shown in FIG. 27, references between RN02 and the new relay node are updated, and references between the new relay node and the node subsequent thereto (RN03 although omitted in FIG. 27) are updated. Furthermore, the child node quantity 203 of RN02 and the child node quantity 203 of the new relay node are updated. At this time, the values of the child node quantity 203 of FN02 and the new relay node are updated so as to be equal to each other (in the case where the child node quantity of RN02 is an odd number, substantially equal to each other). Specifically, in the example of FIG. 27, as a result of insertion of the data node, the child node quantity of RN02 is "4" Therefore, the values of the child node quantity 203 are updated to "2". (If the maximum threshold is "4", and the child node quantity 203 of RN02 is "5", which is an odd number, as a result of insertion of the new data node, the values of the child node quantity 203 are updated so as to be substantially equal to each other, for example, "3" and "2" or "2" and "3".) Namely, the interval between RN02 and the new relay node and the interval between the new relay node and RN03 are made equal (or substantially equal) to each other, so that the deterioration of the search performance is avoided to maintain a certain level of performance. Furthermore, a first node reference of the new relay node is newly set. In FIG. 27, DN05, which is positioned after DN04 by two (to the right of DN04 by two), is set as the first node of the new relay node. The values of the subordinate data element quantity 202 are also optionally updated in correspondence with such an adjustment of the child node quantity.

As described above, in the insertion processing in this embodiment, the child node quantity of a relay node is limited (the maximum threshold is set). When the limit value is exceeded at the time of data insertion, a relay node is added and the values of the child node quantity of the relay nodes are adjusted so as not to become unbalanced. Thus, the level of the search performance can be maintained.

Now, an overview of data delete processing in the layered list structure according to this embodiment will be described. As in the case of data addition, the content of data delete processing slightly varies depending on whether the position from which data is to be deleted is a first node or not. As an example of deleting data from a position which is a first node, a case where data is deleted from the fourth position from the beginning shown in FIG. 1 will be described.

First, as shown in FIG. 28, index access is performed until the position of the data to be deleted (DN04).

Figure 29:
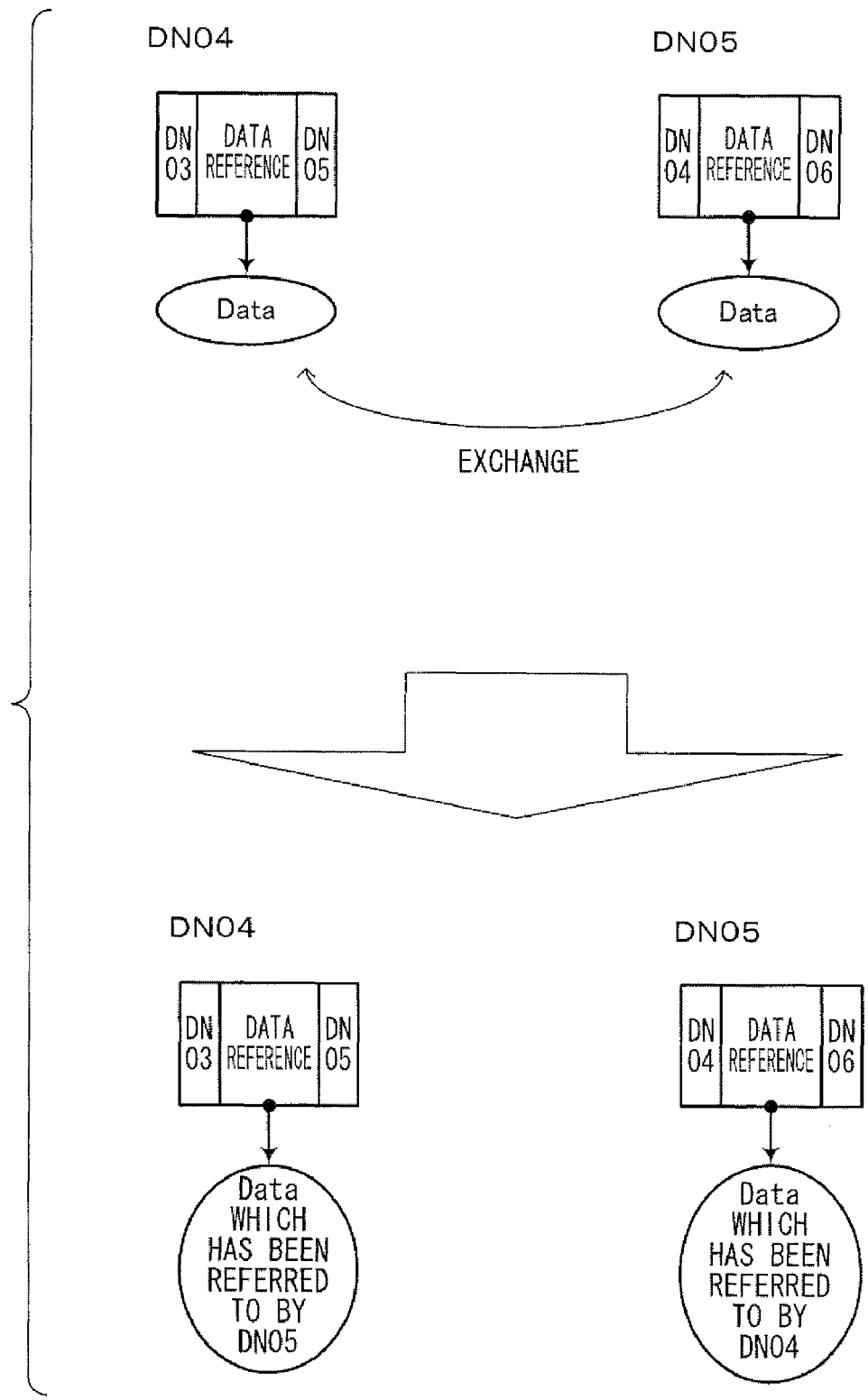
FIG. 29 shows an overview of the delete processing in the layered list structure.

Next, as shown in FIG. 29, data fields are exchanged between DN04 and DN05 subsequent to DN04. Namely, reference to the data field which DN05 referred to (hereinafter, this data field will be referred to as "old Data05" is set for DN04, and reference to the data field which DN04 referred to (old Data04) is set for DN05. This is performed in order to eliminate the necessity of changing the first node reference 204 of RN02, which refers to DN04.

Then, as shown in FIG. 30, DN05 and old Data04 referred to by DN05 are deleted. Although old Data04, which was at the fourth position from the beginning, is deleted, the reference from RN02 to SN04 is maintained. Because the reference to old Data05 is set for DN04, the same result as old Data04 being deleted at the position of DN04 is obtained.

Figure 31:
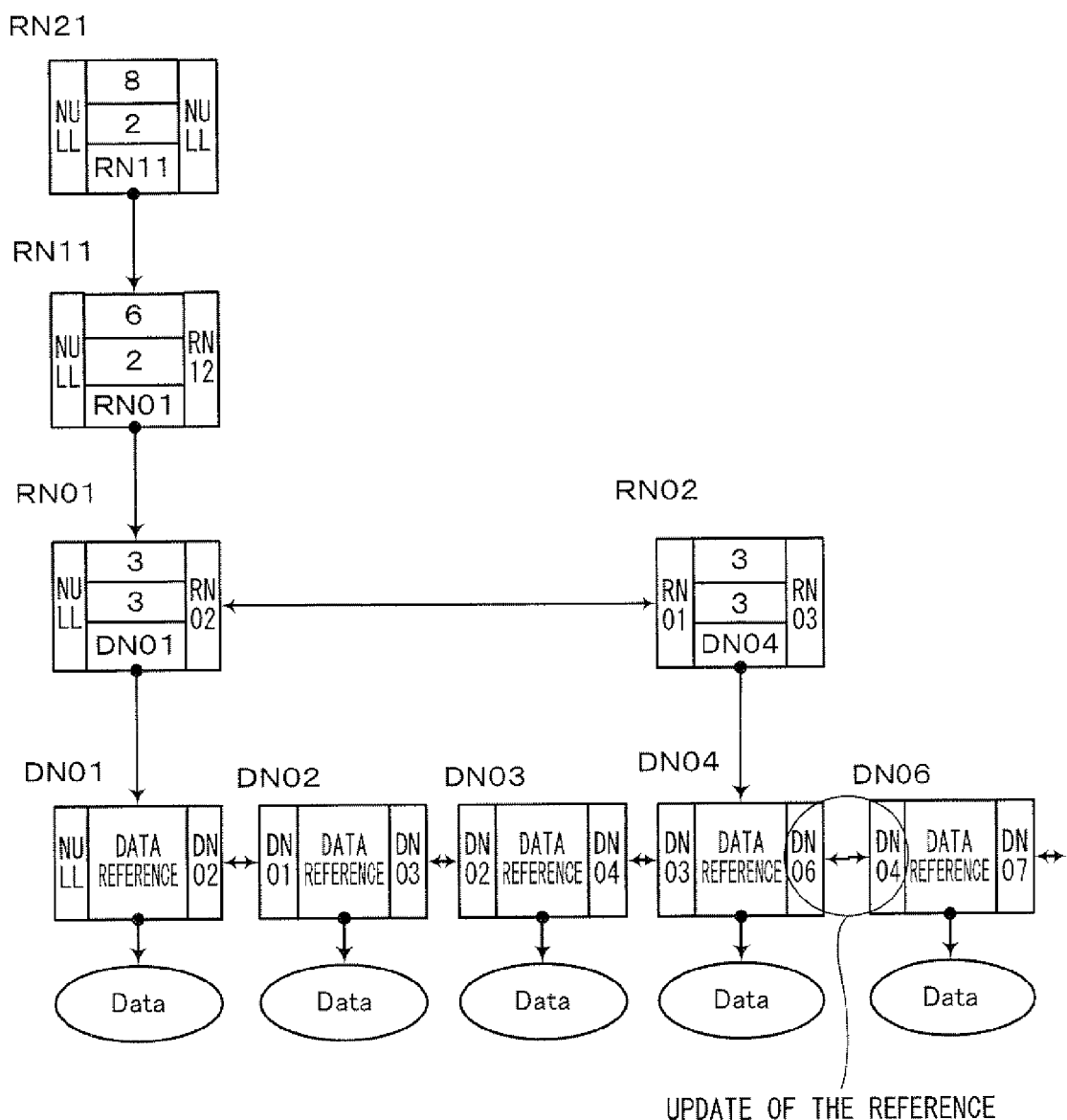
FIG. 31 shows an overview of the delete processing in the layered list structure.

Next, as shown in FIG. 31, references between DN04 and DN06 are updated. Namely, DN06 is set as the subsequent node of DN04, and DN04 is set as the previous node of DN06.

Next, as shown in FIG. 32, the subordinate data element quantity 202 and the child node quantity 203 of RN02, which is the parent node of DN04, are updated. Furthermore, as shown in FIG. 33, the subordinate data element quantity 202 and the child node quantity 203 of both of RN11, which is the parent node of RN02, and RN21, which is the parent node of RN11, are also updated. In the example of FIG. 33, the number of relay nodes has been changed. Therefore, only the values of the subordinate data element quantity 202 are updated.

Now, as an example of deleting data from a position which is not a first node, a case where data is deleted from the third position from the beginning (data at the position of DN03) shown in FIG. 1 will be described.

Figure 34:
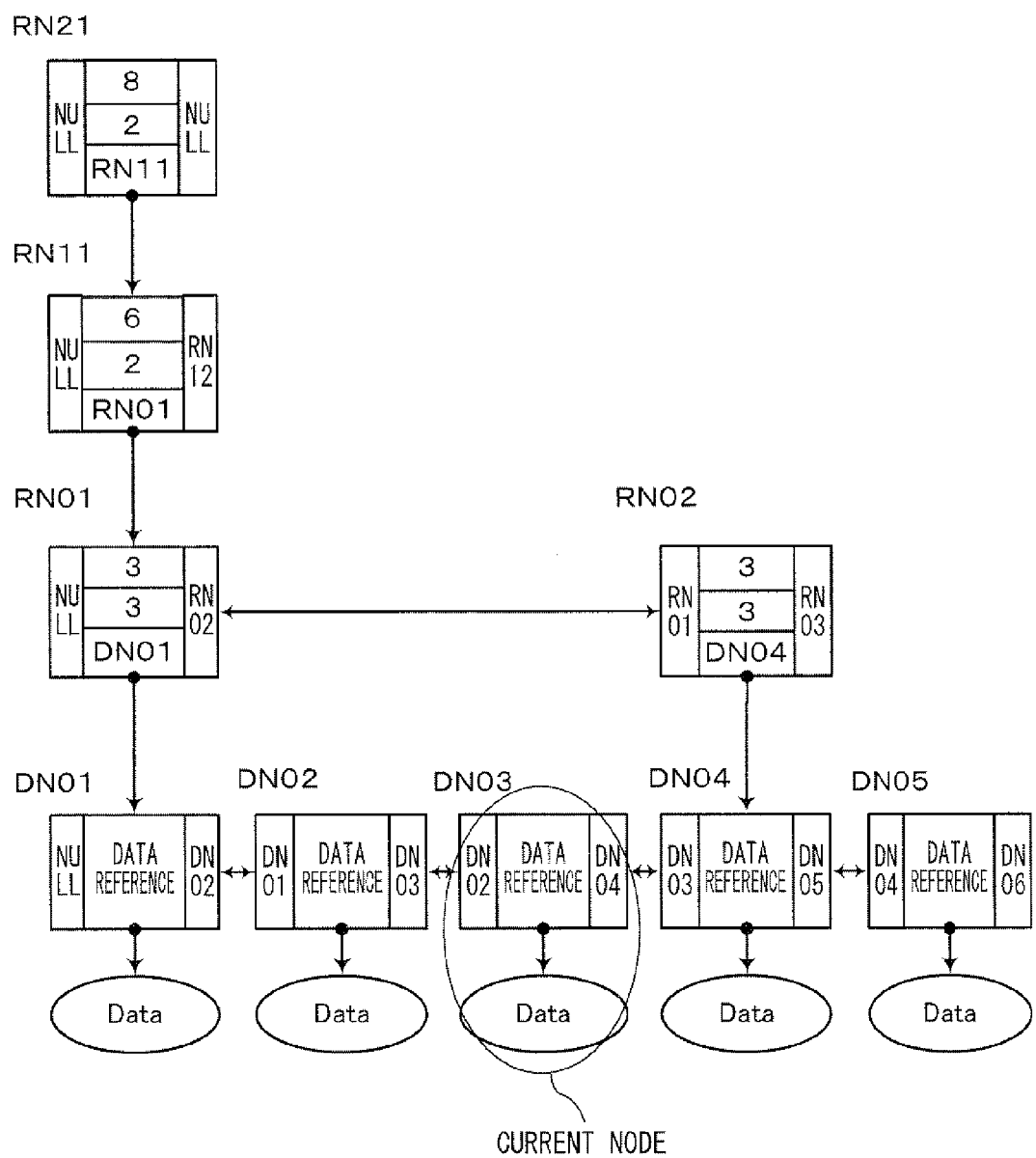
FIG. 34 shows an overview of the delete processing in the layered list structure.

First, as shown in FIG. 34, index access is performed until the position of the data to be deleted (DN03). Next, as shown in FIG. 35, DN03 and the data referred to by DN03 are deleted. Then, as shown in FIG. 36, references between DN02 and DN04 are updated. Namely, DN04 is set as the subsequent node of DN02, and DN02 is set as the previous node of DN04.

Then, as in the same manner as described above, the subordinate data element quantity 202 and the child node quantity 203 of RN01, which is the parent node of the deleted DN03, are updated (the values of each quantity is subtracted by "1"). Furthermore, the subordinate data element quantity 202 and the child node quantity 203 of both of RN11 which is the parent node of RN01, and RN21, which is the parent node of RN11, are also updated. As described above, when the data element at the position which is not a first node is deleted, the processing of simply deleting the data field and the data node at that position and adjusting the subordinate data element quantity 202 and the child node quantity 203 of the associated parent nodes is executed.

Now, a case where the number of relay nodes is decreased as a result of data deletion described above will be described. In this embodiment, when the child node quantity of a relay node becomes equal to or smaller than a predetermined value (herein after, referred to as a "minimum threshold") as a result of deletion of a data element, adjustment is made such that the child node quantity 203 of the previous node of that relay node and the child node quantity 203 of the subsequent node of that relay node are equal to each other, as in the case of data insertion described above. Alternatively, the previous node and the subsequent node are combined together. This is performed in order to maintain a certain level of search performance as in the case of data insertion described above. Whether the previous node is made the target or the subsequent node is made the target is determined by whether or not the relay node, the child node quantity of which becomes equal to or smaller than the minimum threshold (i.e., the current node), is a first node. The reason for this is that if the current node is deleted when the current node is a first node, the first node reference 204 of the parent node which referred to the current node also needs to be changed. In order to omit the processing for such a change, the processing described below is executed.

It is preferable that the minimum threshold mentioned above is set by calculating an appropriate value in advance in accordance with the processing capability of an information processing apparatus for executing the data operation processing according to this embodiment, like the maximum threshold.

First, a case where the current node is a first node will be described. For example, a case where in FIG. 1, the child node quantity 203 of RN01, which is the parent node of DN02 and a first node, becomes equal to or smaller than the minimum threshold as a result of deleting the data element of DN02 will be described. In this case, the following adjustment processing is executed between RN01, which is the current node, and RN02, which is the subsequent node of RN01. This processing results in remaining RN01, which is the first node, without being deleted. Hereinafter, a node on the side to be retained without being deleted will be referred to as a "save target node", and a node on the other side will be referred to a "delete target node". In this example, the current node as the first node (RN01) is the "save target node", whereas the subsequent node of the current node (RN02) is the "delete target node".

Figure 37:
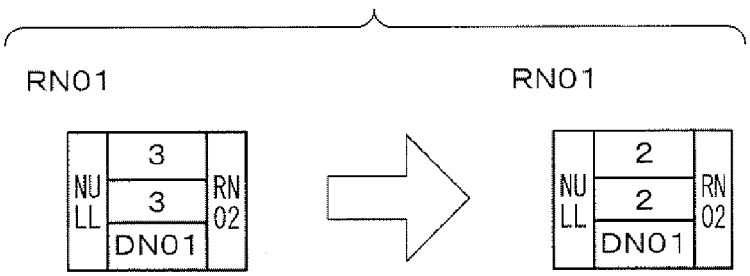
FIG. 37 shows an overview of the delete processing in the layered list structure.
Figure 38:
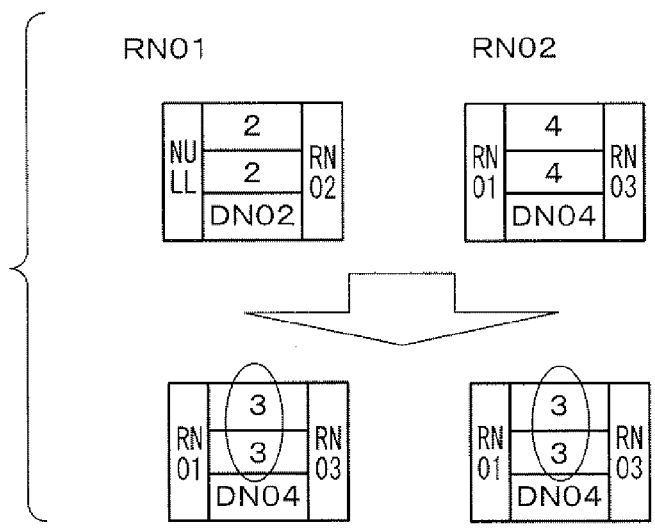
FIG. 38 shows an overview of the delete processing in the layered list structure.

In the example described below, the minimum threshold is, for example, "2". As a result of deleting the data element of DN02, the child node quantity 203 of RN01 becomes "2" as shown in FIG. 37. In this case, a sum of the child node quantity 203 of RN01 (save target node) and the child node quantity 203 of RN02 (delete target node) is calculated. The processing to be executed next varies depending on whether or not the calculated value is equal to or smaller than the maximum threshold. For example, where the maximum threshold is "5" and the child node quantity of RN02 is "3", the calculated value is "6", which is larger than the maximum threshold. In this case, as shown in FIG. 38, adjustment is made such that the values of the child node quantity of RN01 and RN02 are equal to each other (in the case where the calculated value is an odd number, substantially equal to each other) (in FIG. 38, the values of the child node quantity of RN01 and RN02 are each "3").

Figure 39:
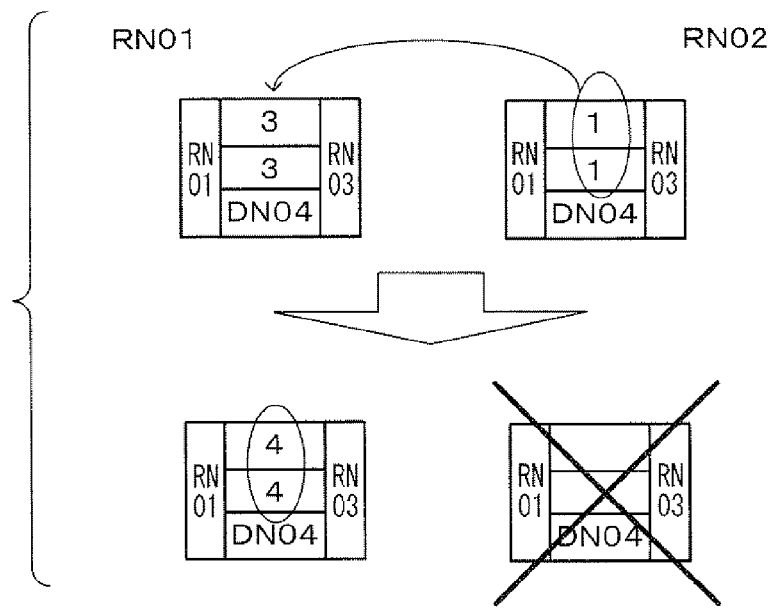
FIG. 39 shows an overview of the delete processing in the layered list structure.

By contrast, when the calculated value is equal to or smaller than the maximum threshold, for example, when the maximum threshold is "5" and the child node quantity of RN02 is "1" the calculated value is "4". In this case, as shown in FIG. 39, adjustment is made so as to combine the child node subordinate to RN02 with RN01. Namely, the child node quantity 203 and the subordinate data element quantity 202 of RN01 are respectively combined with the child node quantity 203 and the subordinate data element quantity 202 of RN02, and then RN02 is deleted. By this, the child nodes which were subordinate to RN02 become subordinate to RN01. Because RN01, which is a first node, remains without being deleted, it is not necessary to change the first node reference 204 of RN11, which is the parent node of RN01.

Now, a case where the current node is not a first node will be described. For example, a case wherein FIG. 1, the child node quantity 203 of RN02 becomes equal to or smaller than the minimum threshold as a result of deleting the data element of DN05 will be described. In this case, the current node (RN02) is the "delete target node", whereas the previous node of the current node (RN01) is the "save target node". Substantially the same processing as above is executed between RN02 and RN01. Namely, when a sum of the values of the child node quantity of RN02 and RN01 is larger than the maximum threshold, adjustment is made such that the values of the child node quantity of RN02 and RN01 are equal, or substantially equal, to each other. By contrast, when the sum of the values of the child node quantity of RN02 and RN01 is equal to, or smaller than, the maximum threshold, processing of combining the content of RN02 with the content of RN01 is executed As a result, RN02 is deleted. In this case also, RN01, which is a first node, remains without being deleted. Therefore, it is not necessary to change the first node reference 204 of RN11, which is the parent node of RN01.

As described above, in this embodiment, the relay nodes having a role of managing the plurality of nodes are provided in a layer structure, so that the search performance of the index access is improved. In addition, when the data addition or deletion is performed, the above-described adjustment is performed, so that the intervals between the relay nodes are prevented from becoming unbalanced. Hence, the deterioration of the search performance can be avoided.

Hereinafter, the data operation processing executed in this embodiment will be described in detain. First, an information processing apparatus for executing the data operation processing according to this embodiment will be described. FIG. 40 is a block diagram showing a structure of an information processing apparatus according to this embodiment. As shown in FIG. 40, the information processing apparatus includes a CPU 11, a RAM 12, an input section 13, a display section 14, and an external storage section 15.

The CPU 11 executes a program read into the RAM 12 to realize the data operation processing as described above. The input section 13 accepts an input from a user and outputs a signal representing the content of the input to the CPU 11. The display section 14 is a device for displaying the result of the processing (search result, etc.) executed by the CPU 11. The RAM 12 is an internal storage device for temporarily storing data, various programs and the like read from the external storage section 15 for executing processing according to this embodiment. The external storage section 15 stores programs and the like according to this embodiment. The external storage section 15 may be, for example, a hard disc, an optical discs a memory card or the like.

Figure 41:
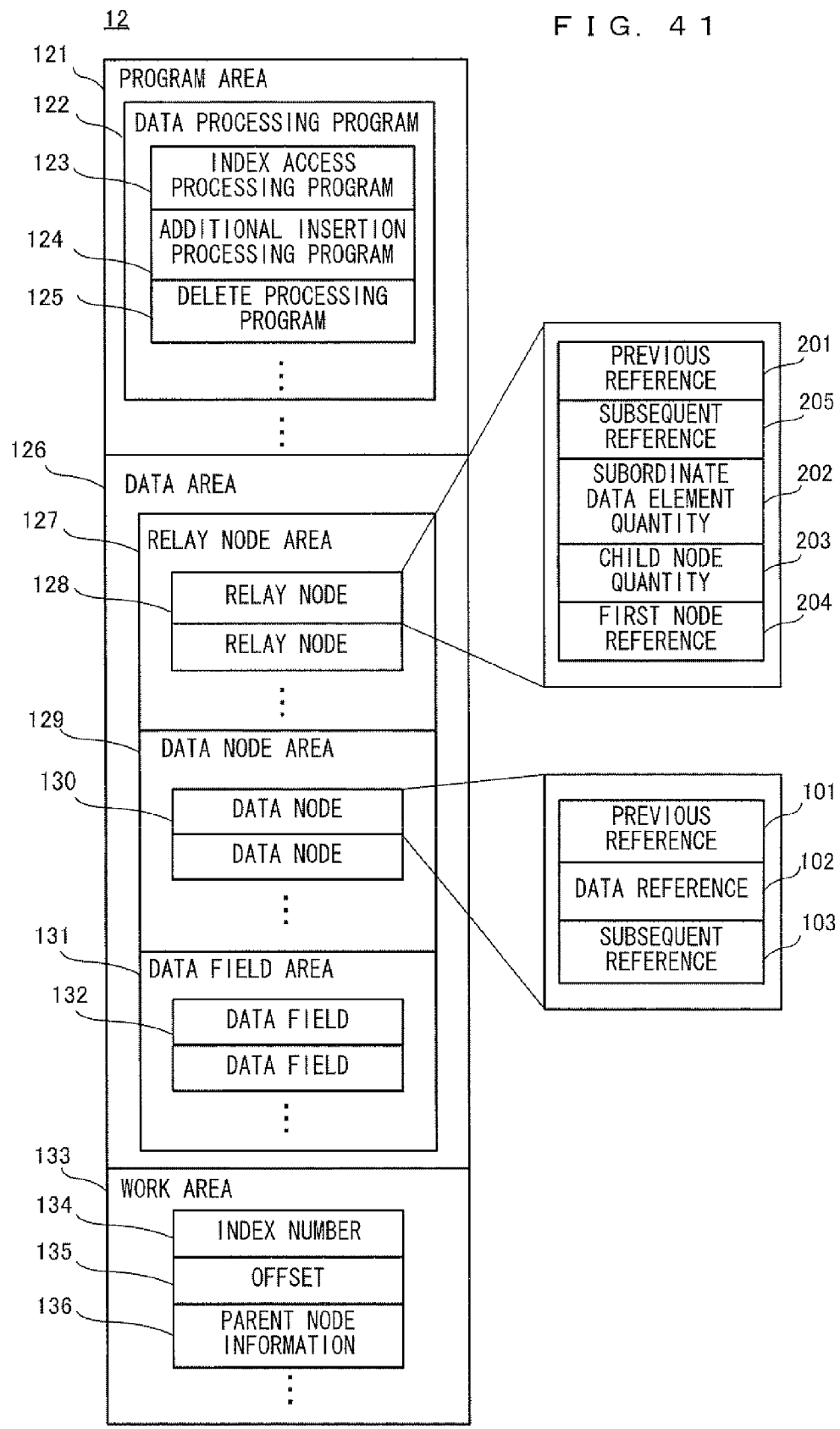
FIG. 41 shows an exemplary memory structure of a RAM 12.

Next, data stored on the RAM 12 for executing the data operation processing according to this embodiment will be described. FIG. 41 shows an exemplary memory structure of the RAM 12. As shown in FIG. 41, the RAM 12 includes a program area 121, a data area 126, and a work area 133. The program area 121 stores a data processing program 122 to be executed by the CPU 11. The data processing program 122 includes an index access processing program 123, an additional insertion processing program 124, a delete processing program 125 and the like. The program area 121 also includes a program for accepting an input operation by a user via the input section 13, a program for controlling the output to the display section 14, and the like.

The data area 126 includes a relay node area 127, a data node area 129, and a data field area 131. The relay node area 127 is an area where the relay nodes described above are stored. The data node area 129 is an area where the data nodes described above are stored. The data field area 131 is an area where the data fields described above are stored. In FIG. 41, elements of the nodes described above with reference to FIG. 6 and FIG. 7 bear the same reference numerals as those in FIG. 6 and FIG. 7.

A data field 132 is a specific substance of data. As described above, the memory address of the RAM 12 at which the data field 132 is stored is set as the value of the data reference 102.

The work area 133 stores an index number 134, an offset 135, parent node information 136 and the like which are variables used in the processing described later. The index number 134 is information indicating the position in the layered list structure of the data element to be accessed, the position in the layered list structure to which the data is to be inserted, or the position in the layered list structure from which the data is to be deleted. As described above, the index number 134 indicates the position from the beginning. The offset 135 is a variable used for executing the index access. The parent node information 136 is information indicating a parent node as described above. Specifically, the parent node information 136 indicates a memory address at which the "relay node last accessed in the layer immediately above the node of interest" is stored. This information is set as necessary when each node is accessed in the processing described later.

Hereinafter, with reference to FIG. 42 through FIG. 53, the data operation program executed in this embodiment will be described in detail.

(Index Access Processing)

Figure 42:
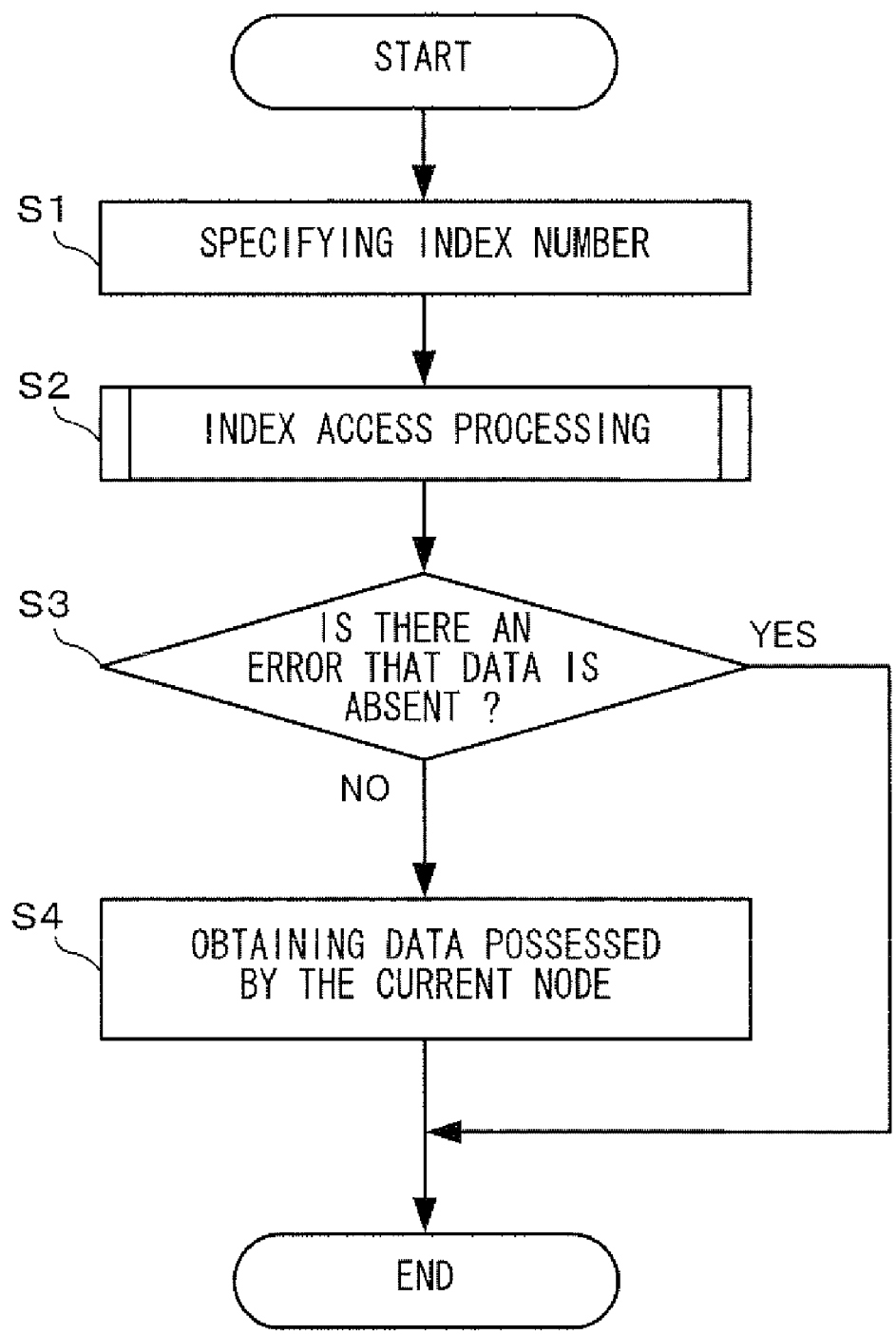
FIG. 42 is a flowchart showing the details of data obtaining processing.

First, as an example of processing for index access, data obtaining processing for obtaining data at an index position will be described in detail. FIG. 42 is a flowchart showing the details of the data obtaining processing. This processing is executed when, for example, the user specifies the position of data to be obtained using the input section 13 (specifies, for example, "n'th data from the beginning") and performs a predetermined button operation. Needless to say, this processing may be set to be executed when the CPU 11 executing a predetermined program calls the data obtaining processing based on the program, even without the operation by the user. For example, this processing may be set to be called by specifying an index number for (n), which is the argument, of a function having the form of "select(n)". The specification of "select(3)" indicates that the third data from the beginning in the layered list structure is to be obtained. (Such a manner of specification is usable for executing processing of updating the specified data, as well as processing of obtaining the specified data. For example, it may be instructed to update the third data by a function having the form of "update(3, "content of update")".)

As shown in shown in FIG. 42, the CPU 11 first sets the index number 134 based on the input by the user via the input section 13 (or based on a value specified as the argument as described above) (step S1).

Figure 43:
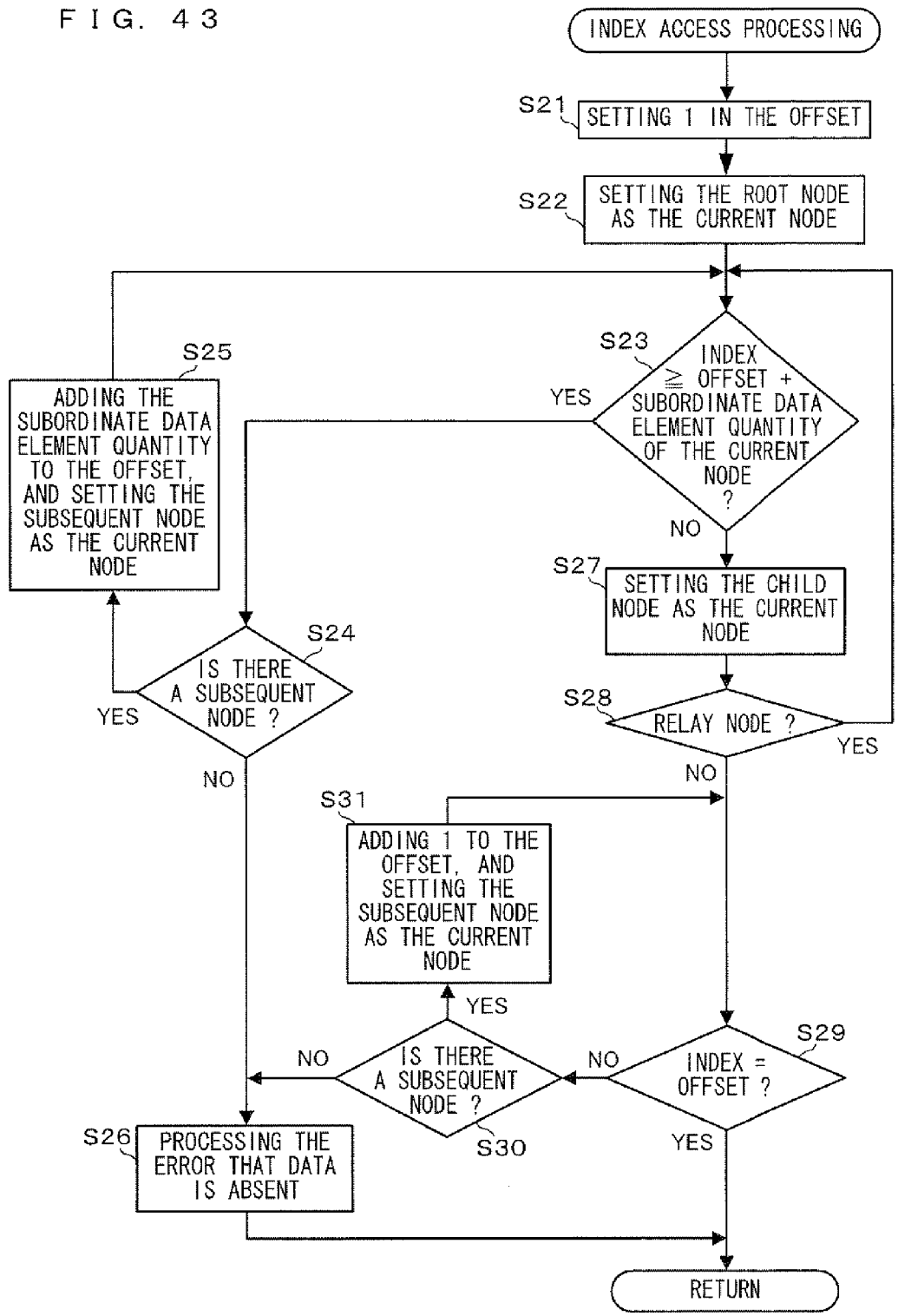
FIG. 43 is a flowchart showing the details of index access processing shown as step S2 in FIG. 14.

Next, the CPU 11 executes index access processing for accessing The position of the data indicated by the index number 134 (step S2). FIG. 43 is a flowchart showing the details of the index access processing shown as step S2. As shown in FIG. 43, the CPU 11 first sets "1" in the offset 135 (step S21). Next, the CPU 11 sets the root node as the current node, i.e., the processing target node (step S22).

Next, the CPU 11 obtains the subordinate data element quantity 202 from the current node and calculates a sum of the subordinate data element quantity 202 and the offset 135. The CPU 11 determines whether or not the index 134 is equal to or larger than the calculated value (step S23).

When it is determined that the index number 134 is equal to or larger than the calculated value (YES in step S23), the CPU 11 determines whether or not there is a subsequent node of the current node (step S24) in order to execute the processing of checking the nodes in the same layer as described above with reference to FIG. 12. Specifically, the CPU 11 makes the determination depending on whether "NULL" is set in the subsequent reference 205 of the current node (this processing is executed only when the current node is a relay node). When it is determined that there is a subsequent node of the current node (YES in step S24), the CPU 11 adds the subordinate data element quantity 202 of the current node to the offset 135. The CPU 11 then sets the subsequent node as the current node (step S25) and returns to the processing in step S23.

By contrast, when it is determined in step S24 that there is no subsequent node (NO in step S24), the target data is absent. Therefore, the CPU 11 executes processing for indicating error information that the search target data is absent (step S26). For example, when the index access processing is called as a function, the CPU 11 sets a value indicating an error as the return value.

When it is determined in step S23 that the index number 134 is smaller than the calculated value (NO in step S23), the CPU 11 sets the child node of the (present) current node as the (next) current node (step S27). Namely, the CPU 11 sets the node indicated by the first node reference 204 as the current node.

Next, the CPU 11 determines whether or not the current node is a relay node (step S28). This determination may be made depending on, for example, whether or not the current node has the child node quantity 203 or the subordinate data element quantity 202. The reason for this is that a data node does not have the subordinate data element quantity 202 or the child node quantity 203 (see FIG. 6 or FIG. 7). Alternatively, each node may be provided with an identifier for identifying the node itself is a relay node or a data node, and the CPU 11 may make the determination based on the identifier. When it is determined that the current node is a relay node (YES in step S28) the CPU 11 returns to step S23 to repeat the processing (this corresponds to the processing described above with reference to FIG. 9, FIG. 10 and FIG. 11).

By contrast, when if is determined in step S28 that the current node is not a relay node (NO in step S28), the current node is a data node. Therefore, the processing on the data node layer as described above with reference to FIG. 13 and FIG. 14 is executed. Namely, the CPU 11 determines whether or not "index number 134=offset 135" (step S29).

When it is determined that "index number 134≠offset 135" (NO in step S29), the CPU 11 determines whether or not there is a subsequent node of the current node (step S30). Specifically, the CPU 11 makes the determination depending on whether "NULL" is set in the subsequent reference R03 of the current node. When it is determined that there is no subsequent node (NO in step S30) the target data is absent. Therefore, the CPU 11 advances to processing in step S26.

By contrast, when it is determined in step S30 that there is a subsequent node (YES in step S30), the CPU 11 adds "1" to the offset 135. The CPU 11 also sets the subsequent node as the current node (step S31). Then, the CPU 11 returns to the processing in step S29. Namely, as described above with reference to FIG. 13 and FIG. 14, the CPU 11 executes the processing of checking data nodes in the data node layer one by one sequentially rightward.

When it is determined in step S29 that "index number=offset 135" (YES in step S29), the search target data has been found. Therefore, the CPU 11 terminates the index access processing. The index access processing is executed in this manner.

Returning to FIG. 42, after the index access processing, the CPU 11 determines whether or not an error that the data is absent has occurred (step S3). For example, as described above, when the index access processing is called as a function and further such an error has occurred, the CPU 11 sets a value indicating an error as the return value in step S26. Hence, the CPU 11 can determine whether or not an error has occurred by determining the content of the return value. When it is determined that an error that the data is absent has occurred (YES in step S3), the data obtaining processing is terminated without any further processing. When it is determined that there is no such error (NO in step S3), the CPU 11 obtains the data possessed by the current node. Namely, because the current node is now a data node as a result of the index access processing, the CPU 11 obtains the content of the data field indicated by the data reference 102 of this data node. The data obtaining processing is executed in this manner.

(Data Addition Processing)

Now, the data addition processing will be described in detail. As described above, the data addition processing is roughly classified into the processing of adding at the tail and the insertion processing by the difference in specific content of processing. Herein, the details of the processing of adding at the tall will be first described, and then the details of the insertion processing will be described.

(Processing of Adding at the Tail)

Figure 44:
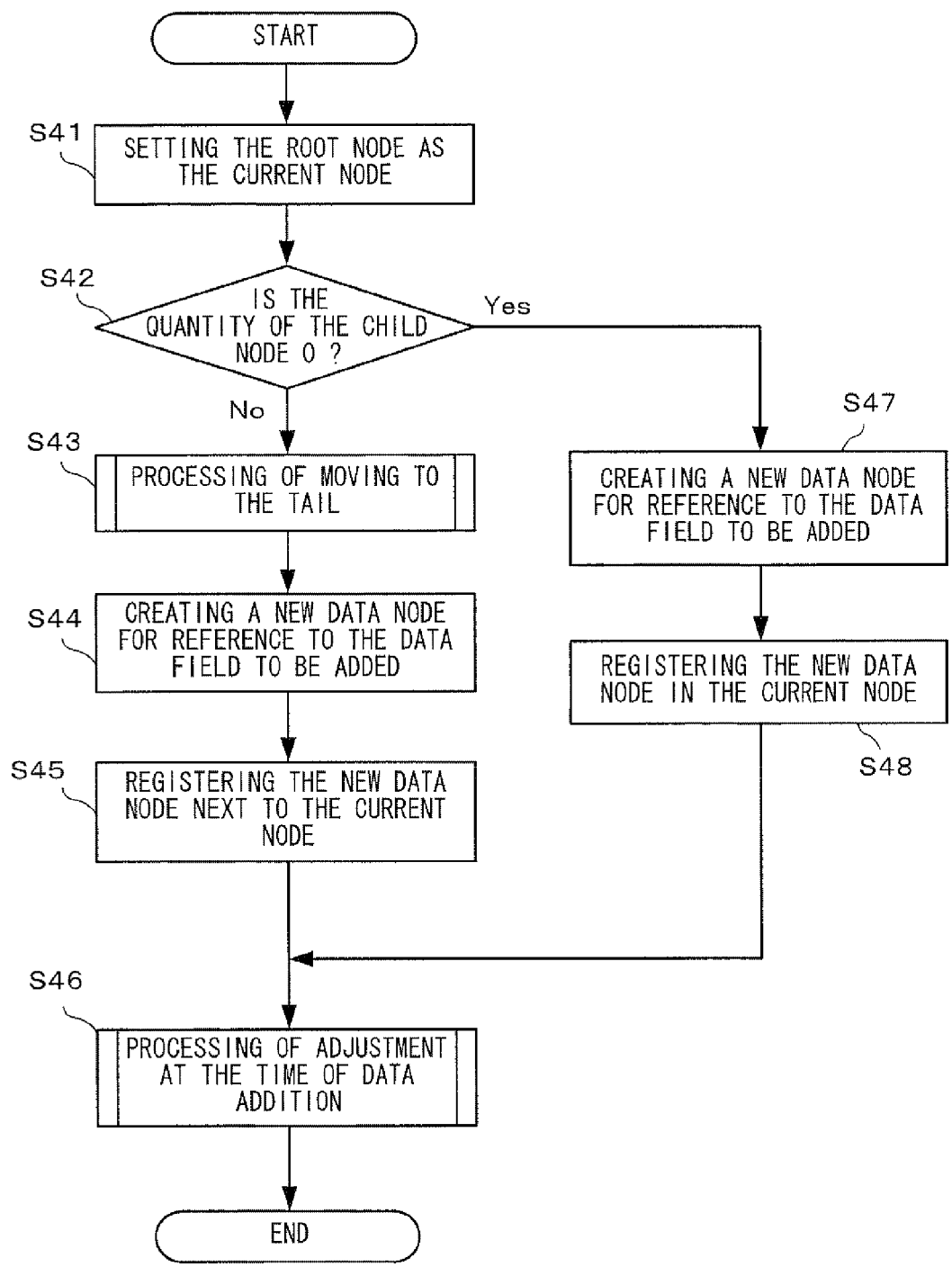
FIG. 44 is a flowchart showing the details of processing of adding at the tail.

FIG. 44 is a flowchart showing the details of the processing of adding at the tail. This processing is executed when, for example, the user inputs the data content to be added using the input section 13 and performs an operation for executing the processing of adding at the tail (a predetermined button operation or the like). Needless to say, this processing may be set to be executed when the CPU 11 executing a predetermined program calls the processing of adding at the tail based on the program, even without the operation by the user. (For example, this processing may be set to be called as a function, with no arguments, having the form of "ADD( )".) It is assumed that at the start of this processing, the data to be added has been newly created in the RAM 12 as a new data field 132.

As shown in FIG. 44, the CPU 11 first sets the root node as the current node (step S41). Next, the CPU 11 determines whether or not the child node quantity is 0 (step S42). Namely, the CPU 11 determines whether or not data is to be newly added. When it is determined that the child node quantity is 0 (YES in step S42), the CPU 11 generates a new data node which refers to the data field to be added (step S47). Namely, the CPU 11 generates a new data node and sets the reference to the data field to be newly added as the data reference 102. Then, the CPU 11 registers the new data node in the current node (step S48). Then, the CPU 11 advances to processing in step S46 described later.

Figure 45:
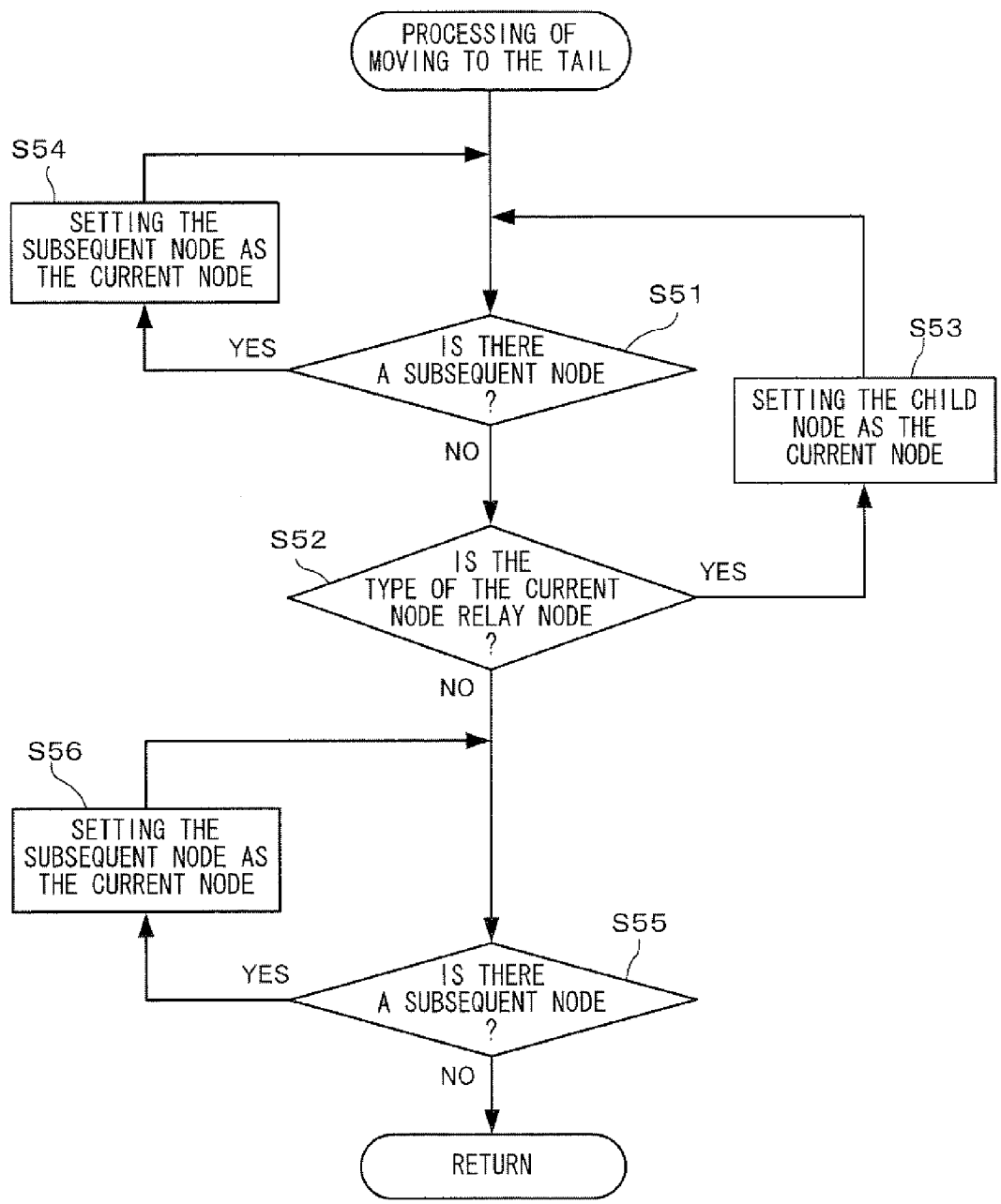
FIG. 45 is a flowchart showing the details of processing of moving to the tail shown as step S43 in FIG. 44.

By contrast, when it is determined in step S42 that the child node quantity is not C, i.e., some data is already present (NO in step S42), the CPU 11 executes the processing of moving to the tail, i.e., the processing for moving the current node to the position at the tail of a line of data fields in the layered list structure (step S43). FIG. 45 is a flowchart showing the details of the processing of moving to the tail shown as step S43. In the example of FIG. 1, this processing is to simply move the current node from the top left to the bottom right. As shown in FIG. 45, the CPU 11 first determines whether or not there is a subsequent node of the current node (step S51). Immediately after the start of this processing, the current node is a root node, and therefore it is determined that there is no subsequent node.

When it is determined that there is no subsequent node (NO in step S51), the CPU 11 determines whether or not the current node is a relay node (step S52). When it is determined that the current node is a relay node (YES in step S52), the CPU 11 sets the child node of the (present) current node as the (next) current node (step S53). In the example of FIG. 1, this corresponds to the processing of moving the current node sequentially downward. Then, the CPU 11 returns to the processing in step S51.

By contrast, when it is determined in step S51 that there is a subsequent node (YES in step S51), the CPU 11 sets the subsequent node of the (present) current node (i.e., the node indicated by the subsequent reference 205) as the (next) current node (step S54). In the example of FIG. 1, this corresponds to the processing of moving the current node sequentially rightward. Then, the CPU 11 returns to the processing in step S51. Such a loop of processing is performed, so that the current node is moved until reaching a node which is not a relay node, i.e. until reaching the data node layer.

Next, when it is determined in step S52 that the current node is not a relay node (NO in step S52), i.e., when the current node is a data node (in the example of FIG. 7, when the current node has reached the position of DN07), the CPU 11 determines whether or not there is a subsequent node of the current node (step S55). When it is determined that there is a subsequent node (YES in step S55), the CPU 11 sets the subsequent node as the current node (step S56). Then, the CPU 11 returns to the processing in step S55. In the example of FIG. 1, this corresponds to the processing of moving the current node sequentially rightward in the data node layer.

By contrast, when it is determined in step S55 that there is no subsequent node (NO in step S55), the current node has reached the position of the tail (in the example of FIG. 1, the position of DN08). Therefore, the CPU 11 terminates the processing of moving to the tail.

Returning to FIG. 44, after the current node is moved in the layered list structure to the tail of the data elements by the processing in step S43, the CPU 11 generates a new data node (step S44).

Next, the CPU 1 registers the new data node in the layered list structure so as to be the current node, i.e., subsequent to the data node at the tail (step S45). Specifically, the CPU 11 sets the reference to the new data node as the subsequent reference 103 of the current node. The CPU 11 also sets the reference to the current node as the previous reference 101 of the new data node. The CPU 11 sets the NULL value in the subsequent reference 103 of the new data node. In the example of FIG. 1, a new data node and a new data field are added to the right of DN05.

Figure 46:
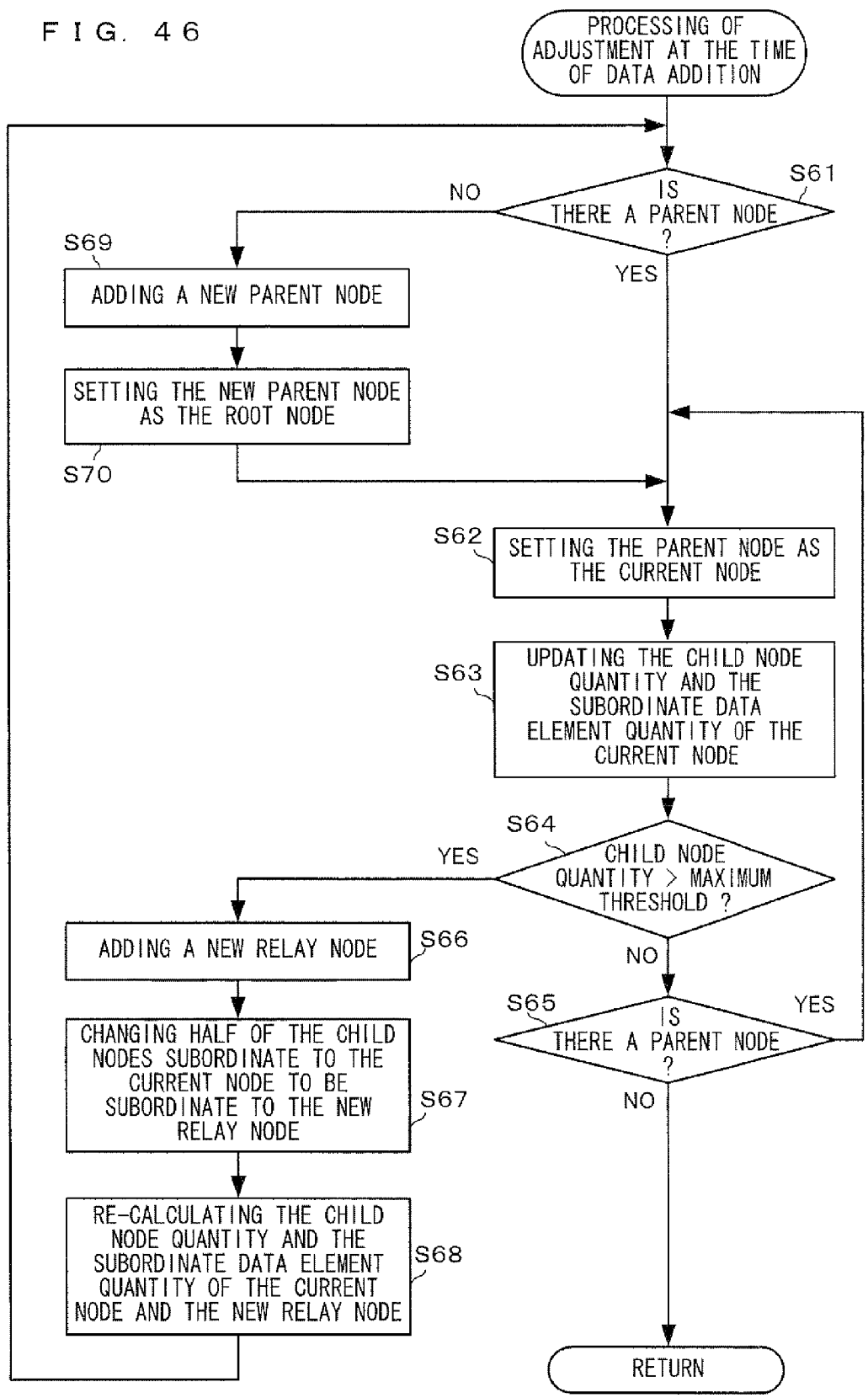
FIG. 46 is a flowchart showing the details of processing of adjustment at the time of data addition shown as step S46 in FIG. 44.

Next, the CPU 11 executes the processing of adjustment at the time of data addition (step S46). This processing is performed, when a data element is added, in order to update the subordinate data element quantity 202 or the like of the corresponding relay node or to optionally adjust the number of relay nodes in order to maintain a certain level of search performance as described above. FIG. 46 is a flowchart showing the details of the processing of adjustment at the time of data addition shown as step S46. As shown in FIG. 46, the CPU 11 first determines whether or not there is a parent node of the current node (step S61). This determination is made based on the parent node information 136 of the current node. The nodes except for the root node have a parent node. Thus, this determination can be rephrased as a determination on whether or not the current node is a root node. At this point, the current node is the second node from the tail because the new data has been added to the tail as described above.

When it is determined that there is a parent node (YES in step S61), the CPU 11 sets the parent node as the current node (step S62). In the example of FIG. 1, as a result of determining whether or not there is a parent node of DN08, the CPU 11 newly sets RN03, which is the parent node of DN08, as the current node.

Next, the CPU 11 updates the child node quantity 203 and the subordinate data element quantity 202 of the current node (step S63). In this example, one data node and one data field have been newly added. Therefore, "1" added to each of the child node quantity 203 and the subordinate data element quantity 202.

Next, the CPU 11 determines whether or not the child node quantity 203 of the current node has exceeded a predetermined maximum threshold mentioned above (step S64). When it is determined that the child node quantity 203 of the current node has not exceeded the predetermined maximum threshold (NO in step S64), the CPU 11 determines whether or not there is a parent node of the current node (i.e., whether or not the current node is a root node) (step S65). When it is determined that there is a parent node, i.e., when the current node is not a root node (YES in step S65), the CPU 11 returns to step S62 to repeat the processing. In the example of FIG. 1, the relay nodes are sequentially checked from the bottom right to the top left (RN03→RN12→RN21).

By contrast, when it is determined in step S65 that there is no parent node (NO in step S65), the current node has reached the position of the root node. Therefore, the CPU 11 terminates the processing.

When it is determined in step S64 that the child node quantity 203 has exceeded the predetermined maximum threshold (YES in step S64), the processing of adding a relay node described above with reference to FIG. 25 through FIG. 27 is executed.

The CPU 11 first generates a new relay node and adds the new relay node so as to be subsequent to the current node (step S66). Namely, the CPU 11 sets the subsequent reference 205 of the current node as the subsequent reference 205 of the new relay node and then updates the subsequent reference 205 of the current node to the reference to the new relay node. The previous reference 201 is also updated in correspondence with the subsequent reference 205.

Next, the CPU 11 executes the processing of changing half of the child nodes subordinate to the current node to be subordinate to the new relay node (see FIG. 27) (step S67). Specifically, the CPU 11 first divides the child node quantity 203 of the current node by "12" (in the case where the child node quantity 203 is an odd number, the fraction of the result smaller than the decimal point is rounded off downward or upward). Next, the CPU 11 obtains a memory address of the node which is positioned after the node indicated by the first node reference 204 of the current node, by the value of the division result. Then, the CPU 11 sets the memory address as the first node reference 204 of the new relay node. In the example of FIG. 27, the current node is RN02, and the first node reference 204 indicates DN04. The result of dividing the child node quantity 203 of RN02 by "2" is "2". Therefore, the memory address of DN05, which is to the right of DN04 by two is obtained. Then, the CPU 11 sets the reference to DN05 as the first node reference 204 of the new relay node.

Next, the CPU 11 recalculates and sets the subordinate data element quantity 202 and the child node quantity 203 of both of the current node and the new relay node (step S68). Then, the CPU 11 returns to step S61 to repeat the processing.

When it is determined in step S61 that there is no parent node (NO in step S61), the CPU 11 executes the following processing. This processing path is taken only when a relay node is added in the layer having the root node. Namely, because there are two relay nodes in the highest layer, the processing of newly creating a layer above the highest layer is executed.

The CPU 11 first generates a parent node which refers to the current node as the first node (step S69). Specifically, the CPU 11 generates a new relay node and sets the reference to the relay node, which is the current node, as the first node reference 204 of the new relay node. The CPU 11 also optionally sets the subordinate data element quantity 202 and the child node quantity 203 of the new relay node. The CPU 11 sets the NULL value in the previous reference 201 and the subsequent reference 205 of the new relay node.

Next, the CPU 11 sets the parent node newly generated in step S69 as the root node (step S70). The "reference from outside" described above (in the example of FIG. 1, the element above RN21) is referring to the current node at this point. Therefore, specifically, the CPU 11 updates the content of the reference from outsider to the reference to the newly generated parent node. Then, the CPU 11 advances to the processing in step S62 described above. As a result, the newly generated parent node is set as the current node, and the CPU 11 results in taking the processing path for NO in step S65. Thus, the CPU 11 terminates the processing of adjustment at the time of data addition.

Returning to FIG. 44, when the processing of adjustment at the time of data addition is terminated, the processing of adding at the tail is terminated. The processing of adding at the tail is executed in this manner.

(Insertion Processing)

Figure 47:
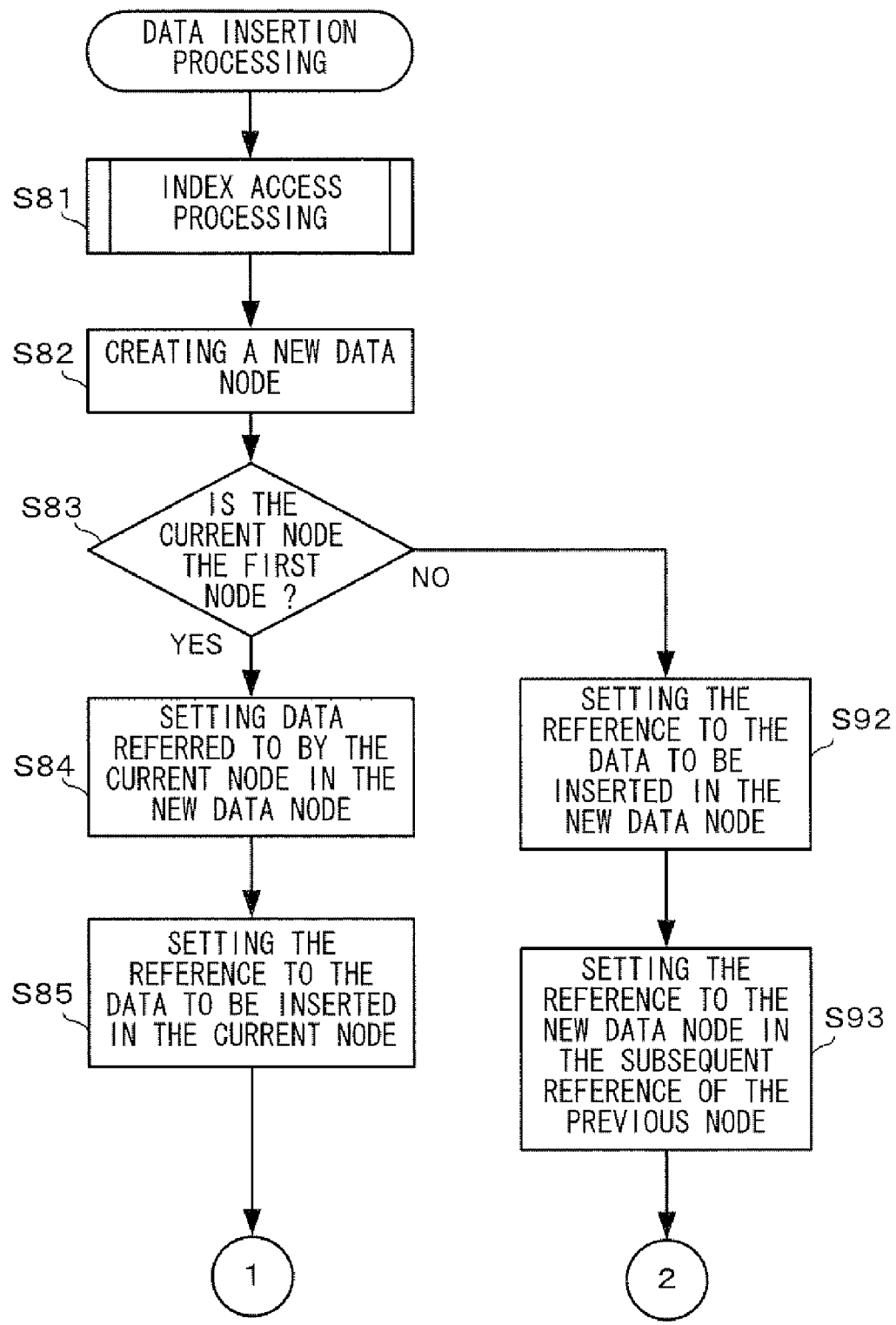
FIG. 47 is a flowchart showing details of insertion processing.
Figure 48:
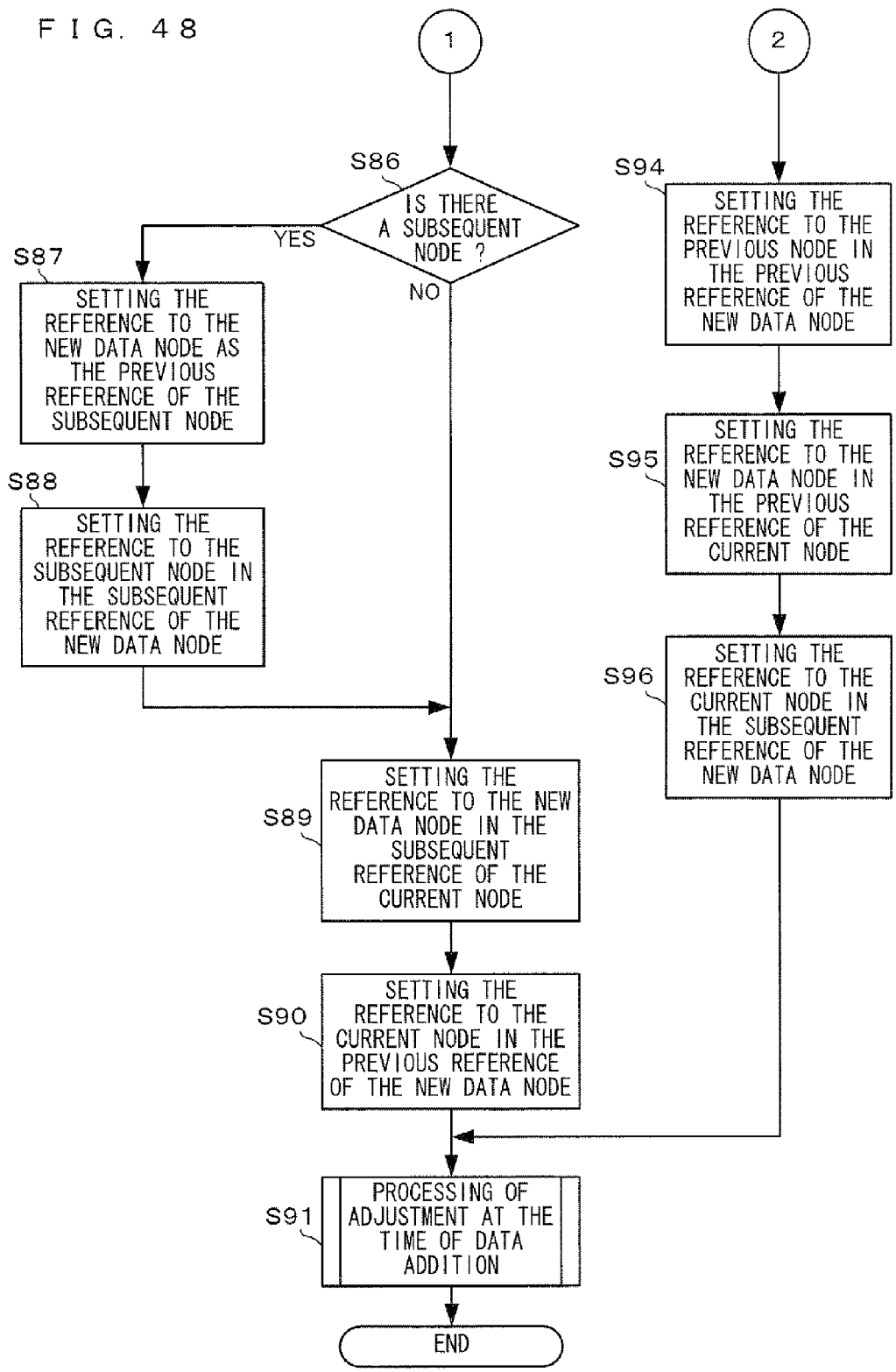
FIG. 48 is a flowchart showing details of the insertion processing.

Now, the insertion processing will be described in detail. FIG. 47 and FIG. 48 are a flowchart showing the details of the insertion processing. Like in the processing of adding at the tail, it is assumed that at the start of this processing, the data to be added has been newly created in the RAM 12 as a new data field 132. It is also assumed that the index number indicating the position to which the data is to be inserted has also been specified. (For example, this processing may be set to be called as a function having the form of "insert(n)". An index number is specified for (n), which is the argument. For example, "insert(3)" indicates that the data is to be inserted at the third position from the beginning.)

As shown in FIG. 47, the CPU 11 first executes the index access processing (step S81) Namely, the CPU 11 moves the current node to the position of the data element specified by the index number (see FIG. 16). This processing is the same as that described above with reference to FIG. 43, and a detailed explanation thereof is not repeated here.

Next, the CPU 11 generates a new data node which refers to a data field to be added (step S82). Namely, the CPU 11 generates a new data node and sets the reference to the data field to be newly inserted as the data reference 102 of the new data node.

Next, the CPU 11 determines whether or not the current node is a first node (step S83). When it is determined that the current node is a first node (YES in step S83), the CPU 11 executes the processing of inserting the data exchanged between the new data node and current node as described above with reference to FIG. 17. Namely, the CPU 11 sets the reference to the data field indicated by the data reference 102 of the current node as the data reference 102 of the new data node (step S84).

Next, the CPU 11 sets the reference to the data field to be inserted this time as the data reference 102 of the current node (step S85). Then, the CPU 11 determines whether or not there is a subsequent node of the current node (step S86). When it is determined that there is a subsequent node (YES in step S36), the CPU 11 executes the processing of updating the reference relationship between the new data node and the subsequent node. Namely, the CPU 11 sets the reference to the new data node as the previous reference 101 of the subsequent node (step S87). Then, the CPU 11 sets the reference to the subsequent node as the subsequent reference 103 of the new data node (step S88). Then, the CPU 11 advances to processing of step S89 described later.

By contrast, when its determined in step S86 that there is no subsequent node (NO in step S86), the CPU 11 advances to the processing in step S89 without executing the processing in steps S87 and S88.

Next, the CPU 11 executes the processing of updating the reference relationship between the current rode and the new data node. The CPU 11 first sets the reference to the new data node as the subsequent reference 103 of the current node (step S89). Then, the CPU 11 sets the reference to the current node as the previous reference 101 of the new data node (step S90). The CPU 11 executes the processing of adjustment at the time of data addition described above to adjust the relay nodes (step S91). The processing of adjustment at the time of data addition is the same as that described above with reference to FIG. 46, and a detailed explanation thereof is not repeated here.

When it is determined in step S83 that the current node is not a first node (NO in step S83), the CPU 11 executes the processing of simply inserting new data at a specified position as described above with reference to FIG. 22 through FIG. 24.

The CPU 11 first sets the reference to the data field to be inserted this time as the data reference 102 of the new data node (step S92).

Next, the CPU 11 executes the processing of setting the reference relationship such that the new data node is positioned previous to the current node. Namely, the CPU 11 sets the reference to the new data node as the subsequent reference 103 of the previous node (step S93). Then, the CPU 11 sets the reference to the previous node of the current node as the previous reference 101 of the new data node (step S94).

Then, the CPU 11 sets the reference to the new data node as the previous reference 101 of the current node (step S95). Next, the CPU 11 sets the reference to the current node as the subsequent reference 103 of the new data node (step S96). Then, the CPU 11 advances to the processing in step S91. When the processing in step S91 is finished, the insertion processing in this embodiment is finished.

(Delete Processing)

Figure 49:
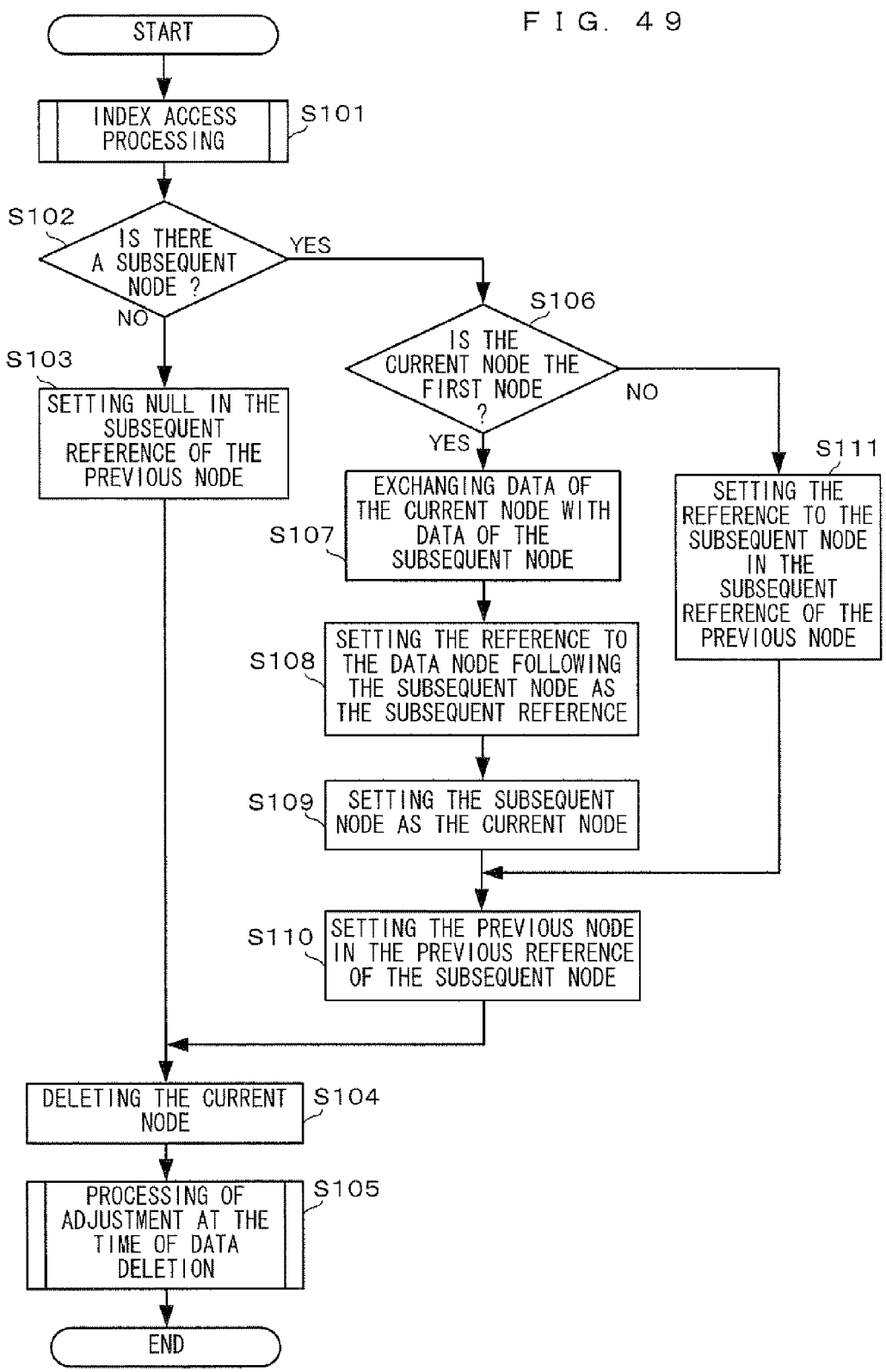
FIG. 49 is a flowchart showing details of delete processing.

Now, the delete processing will be described in detail. FIG. 49 is a flowchart showing the details of the delete processing. This processing is executed when, for example, the user inputs the position of the data to be deleted (i.e., the index number) using the input section 13 and performs an operation for executing the delete processing (a predetermined button operation or the like). This processing may be set to be executed when the CPU 11 executing a predetermined program calls the delete processing based on the program. (For example, this processing may be set to be called as a function having the form of "delete(n)". An index number is specified for (n), which is the argument.)

As shown in FIG. 49, the CPU 11 first executes the index access processing (step S101). Namely, the CPU 11 moves the current node to the position of the data element specified by the index number (see FIG. 28). This processing is the same as that described above with reference to FIG. 43, and a detailed explanation thereof is not repeated here.

Next, the CPU 11 determines whether or not there is a subsequent node (step S102). When it is determined that there is no subsequent node (NO in step S102), the CPU 11 executes the processing of deleting the current node. The determination result that there is no subsequent node means that the current node (as a result of the index access processing, the current node is now a data node) is positioned at the tail of the data regardless of whether or not the current node is a first node. Therefore, the CPU 11 may execute the processing of simply deleting the current node at the tail with no further processing. In this case, the CPU 11 sets NULL in the subsequent reference 103 of the previous node (step S103). Then, the CPU 11 deletes the current node and the data field referred to by the current node (step S104). After this, the CPU 11 executes the processing of adjustment at the time of data deletion described later (step S105). When the processing of adjustment at the time of data deletion is finished, the delete processing in this embodiment is finished.

By contrast, when it is determined in step S102 that there is a subsequent node (YES in step S102), the CPU 11 determines whether or not the current node is a first node (step S106). When it is determined that the current node is a first node (YES in step S106), the CPU 11 executes the processing of exchanging data between the current node and the subsequent node thereof and deleting the subsequent node, which is described above with reference to FIG. 29 and FIG. 30. In this case, the CPU 11 first executes the processing of exchanging data referred to by the current node and the data referred to by the subsequent node (step S104). Specifically, the CPU 11 sets the data field indicated by the data reference 102 of the current node as the data reference 102 of the new data node, and sets the data field indicated by the data reference 102 of the new data node as the data reference 102 of the current node.

Next, the CPU 11 sets the reference to a data node subsequent to the subsequent node (i.e., a data node which is two data elements after the current node) as the subsequent reference 103 of the current node (step S108). In the example of FIG. 30 and FIG. 31, the subsequent reference 103 of DN04 is changed from DN05 to DN06.

Next, the CPU 11 sets the subsequent node as the current node (step S109). Then, the CPU 11 sets the reference to the previous node of the current node as the previous reference 101 of the subsequent node of the current node (step S110). In the example of FIG. 30 and FIG. 31, the current node is changed from DN04 to DN06, and the reference to DN04 is set as the previous reference 101 of DN06. Then, the CPU 11 advances to the processing in step S104 described above.

By contrast, when it is determined in step S106 that the current node is not a first node (NO in step S106), the CPU 11 executes the processing of simply deleting the current node described above with reference to FIG. 35. Namely, the CPU 11 sets the reference to the subsequent node as the subsequent reference 103 of the previous node. In the example of FIG. 35 and FIG. 36, the current node W as DN03, the previous node is DN02 and the subsequent node is DN04. In this state, DN04 is set as the subsequent reference 103 of DN02. Then, the CPU 11 advances to the processing in step S110 described above. In step S110, in the example of FIG. 35 and FIG. 36, the reference to DN02 is set as the previous reference 101 of DN04. After this, the CPU 11 deletes DN03, which is the current node, in step S104, and then executes the processing of adjustment at the time of data deletion described later in step S105. Then, the deletion processing in this embodiment is terminated.

Now, the processing of adjustment at the time of data deletion in step S105 will be described in detail. Like the adjustment processing in the insertion processing, this processing is executed for performing various adjustments required by the data deletion, for example, adjustment of the number of relay nodes (reflection of the deleted relay nodes), update of the subordinate data element quantity 202 or the like.

Figure 50:
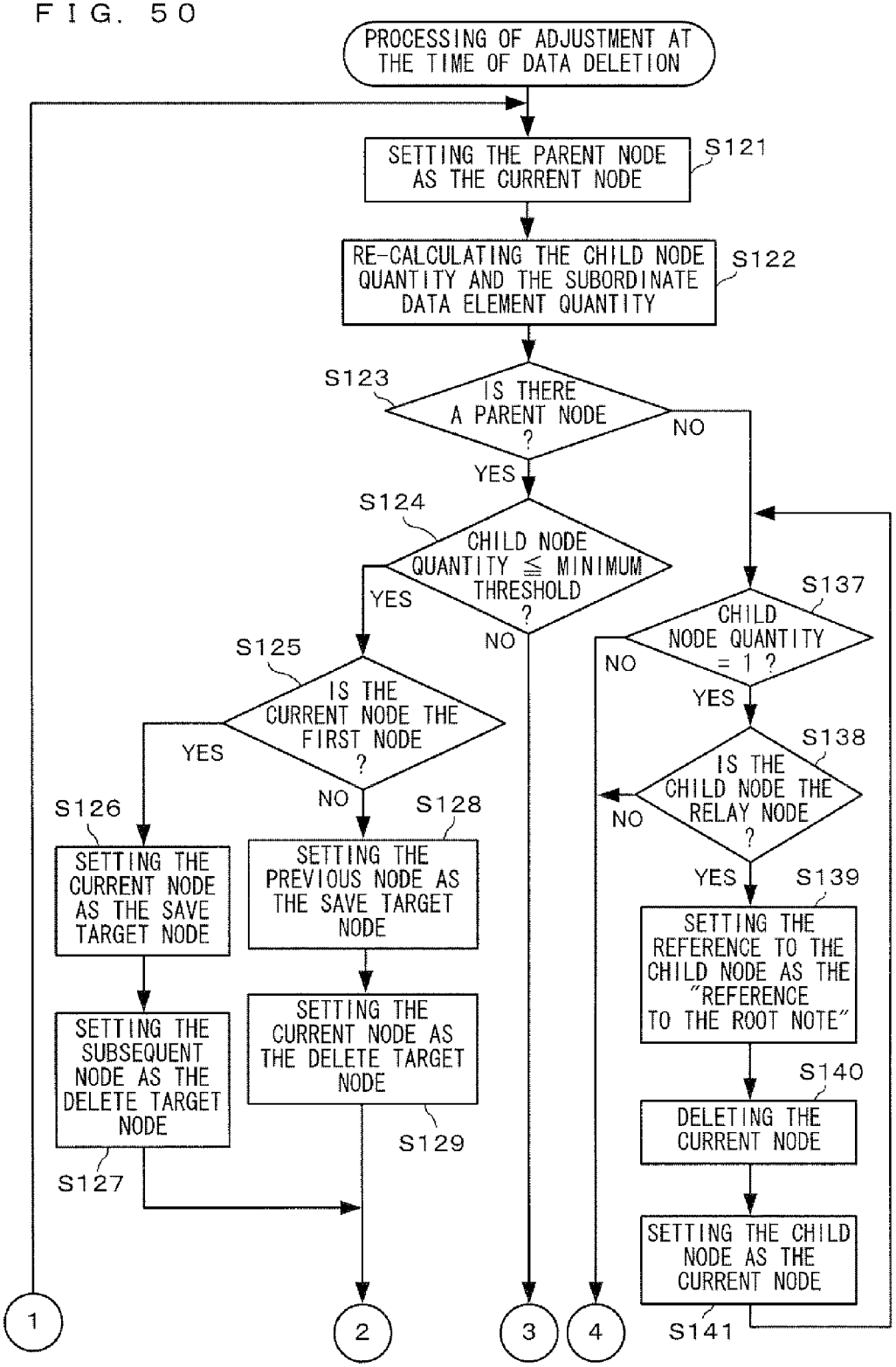
FIG. 50 is a flowchart showing details of processing of adjustment at the time of data deletion shown as step S105 in FIG. 49.
Figure 51:
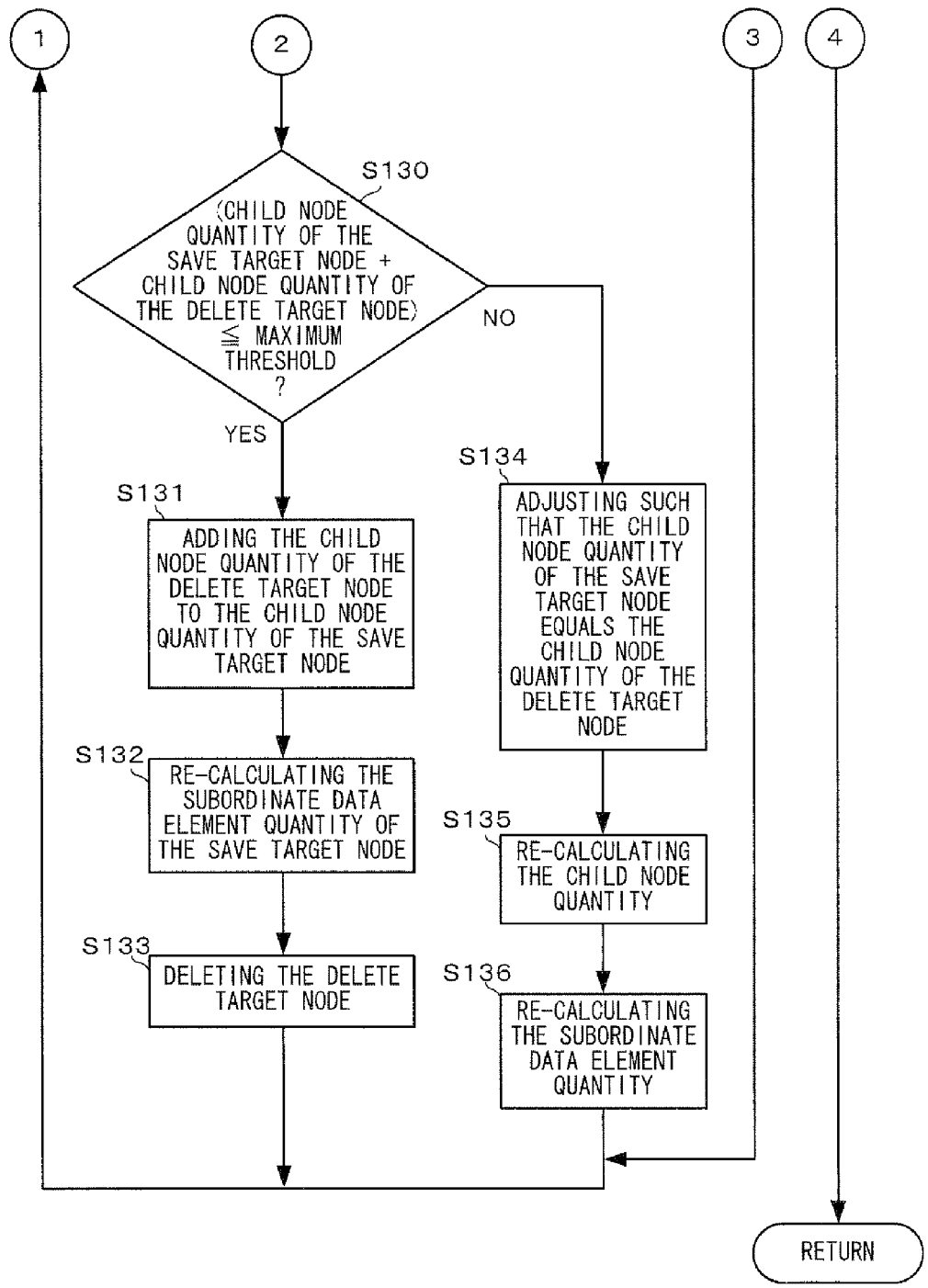
FIG. 51 is a flowchart showing details of the processing of adjustment at the time of data deletion shown as step S105 in FIG. 49.
Figure 54:
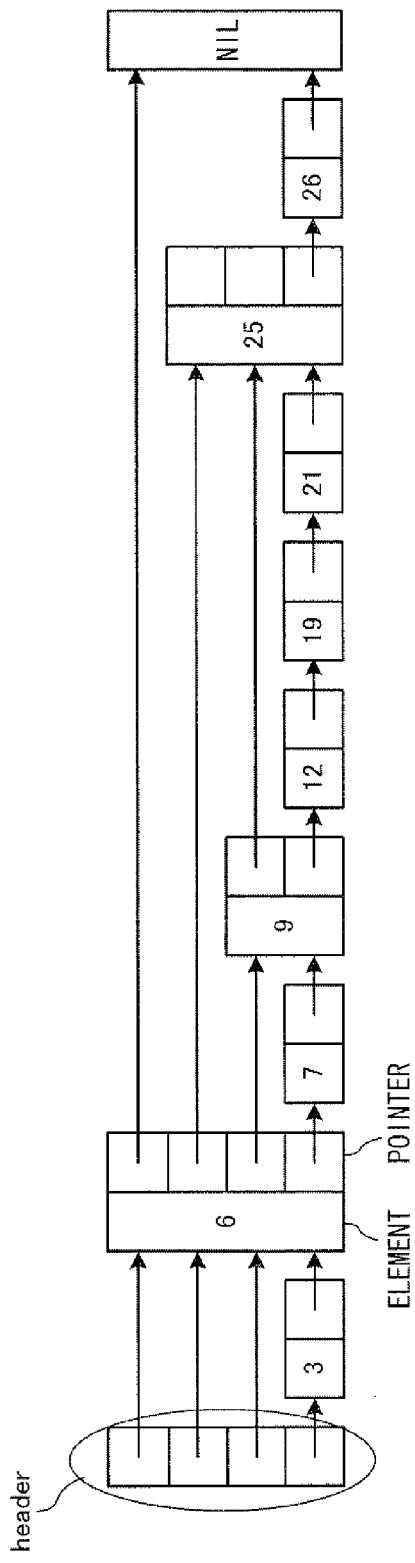
FIG. 54 shows a conventional skip list.
Figure 55:
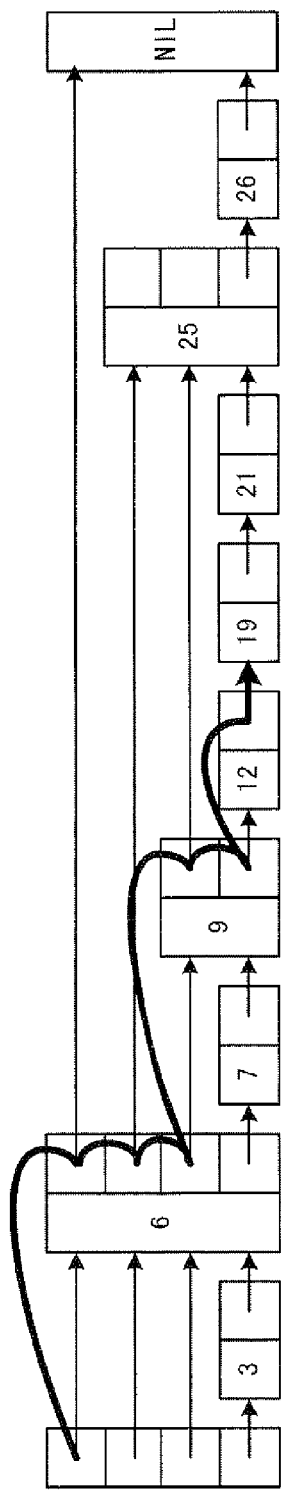
FIG. 55 shows a conventional skip list.

FIG. 50 is a flowchart showing the details of the processing of adjustment at the time of data deletion shown as step S105. As shown in FIG. 50, the CPU 11 first sets the parent node of the present current node as the next current node (step S121). Immediately after the start of this processing, the current node is a data node. Therefore, when the processing in step S121 is executed, one of the relay nodes in the relay node first layer is set as the current node.

Next, the CPU 11 re-calculates the child node quantity 203 and the subordinate data element quantity 202 of the current node (step S229. When the current node is a relay node in the relay node first layer, a value obtained by subtracting "1" from each of the child node quantity 203 and the subordinate data element quantity 202 is found as a result of the re-calculation.

Next, the CPU 11 determines whether or not there is a parent node of the present current (step S123). Namely, the CPU 11 determines whether or not the current node is a root node.

When it is determined in step S123 that there is a parent node (YES in step S123), the CPU 11 determines whether or not the child node quantity 203 of the current node is equal to or smaller than the minimum threshold mentioned above (step S124). When it is determined that the child node quantity 203 of the current node is equal to or smaller than the minimum threshold (YES in step S124), the CPU 11 executes the processing of adjusting the values of the child node quantity 203 of adjacent relay nodes to be equal to each other or combining the values of the child node quantity 203 of the adjacent relay nodes, which is described above with reference to FIG. 38 and FIG. 39. Specifically, the CPU 11 first determines whether or not the current node is a first node (step S125).

When it is determined in step S125 that the current node is a first node (YES in step S125), the CPU 11 sets the current node as the "save target node" described above (step S126). Next, the CPU 11 sets the subsequent node of the present current node as the "delete target node" (step S127). Then, the CPU 11 advances to processing in step S3130 described later.

By contrast, when it is determined in step S125 that the current node is not a first node (NO in step S125), the CPU 11 sets the previous node as the "save target node" (step S3.28). Next, the CPU 11 sets the current node as the "delete target node" (step S129).

Next, the CPU 11 calculates a sum of the child node quantity 203 of the save target node and the child node quantity 203 of the delete target node. Then, the CPU determines whether or not the calculated value is equal to or smaller than the maximum threshold (step S130). When it is determined that the calculated value is larger than the maximum threshold (NO in step S130), the CPU 11 executes the processing of adjusting the child node quantity 203 of the save target node and the child node quantity 203 of the delete target node to be equal to each other (in the case where the calculated value is an odd number, substantially equal to each other) (step S134).

Specifically, the CPU 11 divides the value calculated in step S130 by "2" (the fraction of the result smaller than the decimal point is rounded off downward). Next, the CPU 11 obtains a memory address of the node which is positioned after the data node indicated by the first node reference 204 of the save target node, by the value of the division result. Then, the CPU 11 sets the memory address as the first node reference 204 of the delete target node.

Next, the CPU 11 updates the child node quantity 203 of each of the save target node and the delete target node (step S135). Namely, the CPU 11 recalculates the child node quantity subordinate to the save target node and the child node quantity subordinate to the delete target node, and sets each obtained value as the child node quantity 203 of the respective node.

Next, the CPU 11 recalculates and sets the subordinate data element quantity 202 of each of the save target node and the delete target node (step S136). Then, the CPU 11 returns to step S121 to repeat the processing.

By contrast, when it is determined in step S130 that the sum of the child node quantity 203 of the save target node and the child node quantity 203 of the delete target node is equal to or smaller than the maximum threshold (YES in step S130), the CPU 11 executes the processing of adjusting the child nodes subordinate to the delete target node to be subordinate to the save target node, i.e., the processing of combining the save target node and the delete target node, which is described above with reference to FIG. 39. The CPU 11 first adds the child node quantity 203 of the delete target node to the child node quantity 203 of the save target node (step S131). Then, the CPU 11 re-calculates the number of data elements subordinate the save target node, and updates the subordinate data element quantity 202 of the save target node with the re-calculated value (step S132). Then, the CPU 11 deletes the delete target node (step S133). As a result of such processing, the child nodes subordinate to the delete target node are made subordinate to the save target node, and thus the relay nodes are combined together.

When it is determined in step S123 that there is no parent node (NO in step S123), i.e., the current node is a root node, the CPU 11 executes the processing generally described below with reference to FIG. 52 and FIG. 53. This processing is to, when two layers each having one relay node are arranged vertically, delete one of the layers. Specifically, when the layer immediately below the root node has one relay node (i.e., when there is a layer having one relay node other than the layer of the root node) as shown in FIG. 52, the CPU 11 executes the processing of deleting the node in the highest layer as shown in FIG. 53.

When it is determined in step S123 that there is no parent node, the CPU 11 determines whether or not the child node quantity 203 of the current node is "1" (step S137). When it is determined that the child node quantity 203 of the current node is "1" (YES in step S137), the CPU 11 determines whether or not the child node is a relay node (step S138). When it is determined that the child node is not a relay node (NO in step S1338), the CPU 11 terminates the processing of adjustment at the time of data deletion. The reason for this is that the child node is a data node in this case, and therefore it is considered that the state shown in FIG. 52 where "two" layers each having one "relay node" are arranged "vertically" is not present.

By contrast, when it is determined in step S138 that the child node is a relay node (YES in step S138), two layers each having one relay node are arranged vertically as shown in FIG. 52. Therefore, the CPU 11 sets the reference to the child node as the "reference from outside" (the element represented by the circle in FIG. 52) (step S139). Next, the CPU 11 deletes the current node (step S140). As a result, the state shown in FIG. 33 is obtained. The CPU 11 sets the child node as the current node (step S141), and then returns to the processing in step S137.

By contrast, when it is determined in step S137 that the child node quantity 203 is not "1" (NO in step S137), the CPU 11 terminates the processing of adjustment at the time of data deletion with no further processing. The reason for this is, again, it is considered that the state shown in FIG. 52 where "two" layers each having one "relay node" are arranged "vertically" is not present.

The processing of adjustment at the time of data deletion is executed in this manner.

As described above, according to this embodiment, data is managed by providing relay nodes in a layer structure. Thus, a change in the search performance for index access can be suppressed. In addition, when data is added or deleted, adjustment is made so as to prevent the inter-relay node intervals from becoming unbalanced. Thus, the search performance is not changed even when data is added, inserted or deleted, and hence a certain level of search performance can be maintained.

In the above embodiment, a data node has reference to a data field. The present example embodiments of the invention are not limited to such a structure. A data node may include data itself, i.e., a data node and a data field may be integrated together.

While the example embodiments of the invention have been described in detail, the foregoing description is in all aspects illustrative and not restrictive. It is understood that numerous other modifications and variations can be devised without departing from the scope of the invention.

What is claimed is:

1. A non-transitory computer readable storage medium having stored thereon a data processing program for causing a computer of a predetermined information processing apparatus to execute:
   a layered list structure generation step of generating a layered list structure which is a data structure formed of a plurality of layers, the layered list structure including:
   a data element layer which includes a plurality of data elements, each including at least one of a substance of predetermined data and information indicating a position on a memory at which the substance of the predetermined data is stored, and is structured as a linked list in which the plurality of data elements are associated with one another and thus ordered; and
   a relay node layer which is positioned above the data element layer and includes a plurality of relay nodes, each being associated with one of elements in a layer immediately below;
   wherein:
   the relay node layer is further divided into a plurality of relay node layers;
   in each relay node layer, the relay nodes are ordered in accordance with the order of the elements in the layer immediately below; and
   in each relay node layer, the relay nodes ordered adjacent to each other are associated with each other.

2. An non-transitory computer readable storage medium having stored thereon a data processing program according to claim 1, wherein the data processing program causes the computer to further execute a data addition step of generating a new data element associated with a data element ordered at a tail of the data element layer, and adding the new data element to the data element layer so as to be ordered at the tail thereof.

3. A non-transitory computer readable storage medium having stored thereon a data processing program according to claim 2, wherein the data processing program causes the computer to further execute:
   a child node quantity determination step of determining, as a result of the addition of the data element, whether the number of child nodes, from the element which is in a layer immediately lower than each relay node layer and is associated with the relay node ordered at the tail in the each relay node layer until the element ordered at the tail of the layer including the associated element, has exceeded a first predetermined value; and
   a relay node addition step of, when the number of the child nodes is determined to have exceeded the first predetermined value in the child node quantity determination step, adding a new relay node immediately subsequent to the relay node ordered at the tail and associating the added relay node with one of the child nodes.

4. A non-transitory computer readable storage medium having stored thereon a data processing program according to claim 1, wherein the data processing program causes the computer to further execute a data insertion step of inserting a new data element at a predetermined position of the data element layer and associating the new data element with a data element ordered adjacent to the position for insertion.

5. A non-transitory computer readable storage medium having stored thereon a data processing program according to claim 4, wherein the data processing program causes the computer to further execute:
   a child node quantity determination step of determining, as a result of the insertion of the data element, whether the number of child nodes, from an element in a layer immediately lower than, and associate with, a predetermined relay node until an element immediately before an element in the immediately lower layer associated with an adjacent relay node which is ordered immediately subsequent to the predetermined relay node in the layer including the predetermined relay node, has exceeded a first predetermined value; and
   a relay node addition step of, when the number of the child nodes is determined to have exceeded the first predetermined value in the child node quantity determination step, inserting a new relay node between the predetermined relay node and the adjacent relay node and associating the inserted new relay node with one of the child nodes.

6. A non-transitory computer readable storage medium having stored thereon a data processing program according to claim 3, wherein the relay node addition step associates a child node ordered at the center of the child nodes with the relay node to be the added or inserted.

7. A non-transistory computer readable storage medium having stored thereon a data processing program according to claim 5, wherein the relay node addition step associates a child node ordered at the center of the child nodes with the relay node to be added or inserted.

8. A non-transitory computer readable storage medium having stored thereon a data processing program according to claim 4, wherein:
   the data elements are each formed by associating, as a pair, a data field, which is a substance of the predetermined data, and a data node having the information indicating a position on the memory at which the data field is stored;

the linked list is formed by associating the data nodes ordered adjacent to each other in the data element layer;

the relay nodes are associated with the data nodes; and when the data node ordered in the data element layer at a position to which the new data element is to be inserted is associated with one of the relay nodes, the data insertion step associates the data field associated with the data node at the position for insertion with a new data node, associates a new data field with the data node at the position for insertion, and inserts the data element including the new data node so as to be immediately subsequent to the data node at the position for insertion.

9. A non-transitory computer readable storage medium having stored thereon a data processing program according to claim 2, wherein the data processing program causes the computer to further execute a root node setting step of, when there are a plurality of relay nodes in the highest relay node layer among the divided relay node layers, generating a new relay node associated with a first relay node in the highest relay node layer and setting a new relay node layer including the new relay node as the highest relay node layer.

10. A non-transitory computer readable storage medium having stored thereon a data processing program according to claim 4, wherein the data processing program causes the computer to further execute a root node setting step of, when there are a plurality of relay nodes in the highest relay node layer among the divided relay node layers, generating a new relay node associated with a first relay node in the highest relay node layer and setting a new relay node layer including the new relay node as the highest relay node layer.

11. A non-transitory computer readable storage medium having stored thereon a data processing program according to claim 1, wherein the data processing program causes the computer to further execute a data deletion step of deleting a predetermine data element and adjusting the relay node associated with the deleted data element so as to maintain the layered list structure.

12. A non-transitory computer readable storage medium having stored thereon a data processing program according to claim 11, wherein:

the data elements are each formed by associating, as a pair, a data field, which is a substance of the predetermined data, and a data node having the information indicating a position on the memory at which the data field is stored;

the linked list is formed by associating the data nodes ordered adjacent to each other in the data element layer;

the relay nodes are associated with the data nodes; and when the data node ordered in the data element layer at a position from which the data element is to be deleted is associated with one of the relay nodes, the data deletion step exchanges the data fields between the data node at the position for deletion and the data node ordered immediately subsequent to the data node at the position for deletion, and deletes the data element ordered immediately subsequent to the data node at the position for deletion.

13. A non-transitory computer readable storage medium having stored thereon a data processing program according to claim 11, wherein the data processing program causes the computer to further execute:

a child node quantity determination step of determining, as a result of the deletion of the data element in the data deletion step, whether the number of child nodes, from an element in a layer immediately lower than, and associated with, a predetermined relay node until an element immediately before an element in the immediately lower layer associated with an adjacent relay node which is ordered immediately subsequent to the predetermined relay node in the layer including the predetermined relay node, has become equal to, or smaller than, a second predetermined value;

an upper node determination step of, when the number of the child nodes is determined to have become equal to, or smaller than, the second predetermined value in the child node quantity determination step, determining whether or not there is a relay node, in a layer immediately above the predetermined relay node, which is associated with the predetermined relay node;

a relay node deletion step of, when it is determined that there is a relay node, in the layer immediately above the predetermined relay node, which is associated with the predetermined relay node in the upper node determination step, deleting a relay node ordered immediately subsequent to the predetermined relay node in the layer including the associated relay node; whereas when it is determined that there is no relay node, in the layer immediately above the predetermined relay node, which is associated with the predetermined relay node, deleting the predetermined relay node.

14. A non-transitory computer readable storage medium having stored thereon a data processing program according to claim 11, wherein the data processing program causes the computer to further execute:

a child node quantity determination step of determining, as a result of the deletion of the data element in the data deletion step, whether the number of child nodes, from an element in a layer immediately lower than, and associated with, a predetermined relay node until an element immediately before an element in the immediately lower layer associated with an adjacent relay node which is ordered immediately subsequent to the predetermined relay node in the layer including the predetermined relay node, has become equal to, or smaller than, a second predetermined value;

an upper node determination step of, when the number of the child nodes is determined to have become equal to, or smaller than, the second predetermined value in the child node quantity determination step, determining whether or not there is a relay node, in a layer immediately above the predetermined relay node, which is associated with the predetermined relay node;

a reference node setting step of, when it is determined that there is a relay node, in the layer immediately above the predetermined relay node, which is associated with the predetermined relay node in the upper node determination step, setting a relay node ordered immediately subsequent to the predetermined relay node in the layer including the associated relay node as a reference node; whereas when it is determined that there is no relay node, in the layer immediately above the predetermined relay node, which is associated with the predetermined relay node, setting the predetermined relay node as the reference node;

an adjustment quantity determination step of determining whether or not the number of child nodes, from an element in a layer immediately lower than, and associated with, a relay node ordered immediately previous to the reference node until an element immediately before an element in the immediately lower layer associated with a relay node ordered immediately subsequent to the reference node, is equal to, or smaller than, a third predetermined value; and a child node adjustment step of, when it is determined that the number of the child nodes is equal to, or smaller than, the third predetermined value in the adjustment quantity determination step, deleting the reference node; whereas when it is determined that the number of the child nodes is larger than the third predetermined value, changing the association between the child nodes and the reference node.

15. A non-transitory computer readable storage medium having stored thereon a data processing program according to claim 14, wherein the child node adjustment step changes the association between the child nodes and the reference node, such that the number of child nodes, from an element in a layer immediately lower than, and associated with, a relay node ordered immediately previous to the reference node in the layer including the reference node until an element immediately before an element in the immediately lower layer associated with the reference node is equal to the number of child nodes from the element in the immediately lower layer associated with the reference node until an element immediately before an element in the immediately lower layer associated with a relay node ordered immediately subsequent to the reference node in the layer including the reference node.

16. A non-transitory computer readable storage medium having stored thereon a data processing program according to claim 1, wherein the data processing program causes the computer to further execute a child node quantity maintaining step of storing, in association with each relay node, child node information indicating the number of child nodes, from an element in a layer immediately lower than, and associated with, the each relay node until an element immediately before an element in the immediately lower layer associated with an adjacent relay node ordered immediately subsequent to the each relay node in the layer including the each relay node.

17. A data processing apparatus, which is a predetermined information processing apparatus, comprising:
    a processing system, having one or more processors, the processing system being configured to generate a layered list structure which is a data structure formed of a plurality of layers, the layered list structure including:
    a data element layer which includes a plurality of data elements, each including at least one of a substance of predetermined data and information indicating a position on a memory at which the substance of the predetermined data is stored, and is structured as a linked list in which the plurality of data elements are associated with one another and thus ordered; and
    a relay node layer which is positioned above the data element layer and includes a plurality of relay nodes, each being associated with one of elements in a layer immediately below;
    wherein:
    the relay node layer is further divided into a plurality of relay node layers;
    in each relay node layer, the relay nodes are ordered in accordance with the order of the elements in the layer immediately below; and
    in each relay node layer, the relay nodes ordered adjacent to each other are associated with each other.

18. A non-transitory computer-readable medium encoded with a data structure, the medium being part of a predetermined information processing apparatus, comprising:
    a data element layer which includes a plurality of data elements, each including at least one of a substance of predetermined data and information indicating a position on a memory at which the substance of the predetermined data is stored, and is structured as a linked list in which the plurality of data elements are associated with one another and thus ordered; and
    a relay node layer which is positioned above the data element layer and includes a plurality of relay nodes, each being associated with one of elements in a layer immediately below;
    wherein:
    the relay node layer is further divided into a plurality of relay node layers;
    in each relay node layer, the relay nodes are ordered in accordance with the order of the elements in the layer immediately below; and
    in each relay node layer, the relay nodes ordered adjacent to each other are associated with each other.

19. A method of processing data in a data processing apparatus, the method comprising:
    generating, using a processing system having one or more processors, a layered list structure which is a data structure formed of a plurality of layers, the layered list structure including:
    a data element layer which includes a plurality of data elements, each including at least one of a substance of predetermined data and information indicating a position on a memory at which the substance of the predetermined data is stored, and is structured as a linked list in which the plurality of data elements are associated with one another and thus ordered; and
    a relay node layer which is positioned above the data element layer and includes a plurality of relay nodes, each being associated with one of elements in a layer immediately below;
    wherein:
    the relay node layer is further divided into a plurality of relay node layers;
    in each relay node layer, the relay nodes are ordered in accordance with the order of the elements in the layer immediately below; and
    in each relay node layer, the relay nodes ordered adjacent to each other are associated with each other.

* * * * *